United States Patent [19]
Nakagawa et al.

[11] Patent Number: 5,969,798
[45] Date of Patent: Oct. 19, 1999

[54] IMAGE INSPECTION APPARATUS IN PLATE MAKING PROCESS AND IMAGE INSPECTION METHOD IN PLATE MAKING PROCESS

[75] Inventors: Seiji Nakagawa; Kunio Yagi; Makoto Shimooka; Shinji Kawashima; Tomokazu Taniguchi, all of Kyoto, Japan

[73] Assignee: D.S Technical Research Co., Ltd., Japan

[21] Appl. No.: 08/895,910

[22] Filed: Jul. 17, 1997

[30] Foreign Application Priority Data

Oct. 2, 1996 [JP] Japan .................................. 8-261883

[51] Int. Cl.⁶ ............................ G03B 27/60; G03B 27/32
[52] U.S. Cl. ................................. 355/52; 355/77
[58] Field of Search .................. 355/38, 77, 40, 355/41, 52, 55; 382/141, 145, 149, 293, 176; 356/399, 400; 430/5, 30

[56] References Cited

U.S. PATENT DOCUMENTS

| | | | |
|---|---|---|---|
| 4,736,245 | 4/1988 | Seto et al. | 358/76 |
| 4,827,526 | 5/1989 | Matsumoto | 382/1 |
| 5,208,870 | 5/1993 | Ennis | 382/30 |
| 5,365,596 | 11/1994 | Dante et al. | 382/8 |
| 5,729,328 | 3/1998 | Kimura et al. | 355/40 |
| 5,764,793 | 6/1998 | Omae et al. | 382/149 |

FOREIGN PATENT DOCUMENTS 5-281697  10/1993  Japan .
7-271009  10/1995  Japan .

*Primary Examiner*—Eddie C. Lee
*Assistant Examiner*—Hung Henry Nguyen
*Attorney, Agent, or Firm*—Ostrolenk, Faber, Gerb & Soffen, LLP

[57] ABSTRACT

Provided are an image inspection apparatus and an image inspection method in a plate making process which can perform inspection over a wide range including not only correction errors in the plate making process but errors caused in formation of an original plate film and a stage between the formation of the original plate film and completion of printing. A first revise recording a color image is regarded as a reference, for reading the image on this first revise. A second revise is regarded as an object, for reading an image on this second revise. The color images on the first revise (reference) and the second revise (object) are compared with each other for detecting mismatching portions of these images. Finally, the mismatching portions are displayed in a specified format.

28 Claims, 50 Drawing Sheets

Fig. 9A
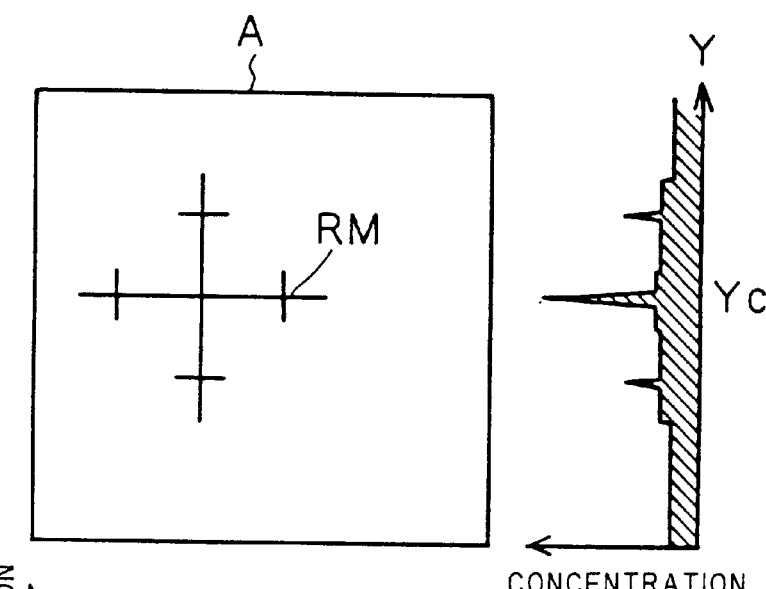
Fig. 9C
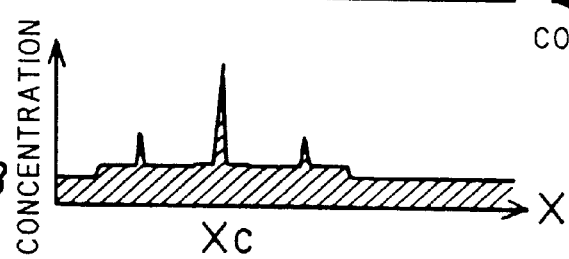
Fig. 9B

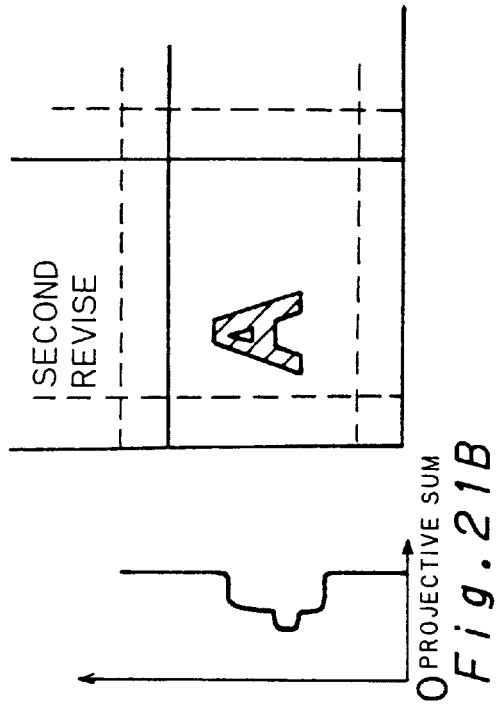
Fig.21A
Fig.21B
Fig.21C
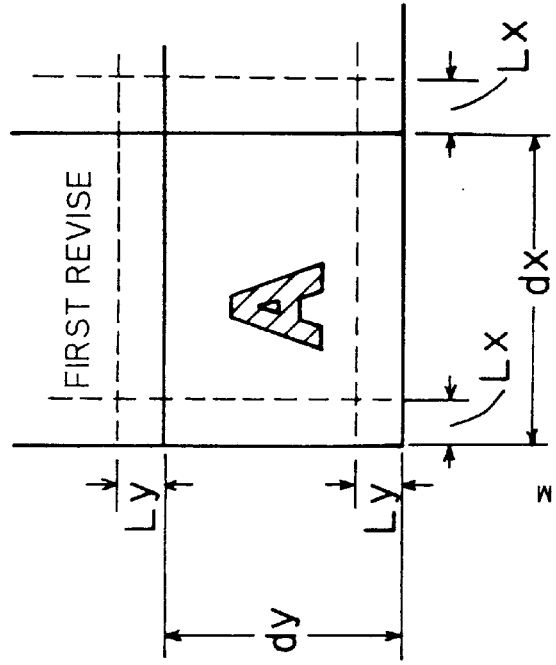
Fig.21D
Fig.21E
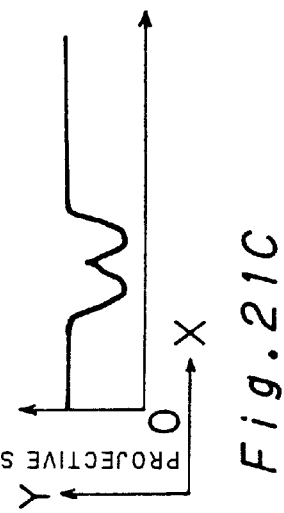
Fig.21F

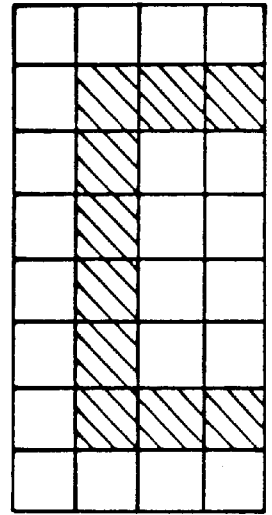
Fig. 30B SECOND REVISE DATA
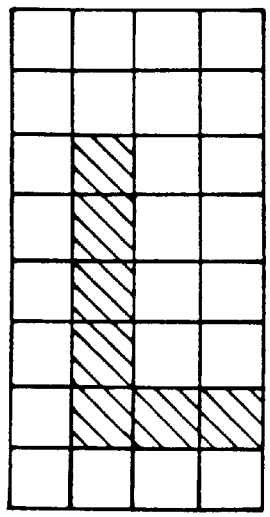
Fig. 30A FIRST REVISE DATA
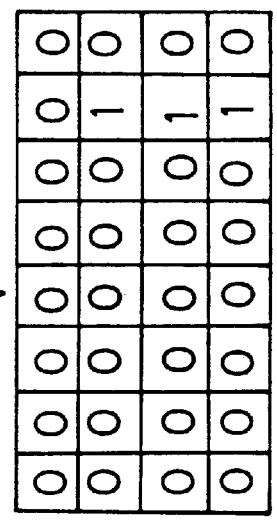
Fig. 30C DIFFERENCE DATA

Fig. 31

START PIXEL

Fig. 32

Fig. 33
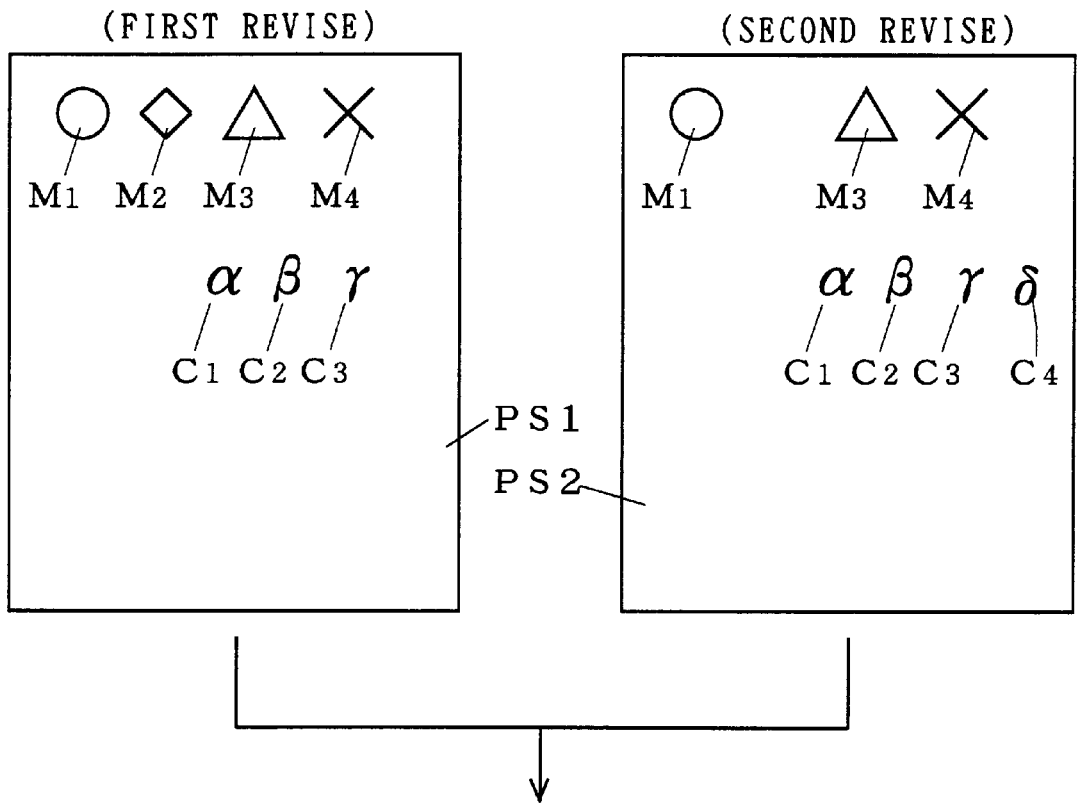
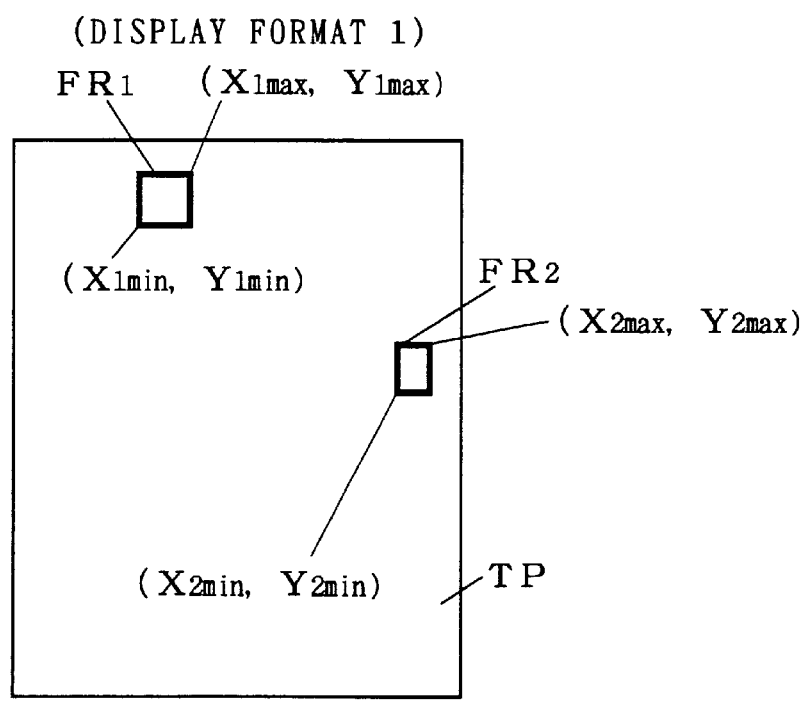

IMAGE INSPECTION APPARATUS IN PLATE MAKING PROCESS AND IMAGE INSPECTION METHOD IN PLATE MAKING PROCESS

BACKGROUND OF THE INVENTION

1. Field of the Invention

The present invention relates to an image inspection apparatus in a plate making process for inspecting two images which are formed in different stages of the plate making process by comparing the same with each other, and an image inspection method in the plate making process.

2. Description of the Background Art

In a plate making process, an original plate film F1 (consisting of F1Y, F1M, F1C and F1K) is formed in response to a previously specified print content for performing exposure/development thereby forming a press plate P1 (consisting of P1Y, P1M, P1C and P1K) as shown in FIG. 55, as well known in the art. In order to inspect whether or not a printed matter obtained from the press plate 1P formed in the aforementioned manner matches with the specified print content, a trial print, i.e., a proof sheet (first revise) PS1 is prepared from the press plate P1, and compared with the specified print content. If a portion mismatching with the specified print content is found in this stage, the operation returns to the plate making process for forming a new original plate film F2 (consisting of F2Y, F2M, F2C and F2K) and a new press plate P2 (consisting of P2Y, P2M, P2C and P2K), so that a new proof sheet (second revise) PS2 is prepared from the press plate P2. If further correction is necessary, a corrected original plate film F3 (consisting of F3Y, F3M, F3C and F3K) is employed for performing exposure/development thereby forming a further press plate P3 (consisting of P3Y, P3M, P3C and P3K) similarly to the above, so that a proof sheet (third revise) PS3 is prepared from this press plate P3.

Such correction requires a complicated manual operation, leading to improper correction of a portion mismatching with the specified print content and requiring correction or erroneous correction of another portion requiring no correction.

To this end, a number of apparatuses for inspecting such erroneous correction have been proposed in general. For example, Japanese Patent Laid Open Gazette No. 5-281697 (1993) or 7-271009 (1995) describes an apparatus which reads images of an original plate film formed first and a corrected original plate film and compares these images with each other for detecting match/mismatch, so that an operator can decide (inspect) whether or not the corrected content is proper.

In general, a conventional apparatus such as that described in Japanese Patent Laid Open Gazette No. 5-281697 regards uncorrected and corrected original plate films as a reference and an object respectively and compares these reference and target with each other. In practice, however, an actual print is obtained through steps of exposure/development, proof reading and printing after formation of the original plate films, and hence erroneous exposure in the exposure step or erroneous printing in the proof reading or printing step cannot be inspected by merely inspecting the original plate films.

SUMMARY OF THE INVENTION

An image inspection apparatus in a plate making process regarding a proof sheet recording an image as a reference and any of an original plate film which is corrected on the basis of the proof sheet, a press plate which is obtained by performing exposure/development through the original plate film, and another proof sheet which is prepared from the press plate as an object and the image inspection apparatus comparing the reference with the object and inspecting the same comprises a) holding means capable of holding the reference and the object, b) illumination means for illuminating the reference and the object which are held by the holding means, c) image pickup means for receiving light from a subject to be read which is one of the reference and the object for picking up an image on the subject to be read when the subject to be read is held by the holding means while receiving light from another subject to be read which is the other one of the reference and the object and picking up an image on the other subject to be read when the other subject to be read is held by the holding means, d) an optical system for guiding the light from either subject to be read which is held by the holding means to the image pickup means, e) difference detection means for comparing the images on the reference and the object with each other on the basis of image information outputted from the image pickup means and detecting mismatching portions, and f) output means for displaying a detection result by the difference detection means.

According to the present invention, it is possible to inspect not only correction errors but various errors caused after formation of the original plate film and before printing.

In the image inspection apparatus in a plate making process, the optical system has a movable lens group which is movable in an optical axis direction and the optical system is guiding light from an image recording medium held by the holding means to the image pickup means through the movable lens group, the image inspection apparatus further comprises g) lens driving means for driving the movable lens group in the optical axis direction and locating the movable lens group on a plurality of magnification set positions thereby varying the magnification of the optical system at a plurality of set magnifications, and the lens driving means includes g-1) a driving source for driving the movable lens group in the optical axis direction, and g-2) an intermittent transmission mechanism for transmitting driving force from the driving source to the movable lens group during location of the movable lens group between the plurality of magnification set positions while intercepting transmission of the driving force to the movable lens group upon location of the movable lens group on any one of plurality of magnification set position.

According to the present invention, the magnification of the optical system can be correctly varied to that responsive to the size of the elements forming the images of the image recording media so that the images can be read in a proper magnification responsive to the size of the elements forming the images of the image recording media and quickly and correctly inspected through comparison of these images.

In the image inspection apparatus in a plate making process, the image pickup means is adapted to pick up an image on each subject to be read as a color image, reference and object images which are images on the reference and the object are color images respectively, the image inspection apparatus further comprises i) color component adder means for obtaining color component sums by adding up a plurality of color components every pixel as to the respective ones of the reference and object images, and j) optimum displacement deciding means for relatively displacing the reference and object images in various ways for determining matching degrees of spatial distributions of the color component sums of the respective pixels of the reference and object images in the respective ones of the displacements and deciding that having the maximum matching degree as an optimum displacement, and the difference detection means compares the reference and object images with each other in a state displacing the reference and object images by the optimum displacement for detecting the difference between the reference and object images.

According to the present invention, inspection can be made over a wide range in the plate making process including not only correction errors but errors caused in a stage between formation of the original plate film and completion of printing.

In the image inspection apparatus in a plate making process, the output means outputs a mismatch mark indicating a mismatch onto an output paper while making the mismatch mark correspond to a mismatching position which is detected by the difference detection means.

According to the present invention, inspection can be made over a wide range in the plate making process including not only correction errors but errors caused in a stage between formation of the original plate film and completion of printing by clarifying the mismatching portions of the reference and the object.

An image inspection apparatus in a plate making process for performing image inspection by comparing two image data which are caused in different stages of the plate making process with each other comprises a) means for comparing first digital image data with second digital image data and providing a comparison result, and b) means for outputting the comparison result, and the first digital image data is selected from digital image data which is obtained in a stage immediately before recording in an image recording medium, and digital image data which is obtained by reading an image on an image recording medium, while the second digital image data is selected from digital image data which is obtained in a stage immediately before recording in an image recording medium, and digital image data which is obtained by reading an image on an image recording medium.

According to the present invention, precise image inspection can be performed.

Further, the cost can be reduced and a time for forming the image recording media can be saved.

An object of the present invention is to provide an image inspection apparatus in a plate making process which can quickly and correctly inspect images of image recording media by reading the images in a proper magnification responsive to the size of elements forming the images and comparing the same with each other.

Another object of the present invention is to provide an image inspection apparatus in a plate making process which can perform inspection over a wide range including not only correction errors in the plate making process but errors caused in a stage between formation of an original plate film and completion of printing by clarifying mismatching portions between a proof sheet (reference) and the original plate film, a press plate or a proof sheet (object) corrected on the basis of the proof sheet.

Still another object of the present invention is to provide an image inspection apparatus in a plate making process and an image inspection method in a plate making process which can perform precise image inspection in a short time at a low cost.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 9A to 9C are model diagrams showing the contents of the alignment processing according to the first embodiment of the present invention;

FIGS. 21A to 21F are explanatory diagrams of projective sum formation for the first and second revises in the X and Y directions according to the first embodiment of the present invention;

FIGS. 30A to 30C are explanatory diagrams of the processing of forming difference data according to the first embodiment of the present invention;

FIG. 31 is an explanatory diagram showing block extract processing according to the first embodiment of the present invention;

FIG. 32 is an explanatory diagram showing frame formation processing according to the first embodiment of the present invention;

FIG. 33 is an explanatory diagram for illustrating a "display format 1" according to the first embodiment of the present invention;

DESCRIPTION OF THE PREFERRED EMBODIMENTS

[1. First Embodiment]

An outline of an image inspection apparatus according to a first embodiment of the present invention is now described, followed by detailed description of an optical system and a lens driving mechanism as well as plate inspection processing and display formats for results of the inspection processing forming characteristic parts of the present invention.

<1-1. Outline of Image Inspection Apparatus>

Figure 1:
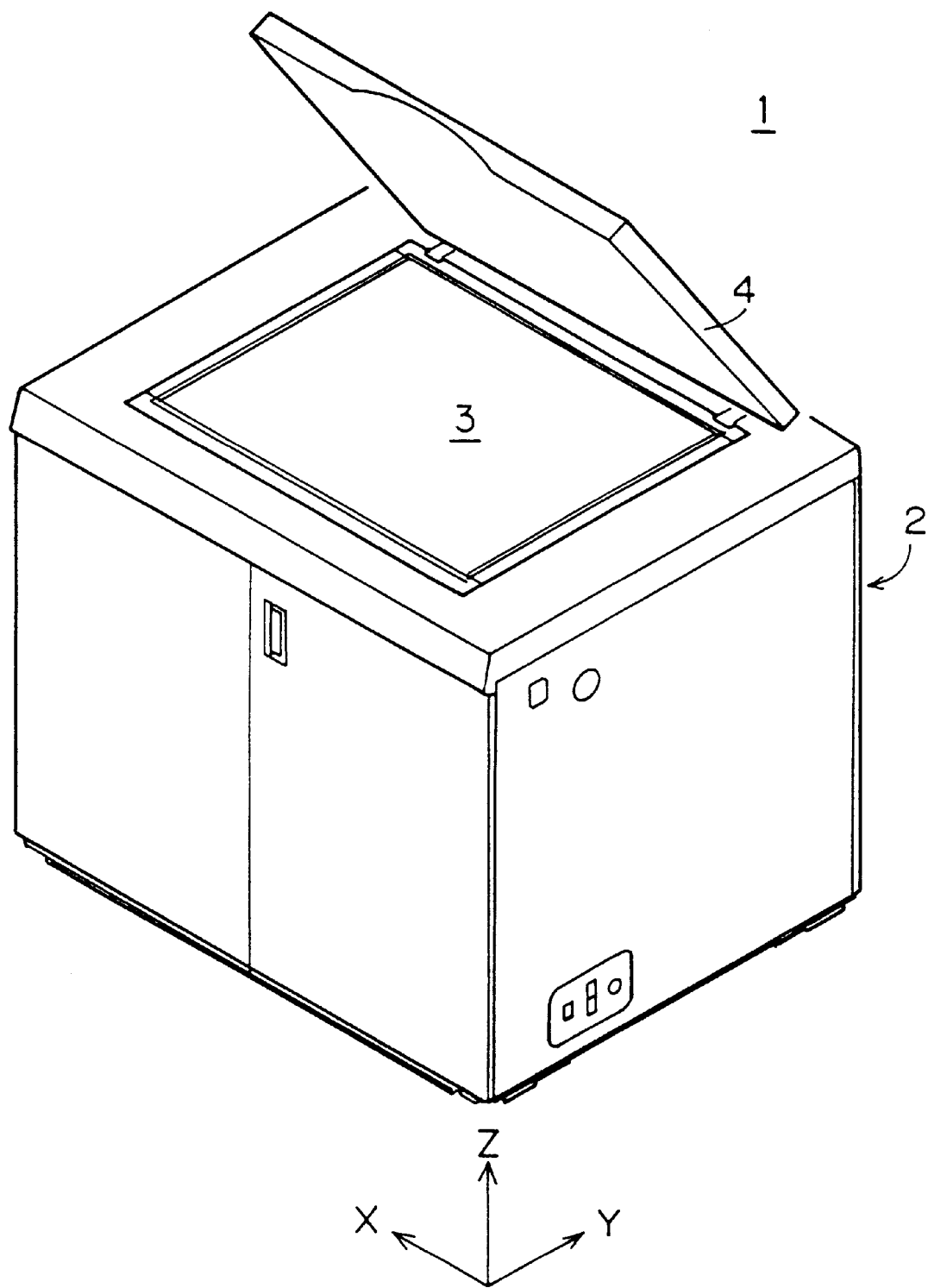
FIG. 1 shows a partial appearance of a color image inspection apparatus according to a first embodiment of the present invention.

FIG. 1 shows a partial appearance of a color image inspection apparatus 1 according to the first embodiment of the present invention, with illustration of XYZ rectangular coordinate axes for clarifying the directional relation between this figure and those described later. In this color image inspection apparatus 1, a transparent glass plate 3 is mounted on an upper surface of a body 2, so that a subject to be read such as a proof sheet, an original plate film or a press plate can be placed on this transparent glass plate 3. A Y-side end portion of a cover member 4 having a slightly larger plane size than the transparent glass plate 3 is coupled to the upper surface of the body 2 on a +Y side of the transparent glass plate 3, so that the cover member 4 is rotatable about the coupled portion. When an operator places the subject to be read such as the proof sheet, the original plate film or the press plate on the transparent glass plate 3 and sets the cover member 4 thereon, therefore, the sheet-type subject to be read is held between the transparent glass plate 3 and the cover member 4. Thus, the transparent glass plate 3 and the cover member 4 define holding means for holding the subject to be read such as the proof sheet according to the first embodiment.

Figure 2:
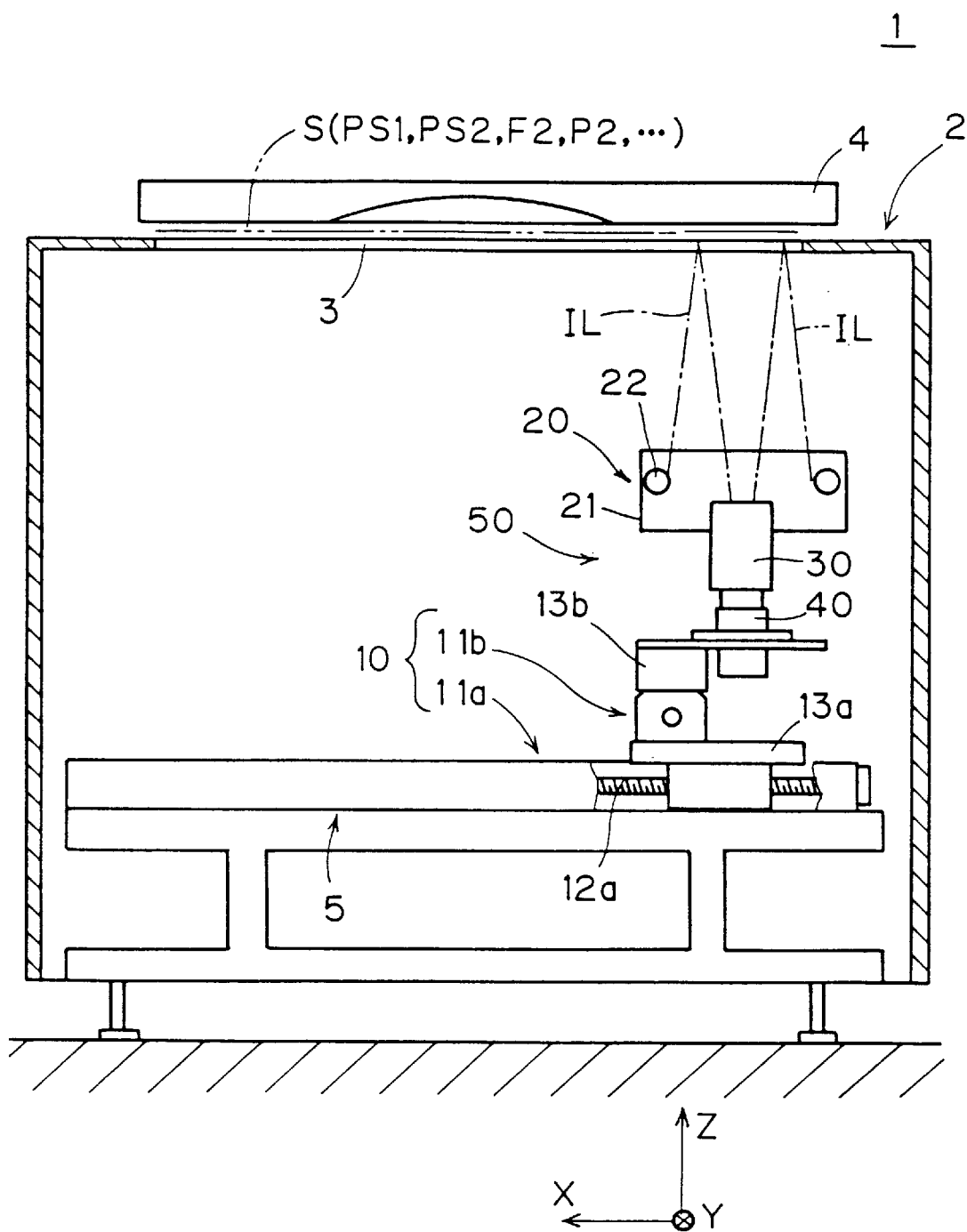
FIG. 2 is a sectional view of the color image inspection apparatus shown in FIG. 1 with a cover member set on a transparent glass plate.

FIG. 2 is a sectional view of the color image inspection apparatus 1 shown in FIG. 1, having the cover member 4 set on the transparent glass plate 3. In the interior of the body 2, a base frame 5 is arranged on a bottom surface side, so that an X-Y driving mechanism 10 is provided on this base frame 5. As shown in FIG. 2, the X-Y driving mechanism 10 is formed by X and Y driving units 11a and 11b extending in the X and Y directions respectively.

In the X driving unit 11a, an end of a ball screw 12a is rotatably supported by a bearing (not shown), while the other end is coupled to an X driving pulse motor 14a (not shown). A coupling block 13a is fitted with an intermediate portion of the ball screw 12a. Further, the Y driving unit 11b is fixed onto the coupling block 13a. The Y driving unit 11b is identical in basic structure to the X driving unit 11a, and hence description thereof is omitted.

In the X-Y driving mechanism 10 having the aforementioned structure, a coupling block 13b which is fitted with a ball screw (not shown) of the Y driving unit 11b can be two-dimensionally moved in the X and Y directions by controlling X and Y driving pulse motors respectively.

Figure 3:
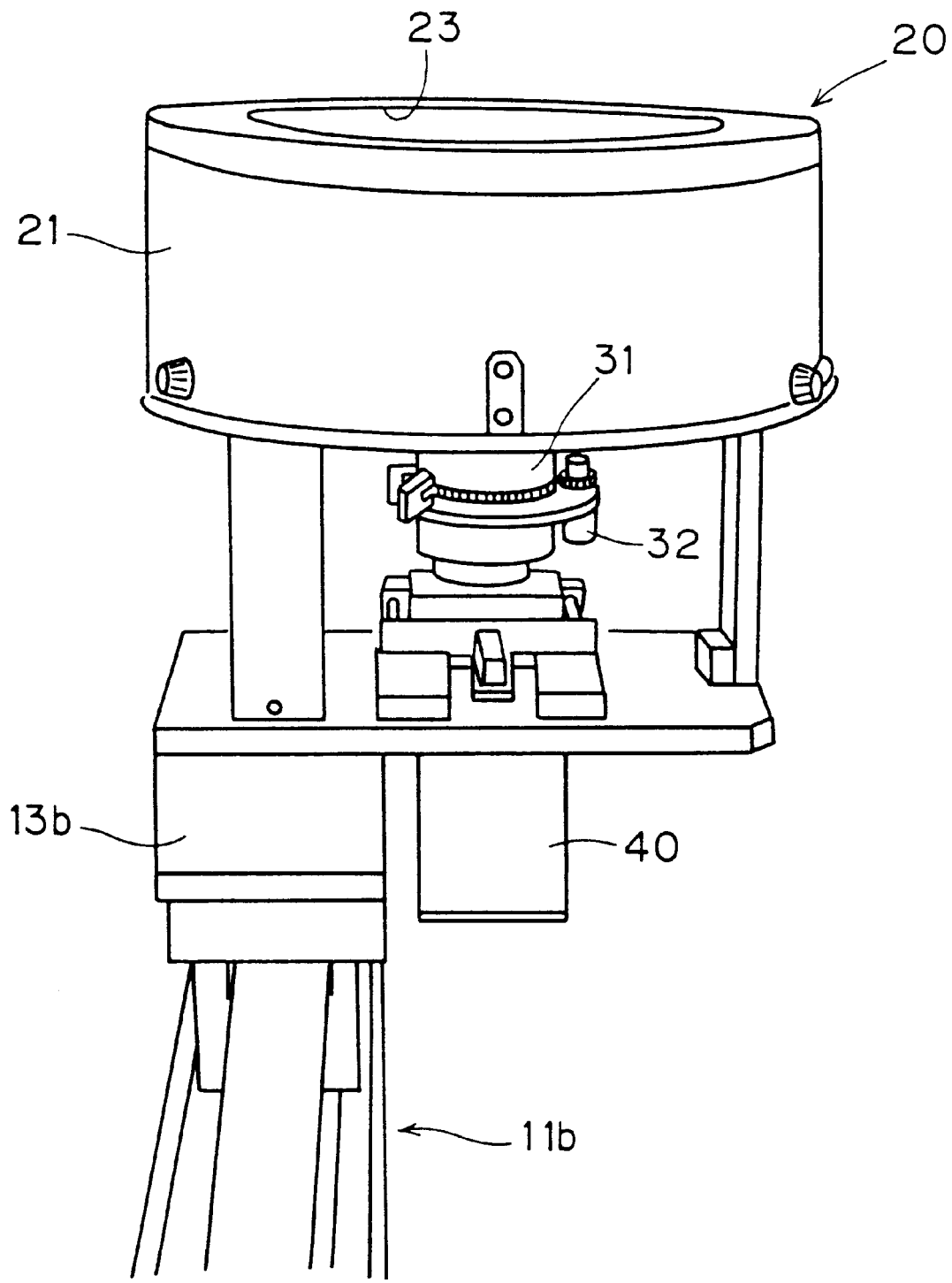
FIG. 3 is a perspective view showing the structure of a structural body according to the first embodiment of the present invention.

FIG. 3 is a perspective view showing the structure of a structural body 50. As shown in FIG. 3, the structural body 50 formed by integrating an illumination unit 20, an optical system 30 and a color CCD camera 40 with each other is mounted on the two-dimensionally movable coupling block 13b.

In the illumination unit 20, a cylindrical body cover 21 stores a round fluorescent lamp 22 (see FIG. 2), which is turned on/off by an illumination controller. When this round fluorescent lamp 22 is turned on, illumination light IL therefrom passes through an opening 23 provided on an upper portion of the body cover 21, and is transmitted through the transparent glass plate 3 to enter a part of a subject S to be read (a proof sheet, an original plate or a press plate). Thus, the round fluorescent lamp 22 locally illuminates a part of the subject S to be read according to the first embodiment, whereby illuminance distribution on the illuminated area can be uniformalized.

The optical system 30 guides the light reflected by the illuminated area of the subject S to be read to the color CCD camera 40. The optical system 30 is formed by a zoom lens and a lens driving motor 32 for driving the zoom lens and changing its magnification. The magnification can be changed in three stages by driving the zoom lens with a motor controller.

The structural body 50 having the aforementioned structure locally uniformly illuminates the subject S to be read which is placed on the transparent glass plate 3 with the illumination unit 20, properly varies the power of an image in the illuminated range, and picks up the image with the color CCD camera 40. Further, this structural body 50 is mounted on the coupling block 13b. When the X and Y driving pulse motors 14a and 14b are controlled by the motor controller for two-dimensionally moving the structural body 50 picking up a local image of the subject S to be read in the aforementioned manner, therefore, the entire image on the subject S to be read can be read.

Figure 4:
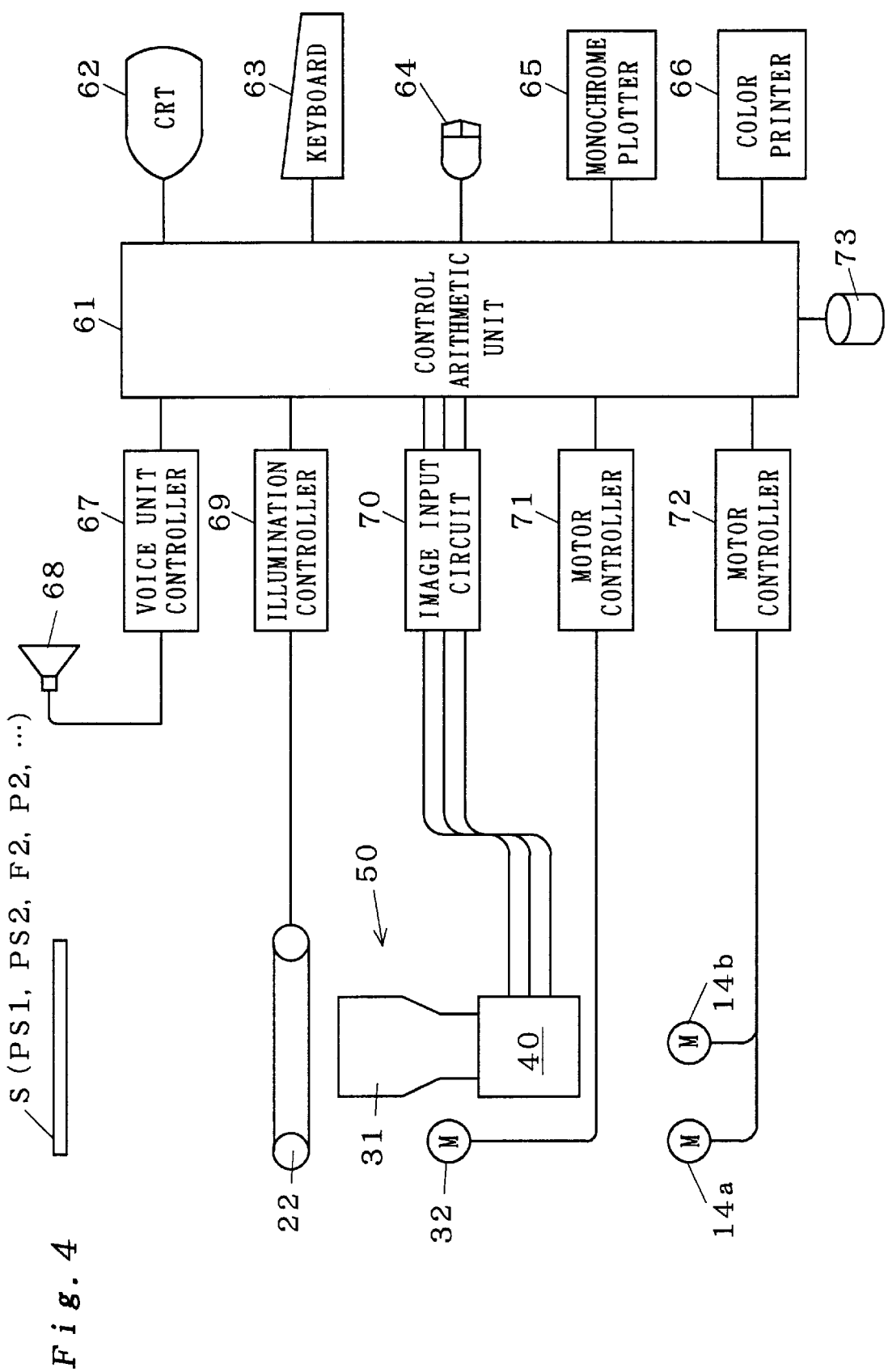
FIG. 4 illustrates the electric structure of the color image inspection apparatus shown in FIG. 1 along with the optical and mechanical structures.

FIG. 4 illustrates the electric structure of the color image inspection apparatus 1 along with control systems for the aforementioned optical and mechanical structures.

This apparatus 1 includes a computer unit having a CPU and a memory as a control arithmetic unit 61. This control arithmetic unit 61 is provided with input/output units of a color CRT 62, a keyboard 63, a mouse 64, a monochrome plotter 65 and a color printer 66. The control arithmetic unit 61 controls a voice unit 68 through a voice unit controller 67, for transmitting a voice message to the operator. Further, the control arithmetic unit 61 can turn the round fluorescent lamp 22 on/off through an illumination controller 69. Image signals (image information) for three color components of red (R), green (G) and blue (B) obtained by the color CCD camera 40 are supplied to an image input circuit 70 to be subjected to proper image processing, and thereafter transmitted to the control arithmetic unit 61. The control arithmetic unit 61 can control the lens driving motor 32 and the X and Y driving pulse motors 14a and 14b through motor controllers 71 and 72 respectively. Further, a magnetic disk 73 is electrically connected with the control arithmetic unit 61 as an external recording medium.

The operation of the color image inspection apparatus 1 having the aforementioned structure is now described with reference to FIGS. 5 to 55.

Figure 55:
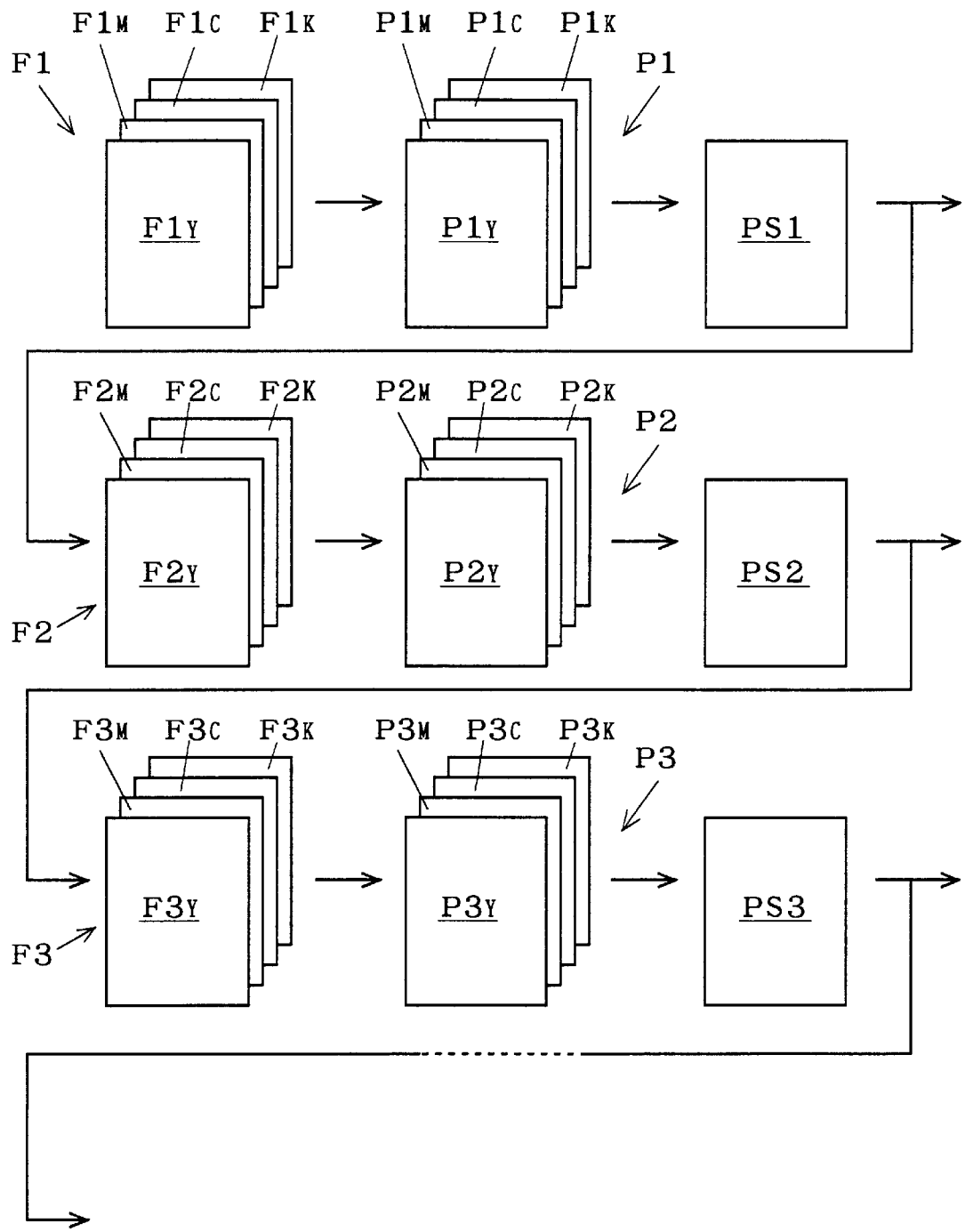
FIG. 55 is a model diagram showing the flow of a plate making process to proof processing forming the technical background of the present invention.

First, a proof sheet (first revise) PS1 is prepared in the flow shown on the uppermost stage of FIG. 55. Namely, an original plate film F1 (consisting of F1Y, F1M, F1C and F1K) is formed in response to a previously specified print content for performing exposure/development through the original plate film F1 thereby forming a press plate P1 (consisting of P1Y, P1M, P1C and P1K), and thereafter the proof sheet (first revise) PS1 is printed from the press plate P1.

Figure 5:
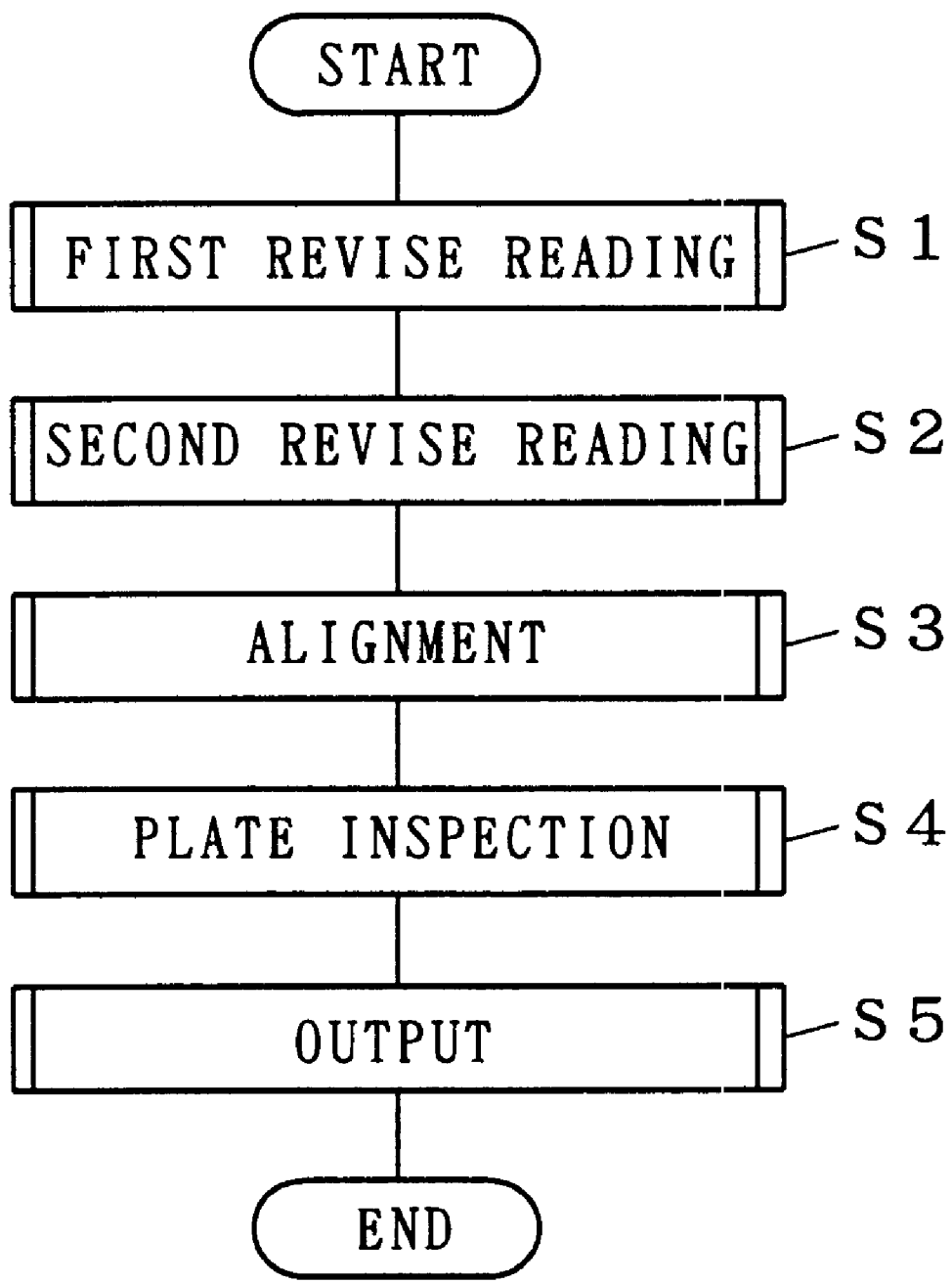
FIG. 5 is a flow chart showing the overall operation of the color image inspection apparatus shown in FIG. 1.

The operator places the first revise PS1 formed in the aforementioned manner on the transparent glass plate 3 and operates the keyboard 63 or the mouse 64 for selecting a first revise read instruction, so that first revise read processing is executed (step S1 in FIG. 5).

Figure 6:
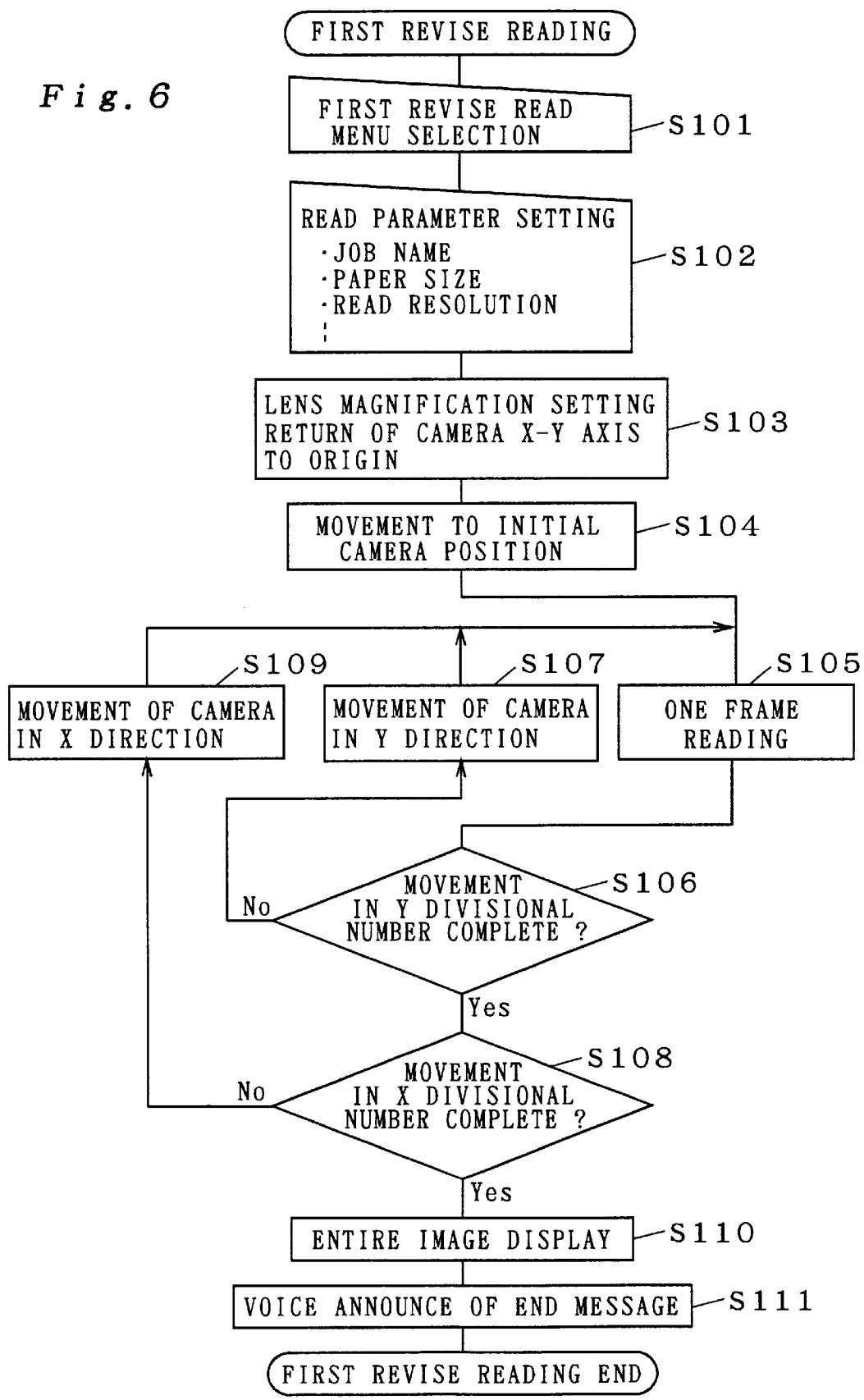
FIG. 6 is a flow chart showing first revise read processing according to the first embodiment of the present invention.

FIG. 6 is a flow chart showing the first revise read processing. In this first revise read processing, the operator selects a first revise read menu (step S101) and the apparatus 1 urges the operator to input read parameters on the color CRT 62. The read parameters are related not only to the read processing for the first revise PS1, but read processing for a second revise PS2 described later. The operator can input the read parameters, which are formed by "job name", "paper size", "read resolution" and the like, through the keyboard 63 or the mouse 64. When the operator sets the read parameters (step S102), the apparatus 1 executes steps S103 to S109 in accordance with the read parameters, for reading a color image on the first revise PS1.

At the step S103, the apparatus 1 controls the lens driving motor 32 through the motor controller 71 for setting the magnification of the zoom lens, while controlling the X and Y driving pulse motors 14a and 14b through the motor controller 72 respectively for returning the structural body 50 including the color CCD camera 40 to an origin position. At the step S104, the apparatus 1 moves the structural body 50 for locating the color CCD camera 40 on a read start position (initial camera position).

At the step S105, the apparatus 1 picks up the image on the first revise PS1 with the color CCD camera 40, supplies the image signals (image information) for the three color components of R, G and B related to the image to the image input circuit 70, performs proper image processing, and thereafter stores the same in the memory (not shown) of the control arithmetic unit 61. Thus, a part of the image on the first revise PS1 (an image for one frame) can be read in an image size corresponding to the magnification set at the step S103.

Thus, in the first embodiment reading only a part of the image with the color CCD camera 40, the entire image is divided into the X and Y directions in units of frames for successively reading images for the respective frames while two-dimensionally moving the color CCD camera 40 in the X and Y directions.

In more concrete terms, the apparatus 1 determines whether or not the number of times of movement of the color CCD camera 40 in the Y direction matches with the number of division in the Y direction (Y divisional number) at the step S106. If the determination at the step S106 is of NO, the apparatus 1 moves the color CCD camera 40 in the Y direction by one frame at a step S107, and reads an image for this frame (step S105). If the determination at the step S106 is of YES, on the other hand, the apparatus 1 advances to the step S108.

At the step S108, the apparatus 1 determines whether or not the number of times of movement of the color CCD camera 40 in the X direction matches with the number of division in the X direction (X divisional number). If the determination at the step S108 is of NO, the apparatus moves the color CCD camera 40 in the X direction by one frame at the step S109, and thereafter reads an image for this frame (step S105). If the determination at the step S108 is of YES, on the other hand, the apparatus 1 advances to a step S110.

Thus, it is possible to read images of all frames by executing the steps S105 to S109, for reading the entire image of the first revise PS1 serving as a reference in plate inspection processing described later. Thereafter the apparatus 1 displays the image of the first revise PS1 on the color CRT 62 at the step S110. Then, the apparatus informs the operator of the fact that the first revise PS1 is completely read from the voice unit 68 through the voice unit controller 67 (voice announce).

When the read processing for the first revise PS1 is completed in the aforementioned manner, the operator removes the first revise PS1 from the transparent glass plate 3, then places a second revise PS2 to be compared with the first revise PS1, and operates the keyboard 63 or the mouse 64 for selecting a second revise read instruction, so that the apparatus 1 executes revise read processing (step S2 in FIG. 5).

Figure 7:
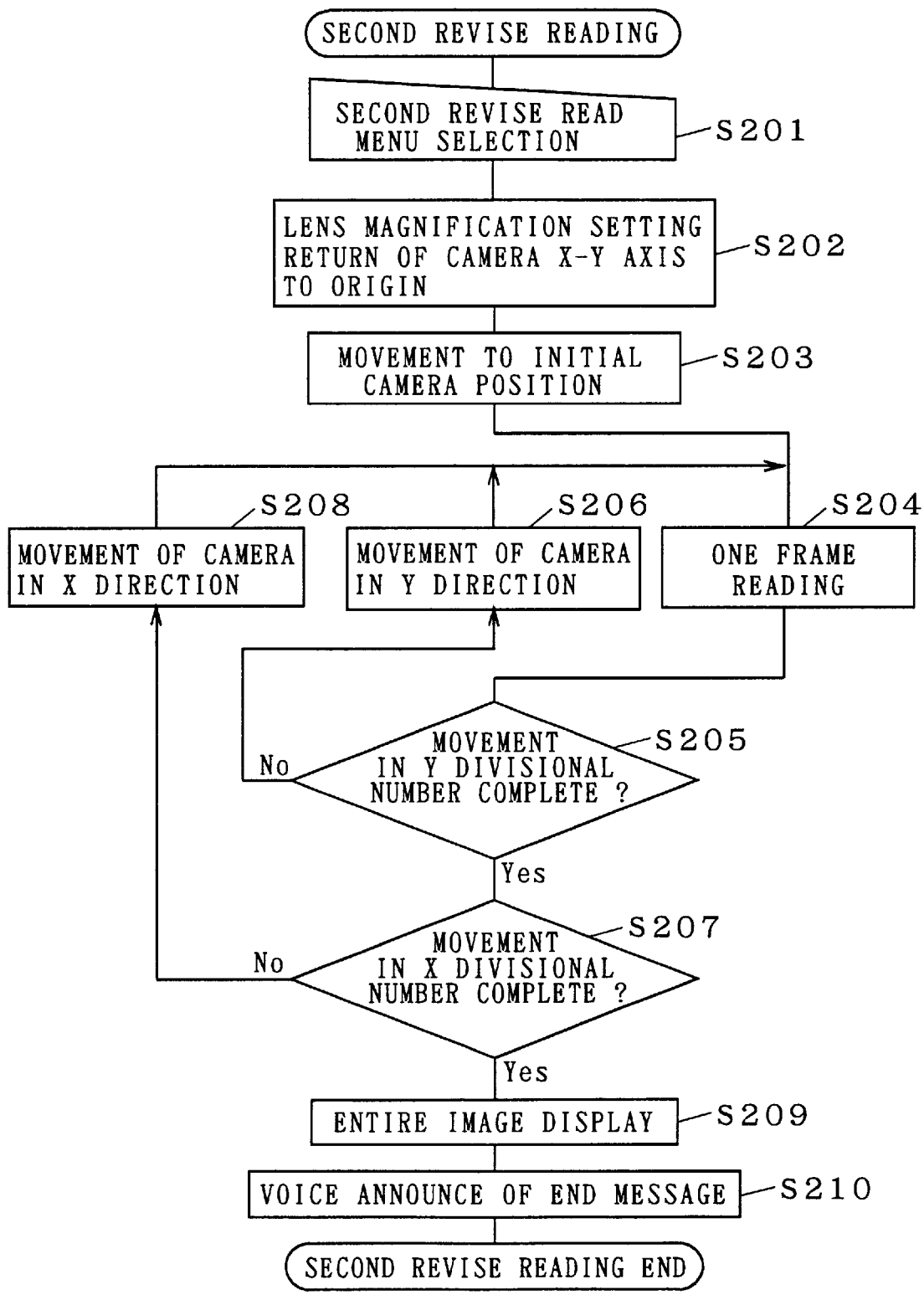
FIG. 7 is a flow chart showing second revise read processing according to the first embodiment of the present invention.

FIG. 7 is a flow chart showing the second revise read processing. In this revise read processing, the operator selects a second revise read menu (step S201), and the apparatus 1 executes steps S202 to S208 on the basis of the read parameters set at the step S102, for reading an image on the second revise PS2. The steps S202 to S208 correspond to the aforementioned steps S103 to S109 respectively except that the second revise PS2 is read, and hence redundant description is omitted.

After reading the entire image of the second revise PS2, the apparatus 1 displays the read image of the second revise PS2 on the color CRT 62 (step S209), and thereafter informs the operator of the fact that the second revise PS2 is completely read from the voice unit 68 through the voice unit controller 67 (voice announce) at a step S210.

Figure 8:
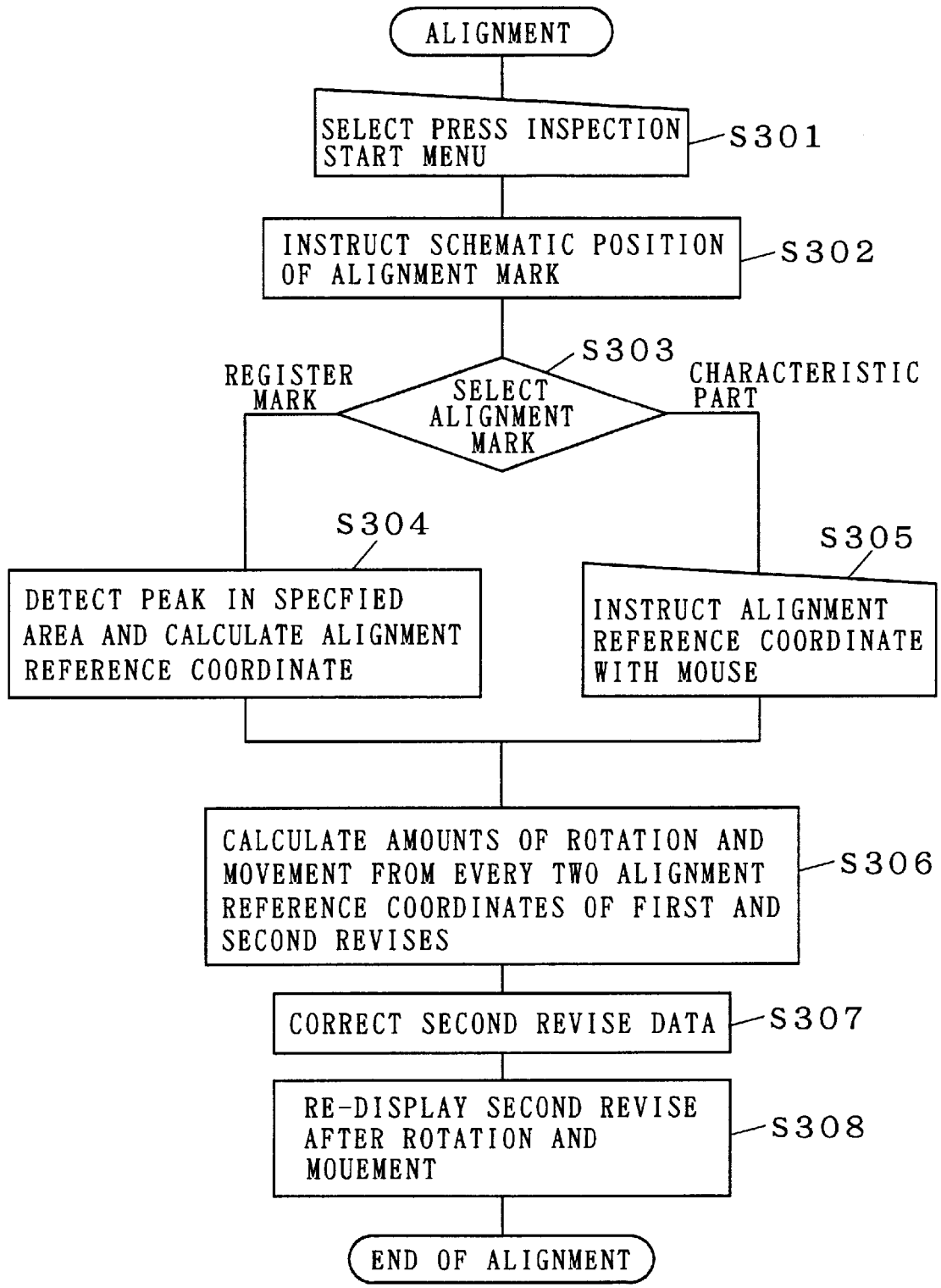
FIG. 8 is a flow chart showing alignment processing according to the first embodiment of the present invention.

When the read processing for the second revise PS2 is completed in the aforementioned manner, the apparatus 1 executes alignment processing (step S3 in FIG. 5). FIG. 8 is a flow chart showing the alignment processing. In this alignment processing, the operator selects a plate inspection start menu (step S301), and operates the mouse 64 while observing an image displayed on the color CRT 62 for instructing schematic positions of alignment marks (step S302). In general, two cross marks, i.e., the so-called register marks are printed on each of the first and second revises PS1 and PS2 for registration in plate making and printing steps and these marks are used as alignment marks, while characteristic parts of the images are utilized as alignment marks when the register marks are not provided or unclear. At a step S303, therefore, the operator selects whether register marks or characteristic parts are utilized as alignment marks, and the apparatus 1 obtains alignment reference coordinates in response to the selection.

When the operator selects "register mark" at the step S303, the apparatus 1 advances to a step S304 and obtains the alignment reference coordinates as follows: Referring to FIGS. 9A to 9C, register marks RM are present in an area A specified at the step S302 as shown in FIG. 9A, and when color concentrations of the three color components R, G and B of respective pixels are projectively added up in the Y direction, a concentration distribution in the X direction is obtained as shown in FIG. 9B. Similarly, a concentration distribution in the Y direction is obtained as shown in FIG. 9C. According to the first embodiment, coordinates XC and YC having the highest concentrations are regarded as alignment reference coordinates in correspondence to the register marks RM in the X and Y directions respectively.

When the operator selects "characteristic part" at the step S303, on the other hand, the apparatus 1 advances to a step S305 so that the operator operates the mouse 64 for instructing a point of the characteristic parts and the apparatus 1 regards the coordinates of the instructed point as the alignment reference coordinate.

At the steps S304 and S305, the apparatus 1 obtains two alignment reference coordinates as to the first and second revises PS1 and PS2 respectively.

At a next step S306, the apparatus 1 operates amounts of rotation and movement of the second revise PS2 with respect to the first revise PS1 on the basis of the four alignment reference coordinates obtained in the aforementioned manner. Then, the apparatus 1 rotates and moves the image of the second revise PS2 at a step S307 for correcting image information (second revise data) of the second revise PS2 so that the second revise PS2 is superposed on the first revise PS1 for allowing comparison as to whether or not the images match with each other.

Then, the apparatus 1 re-displays the entire image of the second revise PS2 on the color CRT 62 on the basis of the corrected image information (step S308).

When the alignment processing is completed in the aforementioned manner, the apparatus 1 carries out plate inspection processing (step S4 in FIG. 5).

Figure 10:
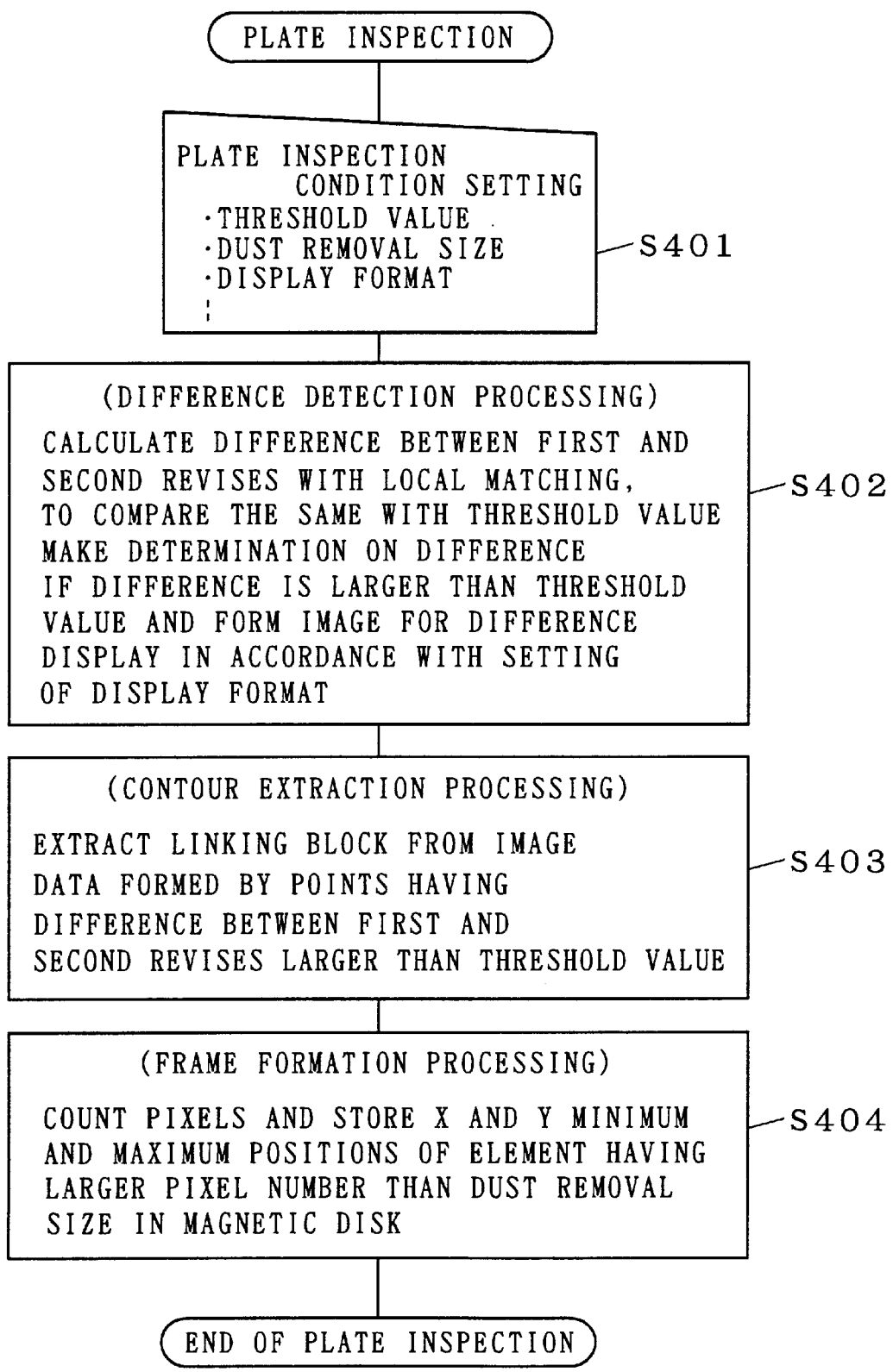
FIG. 10 is a flow chart showing plate inspection processing according to the first embodiment of the present invention.

FIG. 10 is a flow chart showing the plate inspection processing. In this plate inspection processing, the operator sets plate inspection conditions such as "threshold value", "dust removal size", "display format" and the like (step S401), and the apparatus 1 executes difference detection processing for detecting the difference between the first and second revises PS1 and PS2 (step S402). Namely, the apparatus 1 divides each of the image data of the first and second revises PS1 and PS2 into n by m areas, calculates the difference between the images while locally matching the images of the first and revises PS1 and PS2 every divided area, and compares the difference with the threshold value set at the step S401. If the difference is larger than the threshold value, the apparatus 1 determines that there is the difference in the divided area. Thus, the apparatus 1 detects matching and mismatching portions of the first and second revises PS1 and PS2 respectively. The mismatching portions include decreased and increased portions removed and added by correction based on the first revise PS1 respectively. The apparatus 1 forms an image for difference display in accordance with the display format set at the step S401.

Figure 11:
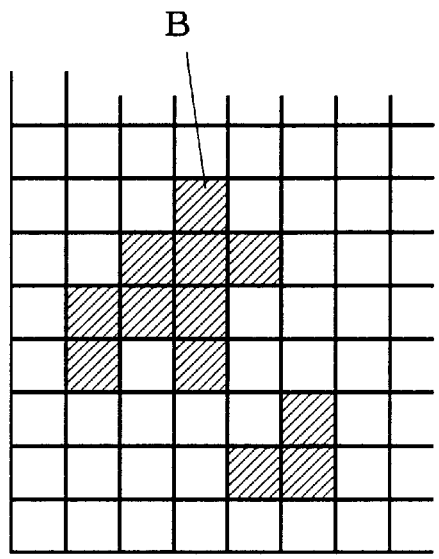
FIG. 11 is a model diagram showing the contents of the plate inspection processing according to the first embodiment of the present invention.

When the difference detection processing (step S402) is completed, the apparatus 1 carries out contour extract processing at a step S403. As shown in FIG. 11, this processing is adapted to extract a linking block B (slanted area in FIG. 11) from image data exhibiting the difference between the first and second revises PS1 and PS2 exceeding the threshold value. When the difference between the first and second revises PS1 and PS2 is so large that a character provided in the first revise PS1 is deleted by proof reading, for example, the block B corresponding to the character size is extracted. When the difference between the first and second revises PS1 and PS2 is caused by a phenomenon such as adhesion of small dust or the like regardless of proof reading, on the other hand, a relatively small block B results. Thus, the size of the block B remarkably varies with the type of the cause for the difference between the first and second revises PS1 and PS2.

Figure 12:
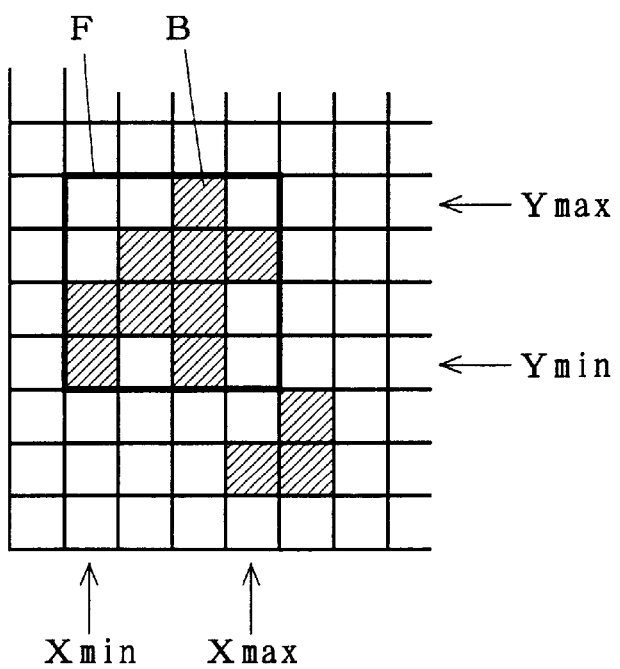
FIG. 12 is a model diagram showing the contents of the plate inspection processing according to the first embodiment of the present invention.

When the contour extract processing (step S403) is completed, the apparatus 1 advances to a step S404, for counting the number of pixels forming the contour of the block B obtained by the contour extract processing and comparing the same with the dust removal size set at the step S401. From the result of this comparison, the apparatus 1 assumes a frame F enclosing the block B having a larger pixel count number than the dust removal size as shown in FIG. 12, obtains the minimum position (Xmin, Ymin) and the maximum position (Ymax, Ymax) as to the X and Y coordinates forming the frame F respectively, and stores the same in the magnetic disk 73.

Figure 13:
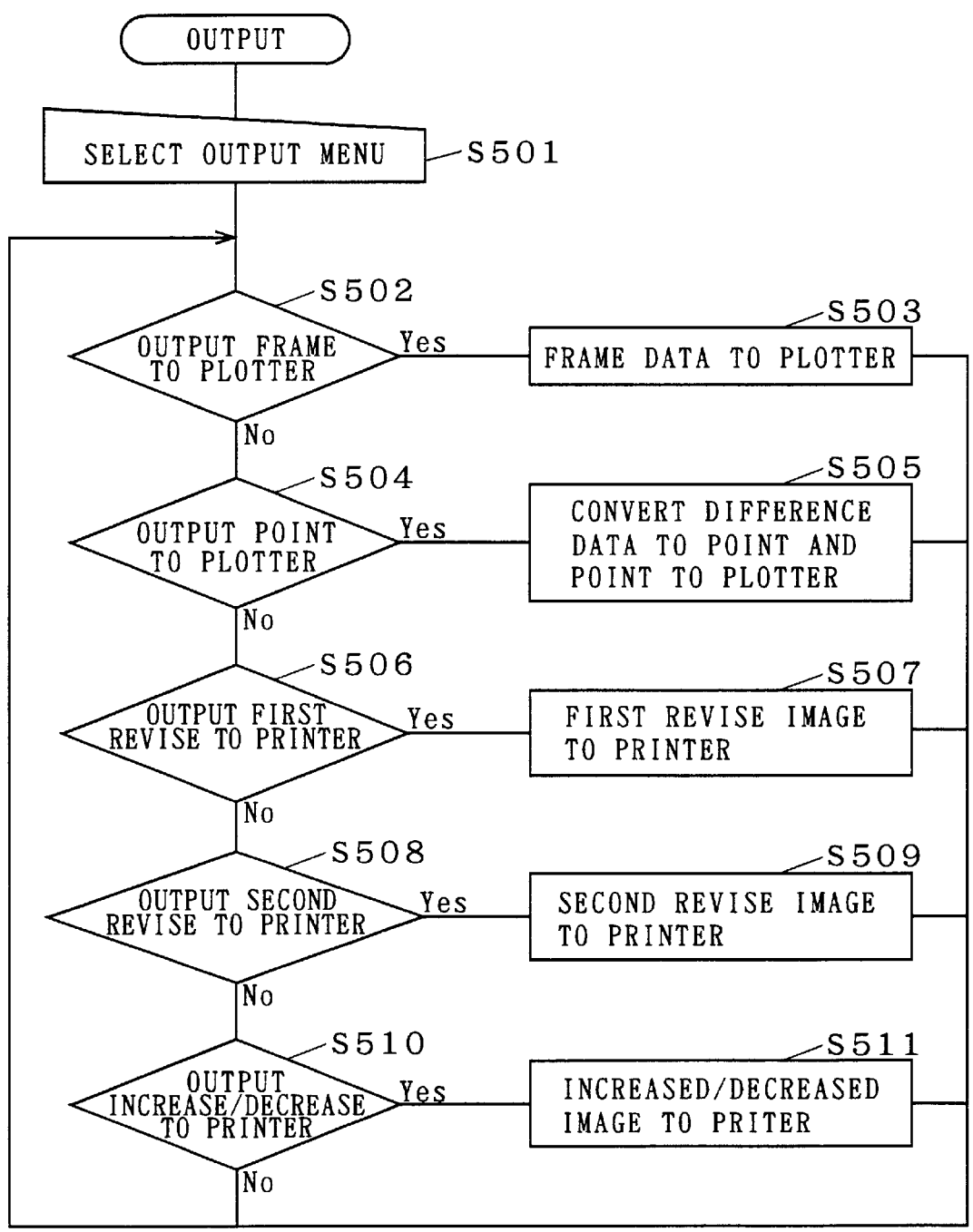
FIG. 13 is a flow chart showing output processing according to the first embodiment of the present invention.

When the plate inspection processing (step S4 in FIG. 5) is completed, the apparatus 1 advances to a step S5 (FIG. 5), and outputs the result of the plate inspection processing. FIG. 13 is a flow chart showing output processing. In this output processing, the operator selects an output menu, and decides the output format (step S501). The apparatus 1 executes steps S502 to S511 and outputs the result in the specified output format.

At a step S502, the apparatus 1 determines whether or not the frame F is to be outputted to the monochrome plotter 65, and if the determination is of YES, the apparatus 1 reads frame data consisting of the four positions Xmin, Ymin, Xmax and Ymax obtained at the step S404 from the magnetic disk 73, and draws a frame corresponding to the block B with the plotter 65 (step S503). If the determination at the step S502 is of NO, on the other hand, the apparatus 1 advances to a step S504.

At the step S504, the apparatus 1 determines whether or not points are to be outputted to the monochrome plotter 65, and if the determination is of YES, the apparatus 1 obtains individual position coordinates of the pixels forming the block B larger than the dust removal size, and stores the same in the magnetic disk 73 while supplying the position coordinates to the monochrome plotter 65 for plotting the respective points (step S505). If the determination at the step S504 is of NO, on the other hand, the apparatus 1 advances to a step S506.

At the step S506, the apparatus 1 determines whether or not the first revise PS1 is to be outputted to the color printer 66, and if the determination is of YES, the apparatus 1 outputs the image of the first revise PS1 to the color printer 66 (step S507). If the determination at the step S506 is of NO, on the other hand, the apparatus 1 advances to a step S508.

At the step S508, the apparatus 1 determines whether or not the second revise PS2 is to be outputted to the color printer 66, and if the determination is of YES, the apparatus 1 outputs the image of the second revise PS2 to the color printer (step S509). If the determination at the step S508 is of NO, on the other hand, the apparatus 1 advances to a step S510.

At the step S510, the apparatus 1 determines whether or not increase/decrease is to be outputted to the color printer 66, and if the determination is of YES, the apparatus 1 outputs the images of the portions (respective increased and decreased portions) added and deleted by the proof reading to the color printer 66 along with the images of the matching portions (step S511). If the determination at the step S510 is of NO, on the other hand, the apparatus 1 returns to the step S502.

Thus, the apparatus 1 outputs the inspection result in the specified format.

According to the first embodiment of the present invention, as hereinabove described, the apparatus 1 regards the first revise PS1 recording a color image as a reference, reads its image, regards the second revise PS2 including a content corrected on the basis of the first revise PS1 as an object, reads its image, thereafter compares the color images on the first revise (reference) PS1 and the second revise (object) PS2 with each other for detecting mismatching portions of the images, and displays the same in the specified format, whereby not only correction errors but various errors caused after formation of the original plate film and before printing can be inspected.

Further, the apparatus 1 according to the first embodiment is adapted to sequentially read the first and second revises PS1 and PS2. Thus, the apparatus 1 has the following advantageous effects in comparison with an apparatus placing the first and second revises PS1 and PS2 on the same glass plate in parallel with each other, reading respective images and comparing and inspecting the same:

First, the image of the first revise PS1 can be read in the stage of formation. Thus, the apparatus 1 can compare the first revise PS1 with the second revise PS2 after reading the image of the second revise PS2 by previously reading the image of the first revise PS1 after formation of the first revise PS1 and before formation of the second revise PS2, whereby the working time required for the plate inspection processing can be remarkably reduced.

Further, the image of the first revise PS1 can be previously read as described above, whereby preservation of the first revise PS1 is unnecessary.

In addition, the apparatus 1 substitutes the second revise PS2 for the first revise PS1 for reading the image, whereby the apparatus 1 can be remarkably miniaturized as compared with the apparatus of arranging the first and second revises PS1 and PS2 in parallel with each other and reading images.

While the apparatus 1 regards the first and second revises PS1 and PS2 as the reference and the object respectively in the first embodiment, the original plate film F2 (consisting of F2Y, F2M, F2C and F2K) formed on the basis of the first revise PS1 or the press plate P2 (consisting of P2Y, P2M, P2C and P2K) obtained by carrying out exposure/development with the original plate film F2 may alternatively be regarded as the object, to be compared with the first revise PS1.

On the other hand, the proof reading may not be completed in the stage of the second revise PS2 but a third revise PS3 may be necessary, as shown in FIG. 55. In this case, the apparatus may regard the second revise PS2 as a reference, while regarding either an original plate film F3 (consisting of F3Y, F3M, F3C and F3K) corrected on the basis of the second revise PS2 or a press plate P3 (consisting of P3Y, P3M, P3C and P3K) obtained by performing exposure/development with the original plate film F3 as the object. If a fourth or higher-order revise must be prepared, the apparatus 1 may regard the proof sheet as the reference similarly to the above, while regarding any of an original plate film corrected on the basis of the proof sheet, a press plate obtained by performing exposure/development with the original plate film and a new proof sheet printed from the press plate as the object.

Further, while the apparatus 1 reads the images in the order of the reference (first revise PS1) and the object (second revise PS2) in the first embodiment, these images may alternatively be read in reverse order.

<1-2. Optical System and Lens Driving Mechanism>

Figure 14:
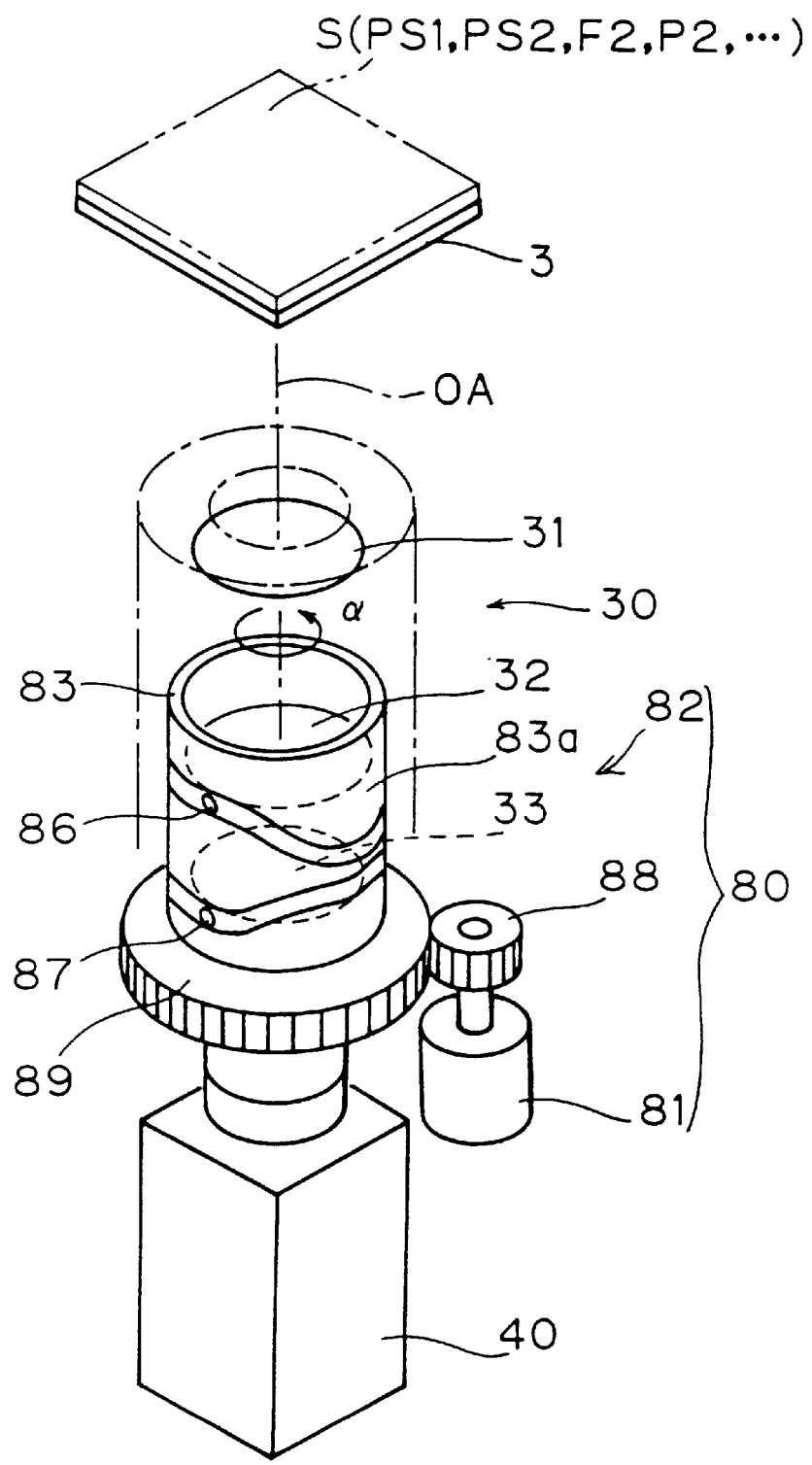
FIG. 14 is a perspective view showing an optical system and a lens driving mechanism according to the first embodiment of the present invention.
Figure 15:
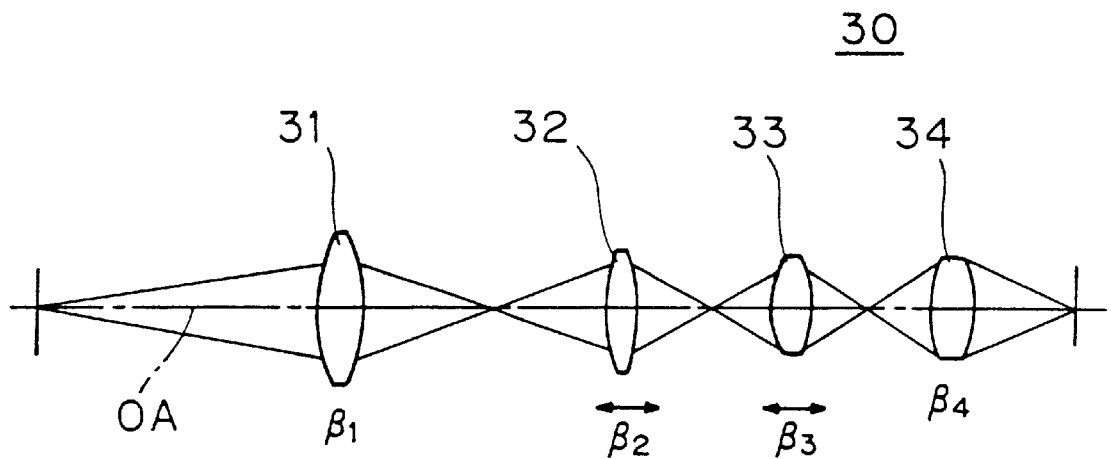
FIG. 15 illustrates the structure of the optical system according to the first embodiment of the present invention.

The structures of the optical system 30 and the lens driving unit 80 are now described with reference to FIGS. 14 to 16. FIG. 14 is a perspective view showing the optical system 30 and the lens driving unit 80, while omitting the illumination unit 20 for facilitating easy understanding of the structures of the optical system 30 and the lens driving unit 80. FIG. 15 illustrates the structure of the optical system 30.

As shown in FIG. 15, the optical system 30 is formed by four lens groups 31 to 34. Among these lens groups 31 to 34, the lens groups 31 and 34 which are the closest to the objects (the upper side in FIG. 14 and the left side in FIG. 15) and the closest to the images (the lower side in FIG. 14 and the right side in FIG. 15) respectively are fixedly arranged, while the remaining two lens groups 32 and 33 held between these lens groups 31 and 34 are movable along an optical axis OA. The magnification β of the optical system 30 having the aforementioned structure is expressed as follows:

$$\beta = \beta_1 \times \beta_2 \times \beta_3 \times \beta_4$$

where $\beta_1$, $\beta_2$, $\beta_3$ and $\beta_4$ represent the magnifications of the lens groups 31 to 34 respectively. The magnification β of the optical system 30 can be varied in three stages of high, intermediate and low magnifications by moving the movable lens groups 32 and 33 to three magnification set positions M1 to M3 (FIG. 16) by the lens driving unit 80, as described below.

The lens driving unit 80 is formed by a lens driving motor 81 serving as a driving source for driving the movable lens group 32 and 33 along the optical axis OA and an intermediate transmission mechanism 82 for intermittently transmitting driving force from the lens driving motor 81 to the movable lens groups 32 and 33. The intermediate transmission mechanism 82 includes a cylindrical member 83, having an inner diameter larger than the maximum diameter of the movable lens groups 32 and 33, which is arranged to be rotatable about the optical axis OA, for moving the movable lens groups 32 and 33 along the optical axis OA in the interior of the cylindrical member 83.

Figure 16:
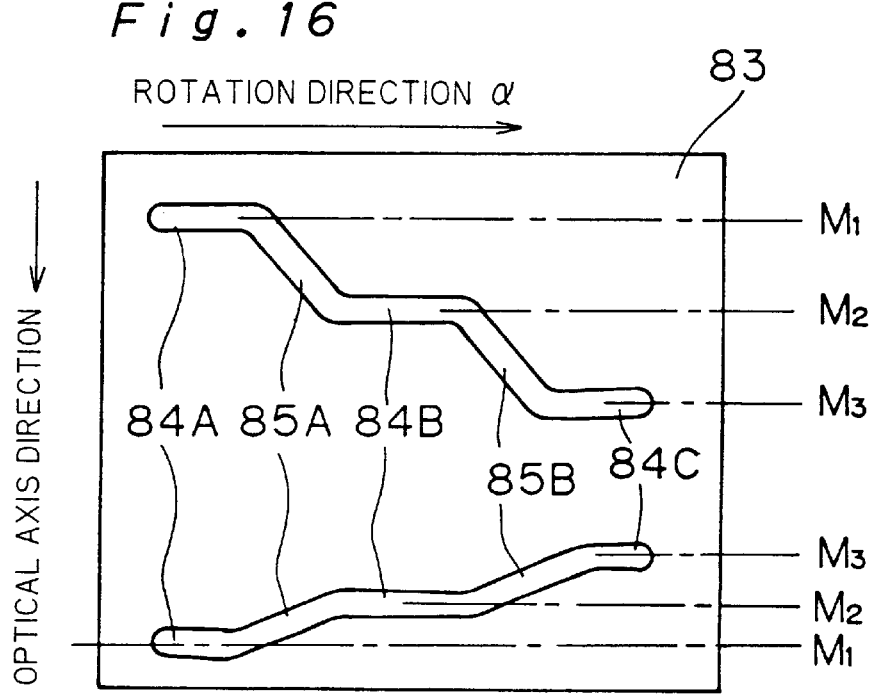
FIG. 16 is a development of a cylindrical member along a direction of rotation according to the first embodiment of the present invention.

FIG. 16 is a development of the cylindrical member 83 along the direction α of rotation. As shown in FIG. 16, three horizontal groove portions 84A, 84B and 84C extending in parallel with the direction α of rotation are provided on a side surface 83a of the cylindrical member 83 in correspondence to the magnification set positions M1 to M3 respectively. Further, inclined groove portions 85A and 85B are inclinedly provided with respect to the direction α of rotation, for interconnecting the horizontal groove portions 84A and 84B and the horizontal groove portions 84B and 84C with each other respectively.

Referring again to FIG. 14, the movable lens groups 32 and 33 are provided on edge portions thereof with follower parts 86 and 87 projecting toward the outer peripheries, so that forward end portions of the follower parts 86 and 87 are engaged with the horizontal groove portions 84A, 84B and 84C and the inclined groove portions 85A and 85B. When the lens driving motor 81 is operated, therefore, the cylindrical member 83 rotates about the optical axis OA along with gears 88 and 89, and the follower parts 86 and 87 slide along the horizontal groove portions 84A, 84B and 84C and the inclined groove portions 85A and 85B. Consequently, the movable lens groups 32 and 33 move toward the optical axis OA in response to an operation of the motor 81.

In the first embodiment having the aforementioned structure, the follower parts 86 and 87 are not displaced along the optical axis OA but the movable lens groups 32 and 33 remain in the original positions when the follower parts 86 and 87 are in the horizontal groove portions 84A, 84B and 84C, despite rotation of the cylindrical member 83. When the follower parts 86 and 87 are in the inclined groove portions 85A and 85B, on the other hand, the follower parts 86 and 87 are extremely displaced along the optical axis OA following rotating motion of the cylindrical member 83, resulting in remarkable movement of the movable lens groups 32 and 33. Thus, the driving force is transmitted from the motor 81 to the movable lens groups 32 and 33 when the movable lens groups 32 and 33 are located between the magnification set positions M1 and M3 due to the provision of the intermittent transmission mechanism 82, while such transmission of the driving force to the movable lens groups 32 and 33 is cut off when the movable lens groups 32 and 33 are located on the magnification set positions M1 to M3. Even if the amount of driving by the motor 81 is slightly varied with respect to the target control amount, therefore, the movable lens groups 32 and 33 can be correctly located on the magnification set positions M1 and M3. Thus, the images can he read in a proper magnification by locating the movable lens groups 32 and 33 on the magnification set positions M1 to M3 in response to the sizes of elements forming the images of the first and second revises PS1 and PS2, for comparing these images with each other and quickly and correctly inspecting the same.

While the range (for one frame) available for the color CCD camera 40 is changed when the magnification β of the optical system 30 is varied in the aforementioned manner, the control arithmetic unit 61 calculates the amounts of movement of the color CCD camera 40 in the X and Y directions in response to the variation of the magnification β for adjusting the amounts of movement according to the first embodiment.

While the image inspection apparatus according to the first embodiment is adapted to read images of a plurality of image recording media consisting of the first and second revises PS1 and PS2 for comparing the images with each other and inspecting the same, the term "image recording media" is not restricted to proof sheets, but also directed to original plate films and press plates.

The proof reading may not be completed in the stage of the second revise PS2 but a third revise PS3 may be required as shown in FIG. 55. In this case, the "plurality of image recording media" may be formed by the second and third revises PS2 and PS3.

In case of preparing a reference from a proof sheet while preparing an object from an original plate film corrected on the basis of the proof sheet, a press plate obtained by performing exposure/development through the original plate film and a proof sheet printed through the press plate, comparing images on the reference and the object with each other for detecting mismatching portions of the images and displaying the same, obtained is such a specific effect that not only correction errors but various errors caused after formation of the original plate film and before printing can be inspected.

While the cylindrical member 83 is provided with the groove portions 84A to 84C, 85A and 85B and the intermediate transmission mechanism 82 is formed by improving a cylindrical cam mechanism engaging the follower parts 86 and 87 with the groove portions 84A to 84C, 85A and 85B, the structure of the intermittent transmission mechanism is not restricted to this but a general intermittent transmission mechanism can be employed.

<1-3. Plate Inspection Processing>

The aforementioned plate inspection processing (step S4 in FIG. 5) is now described in further detail.

The flow chart of FIG. 10 shows an outline of the plate inspection processing at the step S4 of FIG. 5. The plate inspection processing is now described in more detail with reference to FIG. 10.

At a step S401, the operator inputs plate inspection conditions in accordance with the following input items displayed on the color CRT 62:

Threshold Values: The operator specifies threshold values of color tones for respective color components for determining the difference between the images of the first and second revises as described later in detail.

Dust Removal Size: The operator specifies the threshold value of the size of a block of difference data for identifying whether the difference between the first and second revises in units of pixels described later comes into question in printing or mere irregular printing or the like.

Display Format: The operator specifies the display format by combining "whether or not the first and second different images are displayed in a superposed manner" with "display only an image appearing in the second revise alone", "display only an image disappearing in the second revise" or "display both" among the difference between the images of the first and second revises.

Display Method: The operator specifies the display method by combining "whether or not the display is enhanced" and "negative or positive display" in case of selecting "the first revise and the different image are not displayed in a superposed manner" in the selected item for the display format.

Display Color: The operator specifies the display color for matching images at any of "full color, while mask and monochrome" while specifying the display color for the different images at any of "full color, monochrome, red, green and blue".

Framing: The operator specifies the display color and the display format for the frame displayed in superposition on the different images.

Thus, the step S401 is completed.

At a step S402, the apparatus 1 obtains difference data between the first and second revises while locally matching the images thereof every small section.

Figure 17:
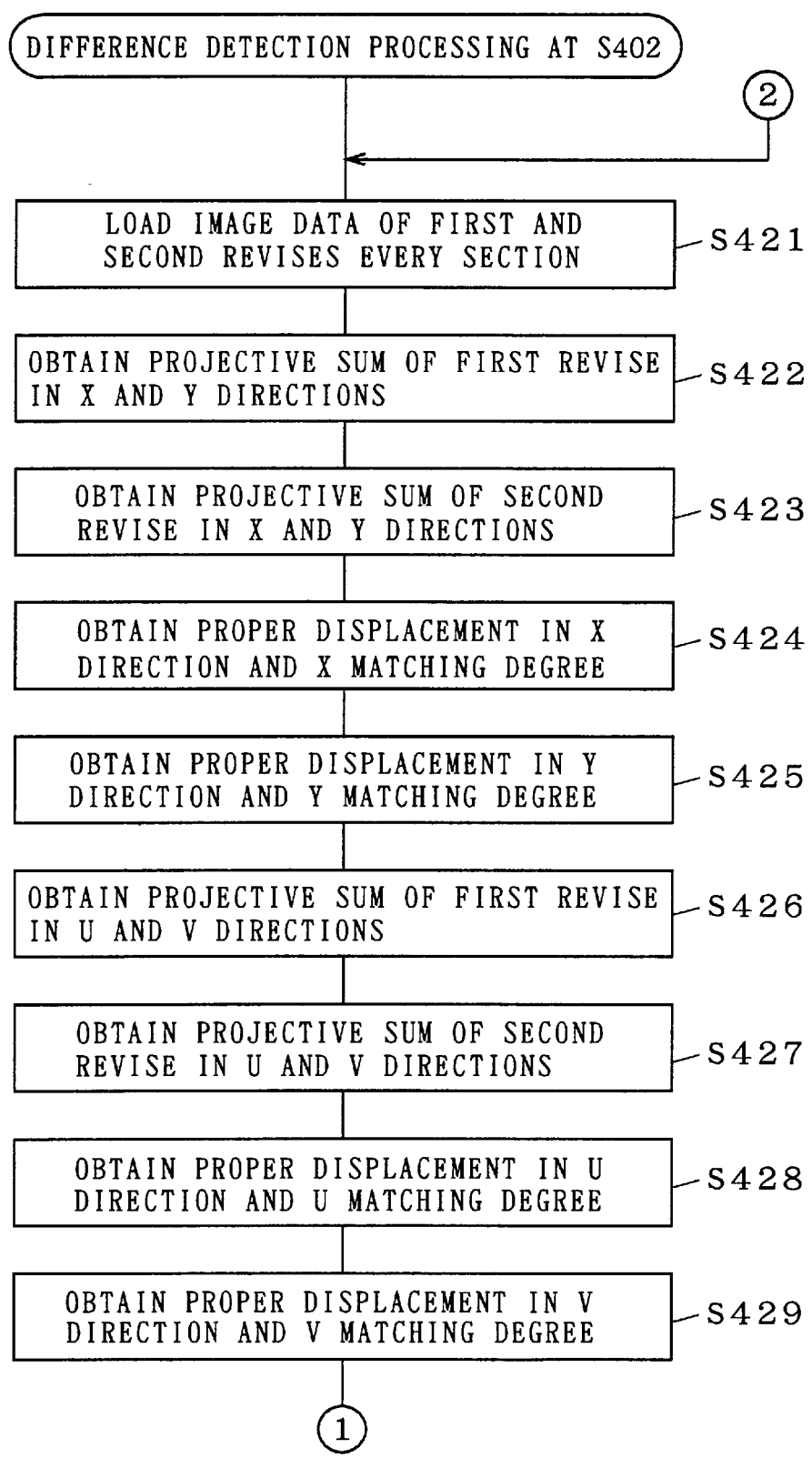
FIG. 17 is a flow chart showing difference detection processing according to the first embodiment of the present invention.
Figure 18:
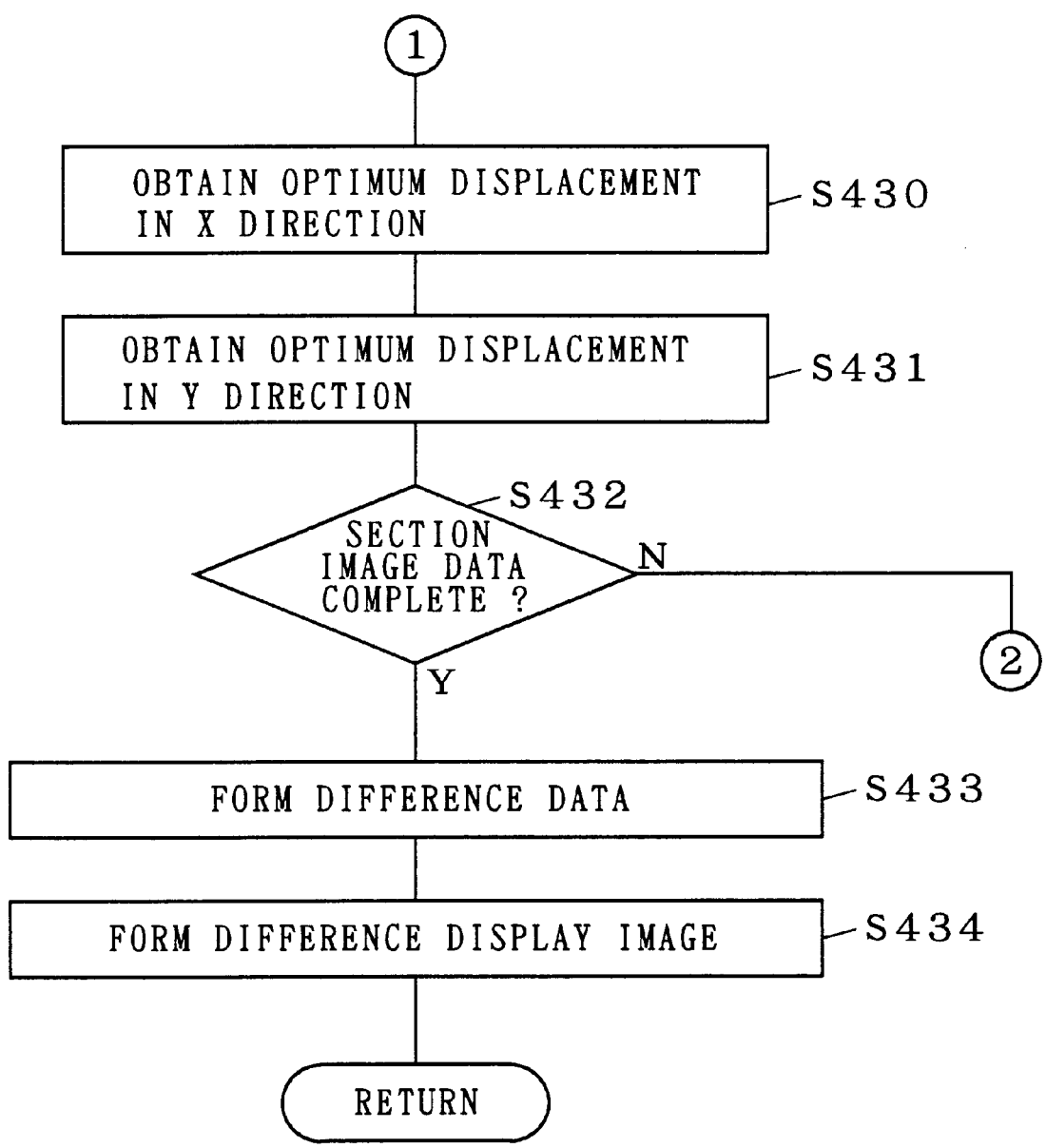
FIG. 18 is a flow chart showing the difference detection processing according to the first embodiment of the present invention.

FIGS. 17 and 18 are flow charts showing difference detection processing. The difference detection processing is now described along the flow charts.

At a step S421, the apparatus 1 loads the image data of the first and second revises in the memory of the control arithmetic unit 61 every section.

Figure 19:
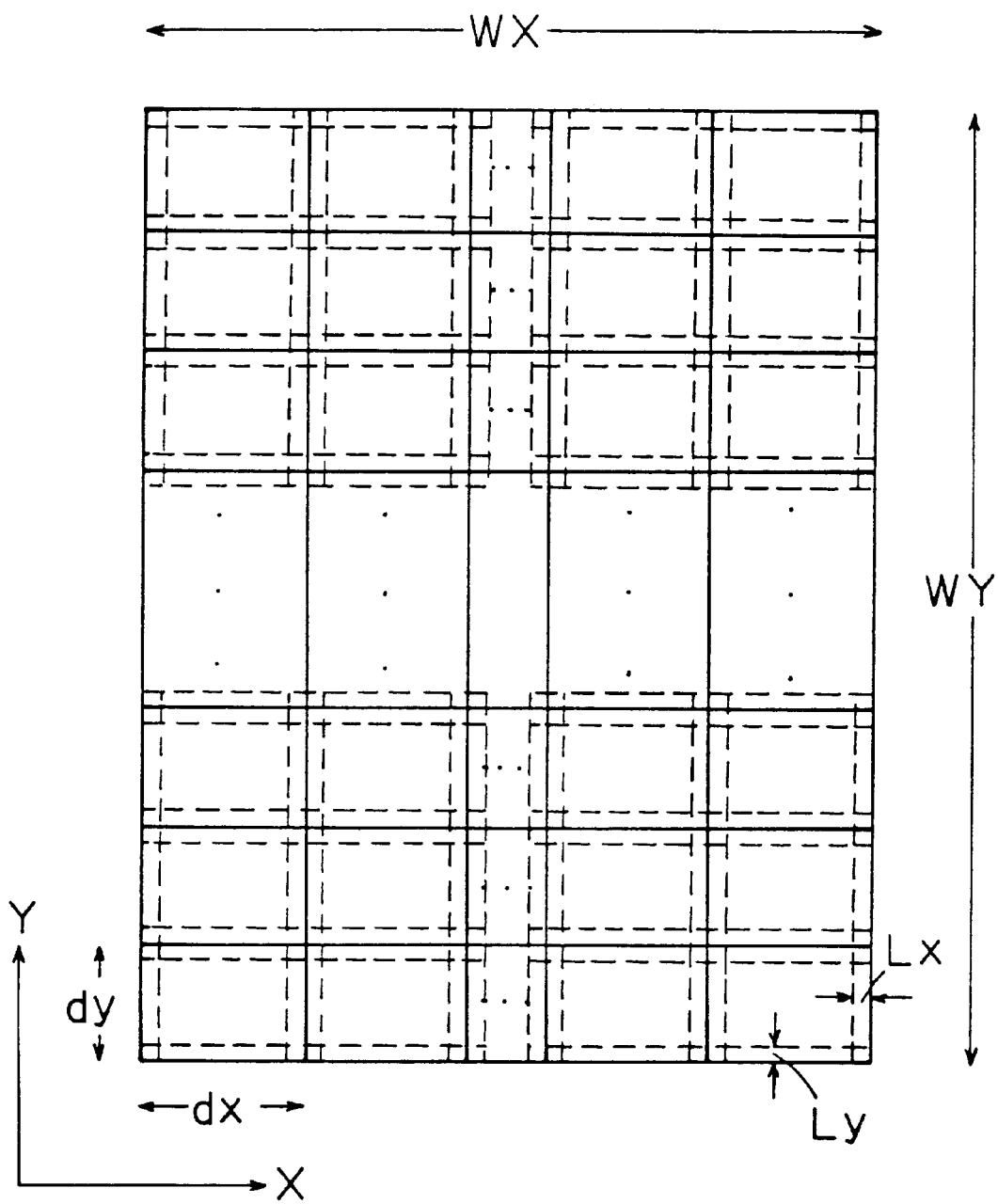
FIG. 19 is an explanatory diagram of image division of first and second revises according to the first embodiment of the present invention.

FIG. 19 is an explanatory diagram for image division of the first and second revises. In the following explanatory diagrams etc., X-Y coordinate systems are provided in the planes of the figures.

The first and second revises are divided into the same sections, stored in the memory, and read by the CPU of the control arithmetic unit 61 at need, to be subjected to processing such as local matching. The CPU performs following processing in a software manner.

The local matching is adapted to compare section images of the first and second revises about rectangular sections having vertical and transverse sizes dy and dx respectively divided by solid lines in FIG. 19. In this local matching, the apparatus 1 displaces relative positions of the first and second revises every section for obtaining the most matching displacement. In practice, therefore, the memory stores image data of areas larger by widths Lx and Ly in the X and Y axis directions every section as to both images, as shown by dotted lines outside the sections. As to outer peripheral portions of the entire image, however, the apparatus 1 synthesizes plain image data with no images by similar widths and stores the same in the memory. The apparatus 1 loads the image data of the overall sections of the first and second revises in the memory in the aforementioned manner, to complete the step S421.

At a step S422, the apparatus 1 obtains the following projective sums on the basis of the section image data of the first revise loaded at the step S421.

Figure 20:
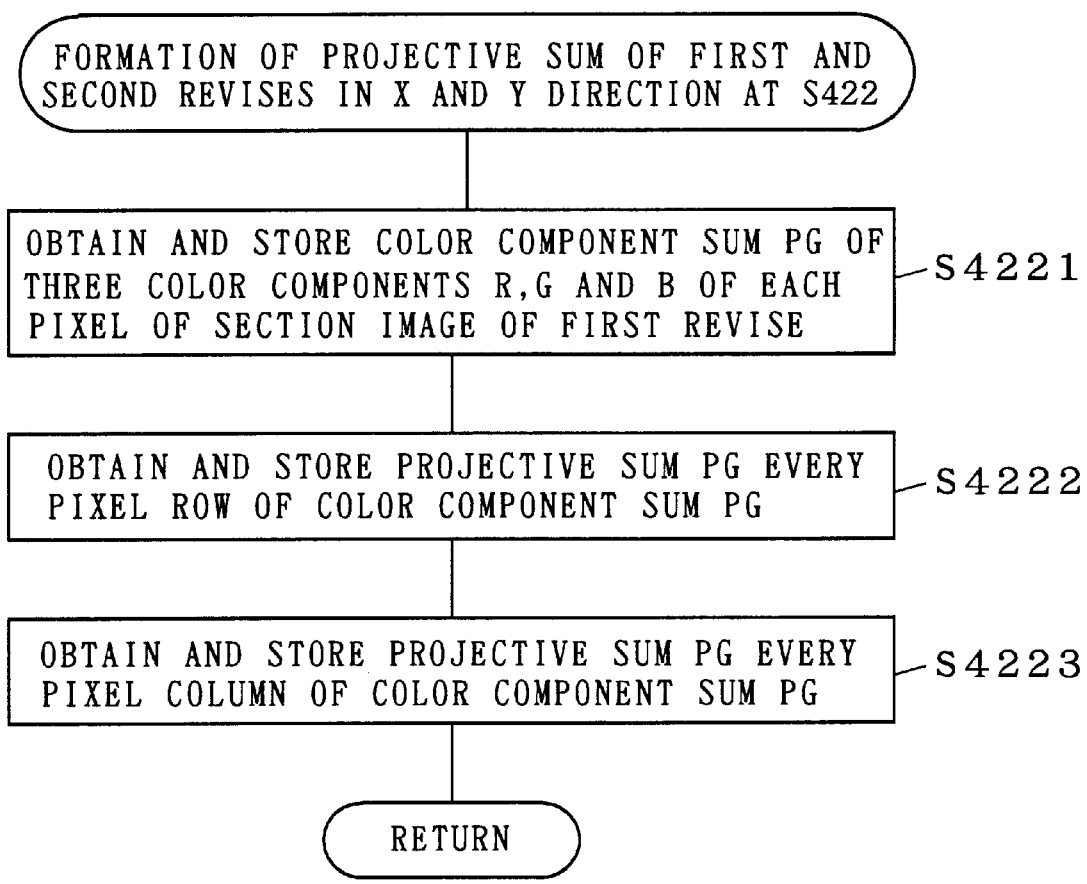
FIG. 20 is a flow chart showing projective sum formation processing for the first revise in X and Y directions according to the first embodiment of the present invention.

FIG. 20 is a flow chart showing processing of forming projective sums of the first revise in the X and Y directions. This flow chart shows the processing at the step S422 in more detail.

FIGS. 21A to 21E are explanatory diagrams of formation of the projective sums of the first and second revises in the X and Y directions. Along the flow chart shown in FIG. 20, the processing at the step S422 is now described with reference to FIGS. 21A to 21E.

At a step S4221, the apparatus 1 obtains color component sums PG by adding up the respective color components R, G and B every pixel in each section of the first revise and preserves the same in the memory.

At a step S4222, the apparatus 1 obtains a projective sum PX as to each pixel row (described later) of the color component sums PG obtained at the step S4221 and stores the same in the memory. FIG. 21A shows an exemplary section image on the left lower corner of the entire image shown in FIG. 19. The arrangement of the pixels in the section image in the X-axis direction shown in FIG. 21A is defined as the pixel row, and that in the Y direction is defined as a pixel column. FIG. 21B shows a waveform of the projective sum PX obtained by adding up the color component sums PG of the each pixel obtained as to this section image every pixel row.

At a step S4223, the apparatus 1 obtains a projective sum PY by adding up color component sums PG of each pixel every pixel column in a similar manner to the above, and stores the same in the memory. FIG. 21C shows a waveform of the projective sum PY. When this processing is completed, that at the step S422 in FIG. 17 is completed.

At a step S423 shown in FIG. 17, the apparatus 1 obtains projective sums SX and SY in the X- and Y-axis directions with respect to the image of each section of the second revise. This processing is similar to that at the step S422. FIGS. 21E and 21F show waveforms of the projective sums every pixel row and every pixel column respectively.

Figure 22:
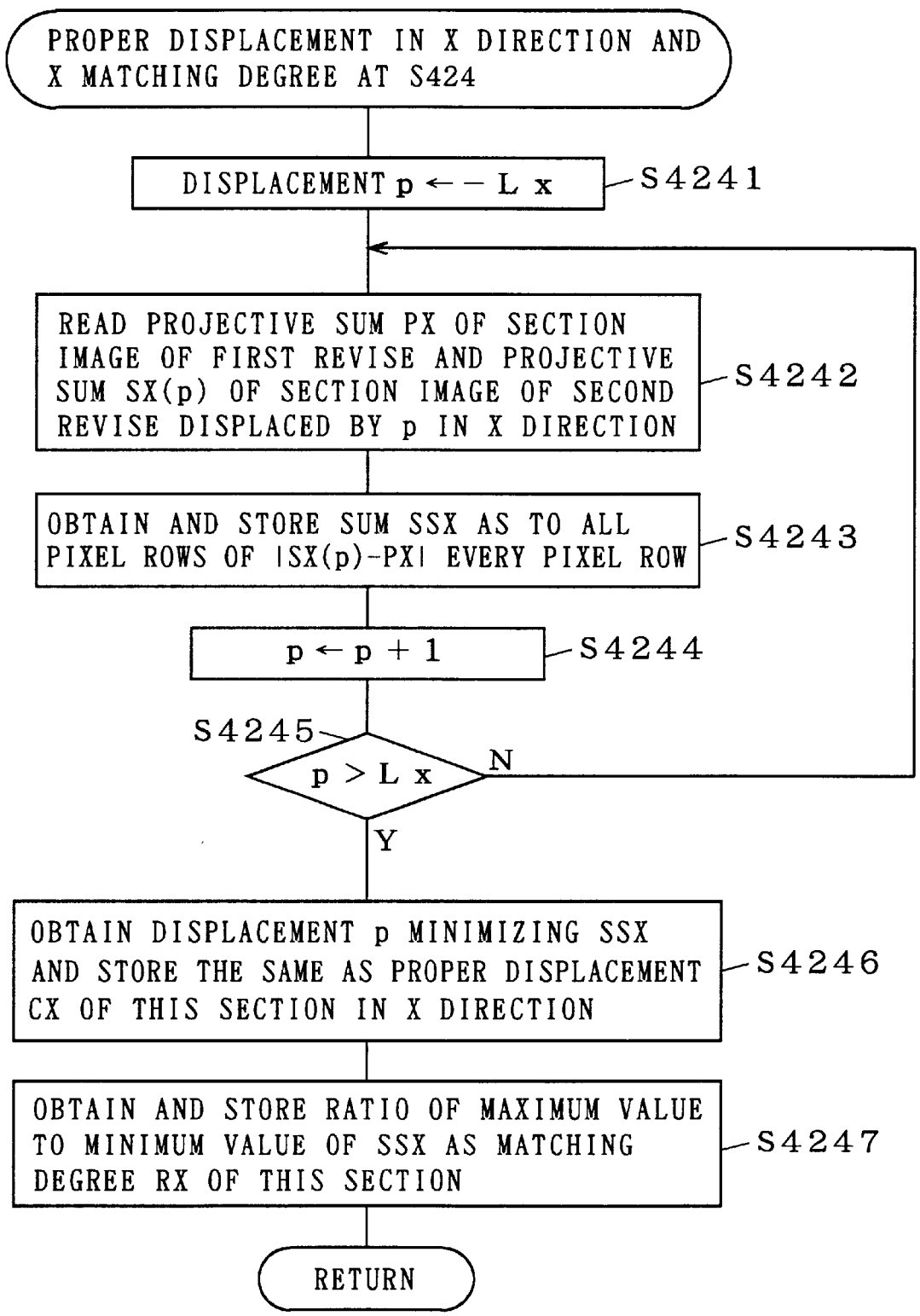
FIG. 22 is a flow chart showing processing of forming a proper displacement in the X direction and a matching degree according to the first embodiment of the present invention.
Figure 23:
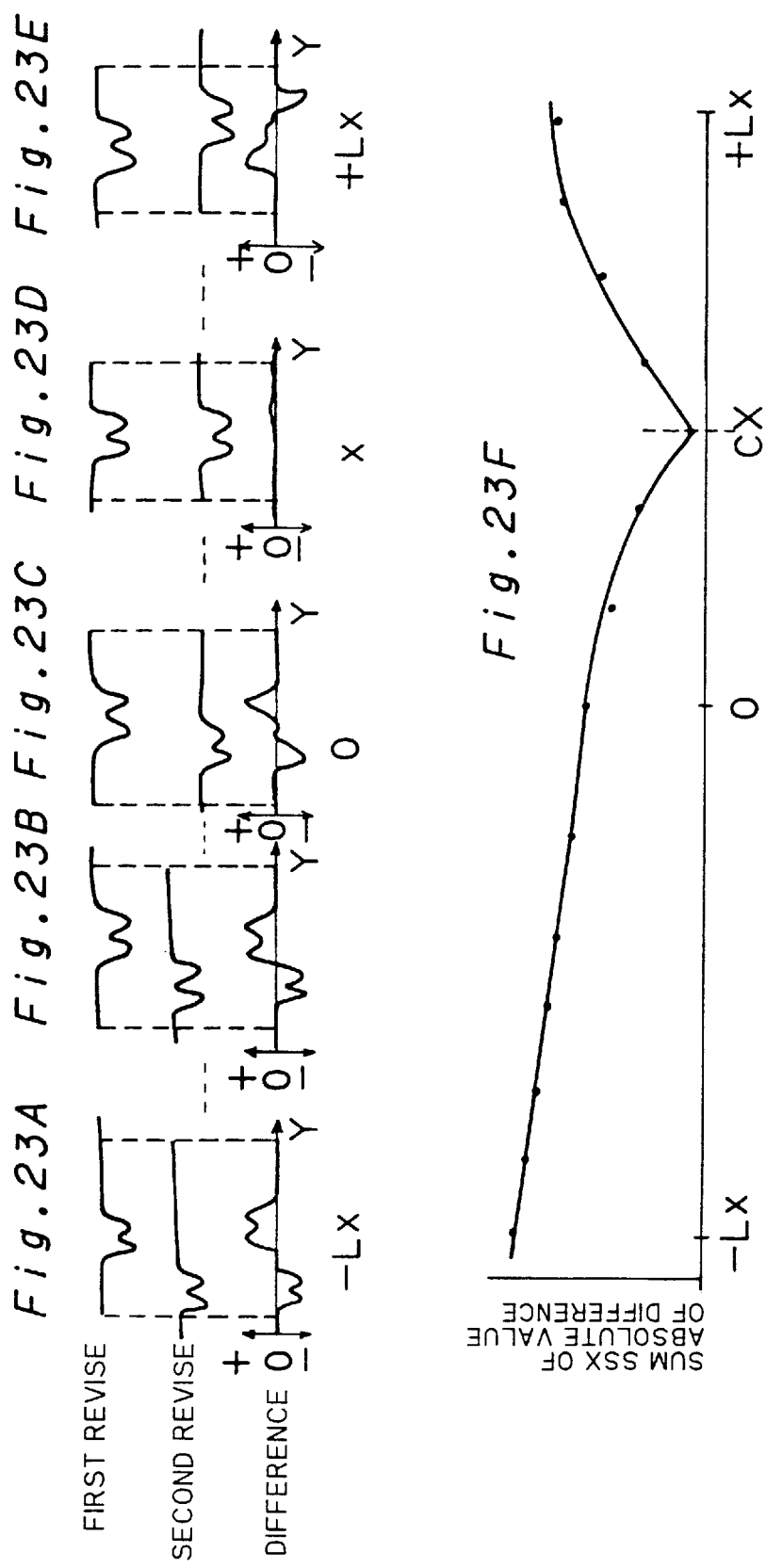
FIGS. 23A to 23F are explanatory diagrams showing processing of proper displacement decision in the X direction according to the first embodiment of the present invention.

At a step S424, the apparatus 1 obtains a proper displacement in the X direction and an X matching degree. FIG. 22 is a flow chart showing the processing of forming the proper displacement in the X direction and the X matching degree performed at the step S424. The processing at the step S424 is now described with reference to the flow chart.

At a step S4241, the apparatus 1 substitutes −Lx as an initial value of a displacement p for displacing each section image of the second revise for locally matching the same with that of the first revise.

At a step S4242, the apparatus 1 reads the projective sum PX of the section obtained at the step S422 of FIG. 17 and a projective sum SX(p) obtained by displacing the image of the section obtained at the step S423 by the displacement p in the X direction from the memory. At a step S4243, the apparatus 1 obtains the absolute value of the difference between the projective sums SX(p) and PX of the second and first revises every pixel row, and adds the same to all pixel rows in the section.

At a step S4244, the apparatus 1 adds "1" to the displacement p. At a step S4245, the apparatus 1 determines whether or not the displacement p is larger than the maximum value Lx, to return to the step S4242 if the former is equal to or smaller than the latter, while advancing to a step S4240 if the former is larger than the latter.

FIGS. 23A to 23F are explanatory diagrams showing processing of proper displacement decision in the X direction. It comes to that the apparatus 1 carries out processing of obtaining the absolute value of the difference between each section image of the first revise and the projective sum SX(p) of the second revise displaced by the displacement p obtained at the step S4242 every pixel row and taking a sum SSX with respect to each displacement p in the range of −Lx to Lx by the processing at the steps S4242 to S4245, as shown in FIGS. 23A to 23E.

At a step S4246, the apparatus 1 obtains a displacement p minimizing the sum SSX, for regarding the same as a proper displacement CX of this section in the X-axis direction and storing the same in the memory. FIG. 23F shows this state, by plotting sums SSX with respect to different displacements p. The apparatus 1 stores the displacement p minimizing the sum SSX in the memory as the proper displacement CX, as shown in FIG. 23F.

At a step S4247, the apparatus 1 obtains the ratio of the maximum value to the minimum value of the sum SSX as an X matching degree RX, and stores the same in the memory. The processing at the step S424 in FIG. 17 is completed due to completion of this processing.

At a step S425 in FIG. 17, the apparatus 1 takes the sum SSY of the absolute values of the differences between the projective sums in the Y-axis direction similarly to the processing at the step S424, and obtains a proper displacement CY minimizing the sum SSY and a Y matching degree RY.

Figure 24:
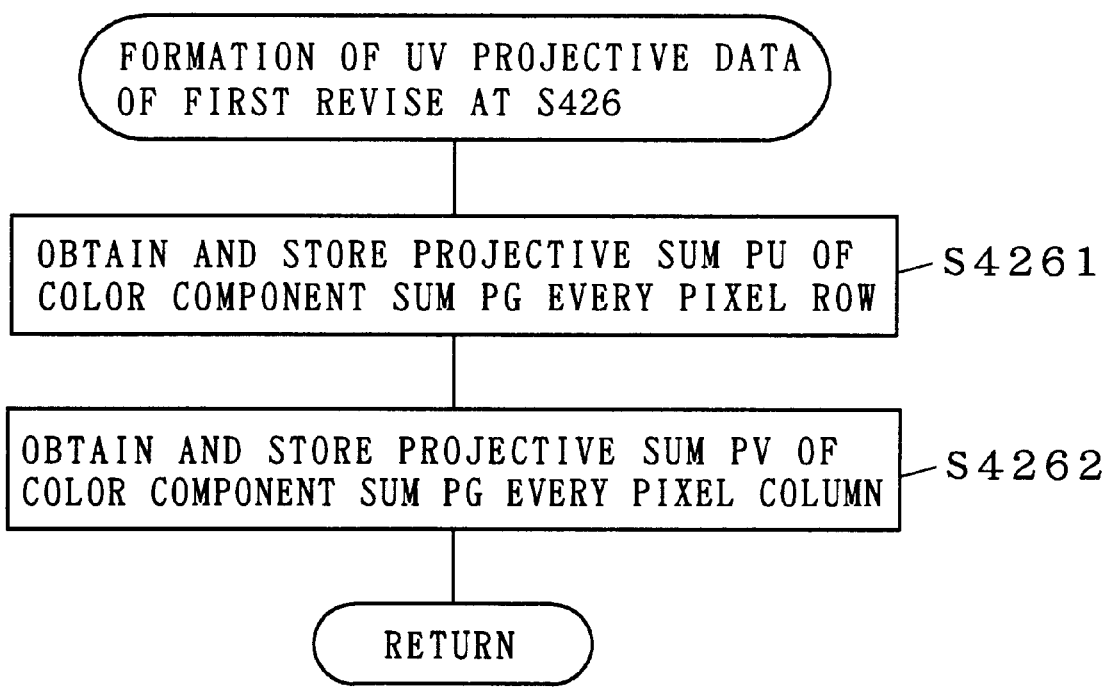
FIG. 24 is a flow chart showing processing of forming projective sums of the first revise in U and V directions according to the first embodiment of the present invention.
Figure 25A:
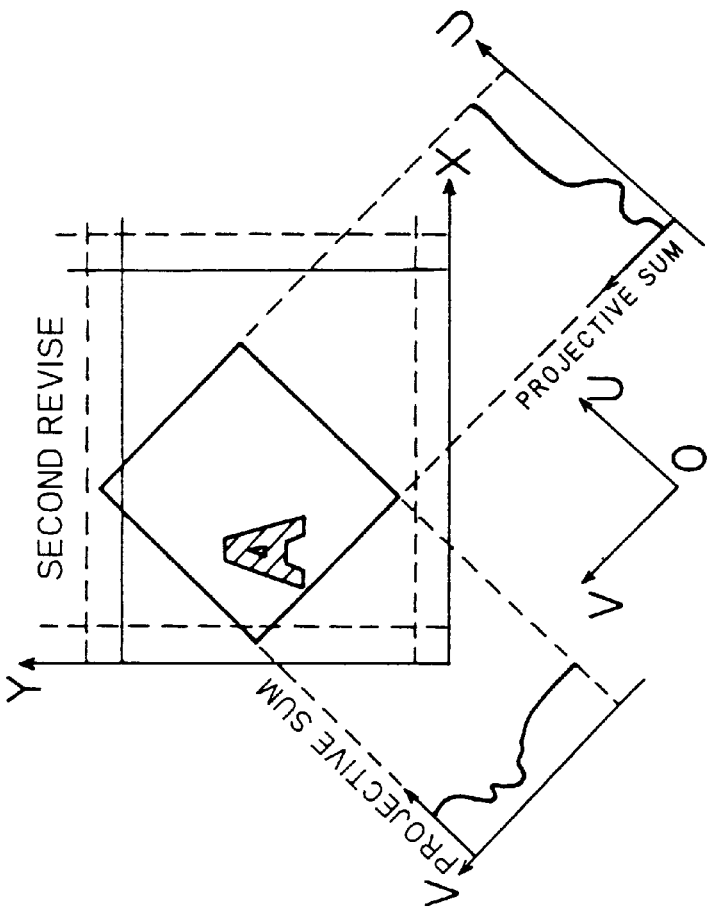
FIGS. 25A and 25B are explanatory diagrams for projective sum formation for the first and second revises in the U and V directions according to the first embodiment of the present invention.
Figure 25B:
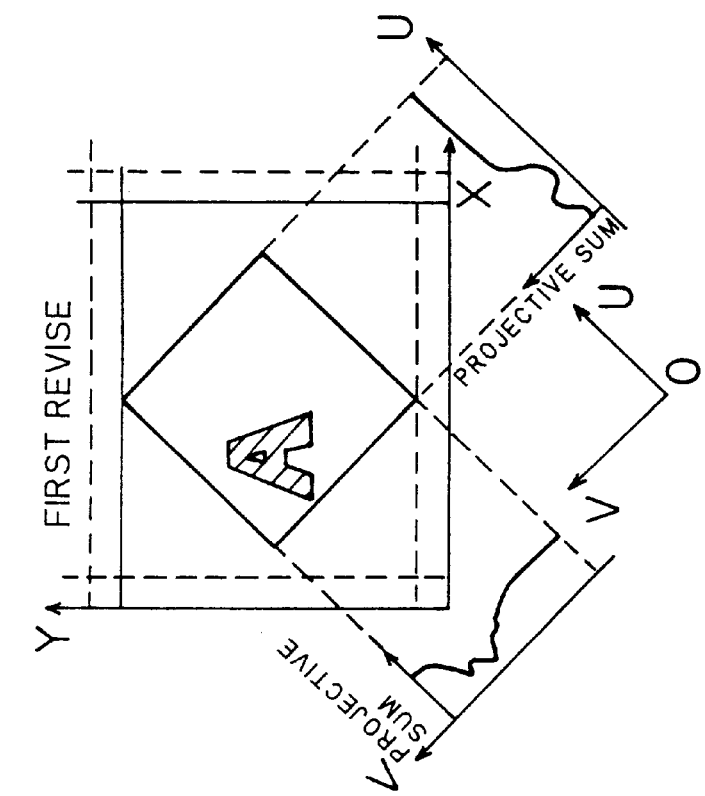

Then, the apparatus 1 advances to a step S426. The processing at the step S426 is shown in a flow chart of FIG. 24 showing processing of forming projective sums of the first revise in the U- and V-axis directions. FIGS. 25A and 25B are explanatory diagrams for the projective sum formation of the first and second revises in the U- and V-axis directions. As shown in FIGS. 25A and 25B, the apparatus 1 performs processing similar to that on the coordinate system X-Y on a coordinate system U-V rotating by 45° anticlockwise with respect to the aforementioned coordinate system X-Y. Namely, the apparatus 1 considers a square area which is in contact on its vertices with upper and lower sides of each rectangular section of the vertical and transverse sizes dy and dx in each section image of the first revise, and obtains projective sums PU and PV in the U and V directions with respect to this area. In upper and lower end sections of the entire image in the Y-axis direction, however, it is assumed that the apparatus 1 obtains projective sums PU and PV in square areas which are inscribed on vertices thereof with areas narrowed downward and upward from upper and lower ends thereof by widths Ly respectively. FIGS. 25A and 25B show an exemplary section on the left lower corner of the entire image. At a step S427, the apparatus 1 similarly obtains projective sums SU and SV in a section image of the second revise in the U and V directions.

Figure 26:
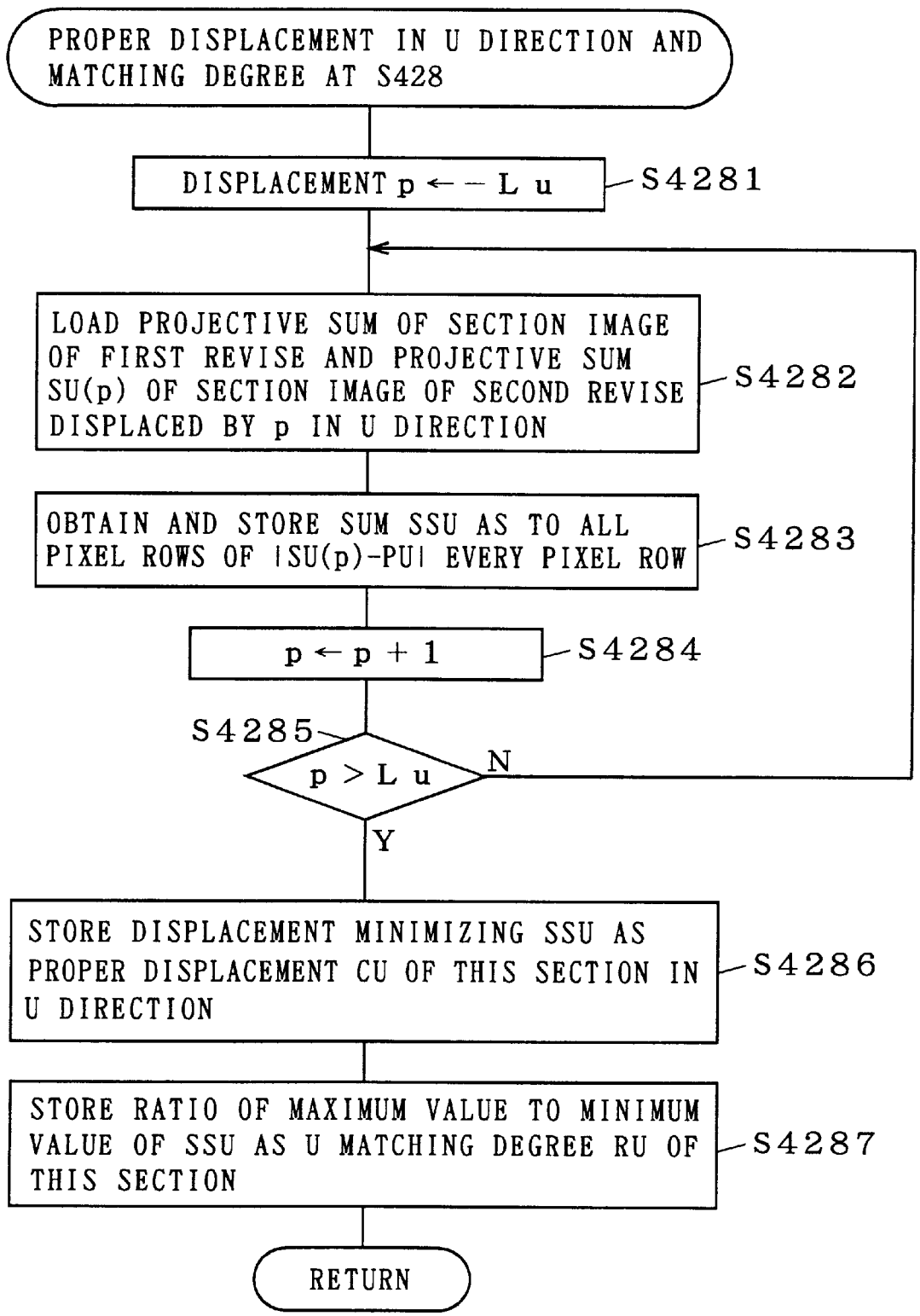
FIG. 26 is a flow chart showing processing of forming a proper displacement in the U direction and a matching degree according to the first embodiment of the present invention.

Then, the apparatus 1 advances to a step S428. FIG. 26 is a flow chart showing processing of forming a proper displacement in the U direction and a matching degree at a step S428 in detail. As understood from this flow chart, the apparatus 1 performs local matching in the U-axis direction similarly to that at the step S424, for obtaining a proper displacement CLJ in the U-axis direction and a U matching degree RU. In this case, however, it is assumed that the displacement p is displaced in the range of −Lu to Lu, and the maximum value Lu of this displacement is expressed as Lu=Lx/2.

At a step S429, the apparatus 1 performs processing of forming a proper displacement CV in the V direction and a V matching degree RV, similarly to that at the step S428. However, it is assumed that the displacement p is displaced in the range of −Lv to Lv, and the maximum value Lv of this displacement is expressed as Lv=Ly/2.

Figure 27:
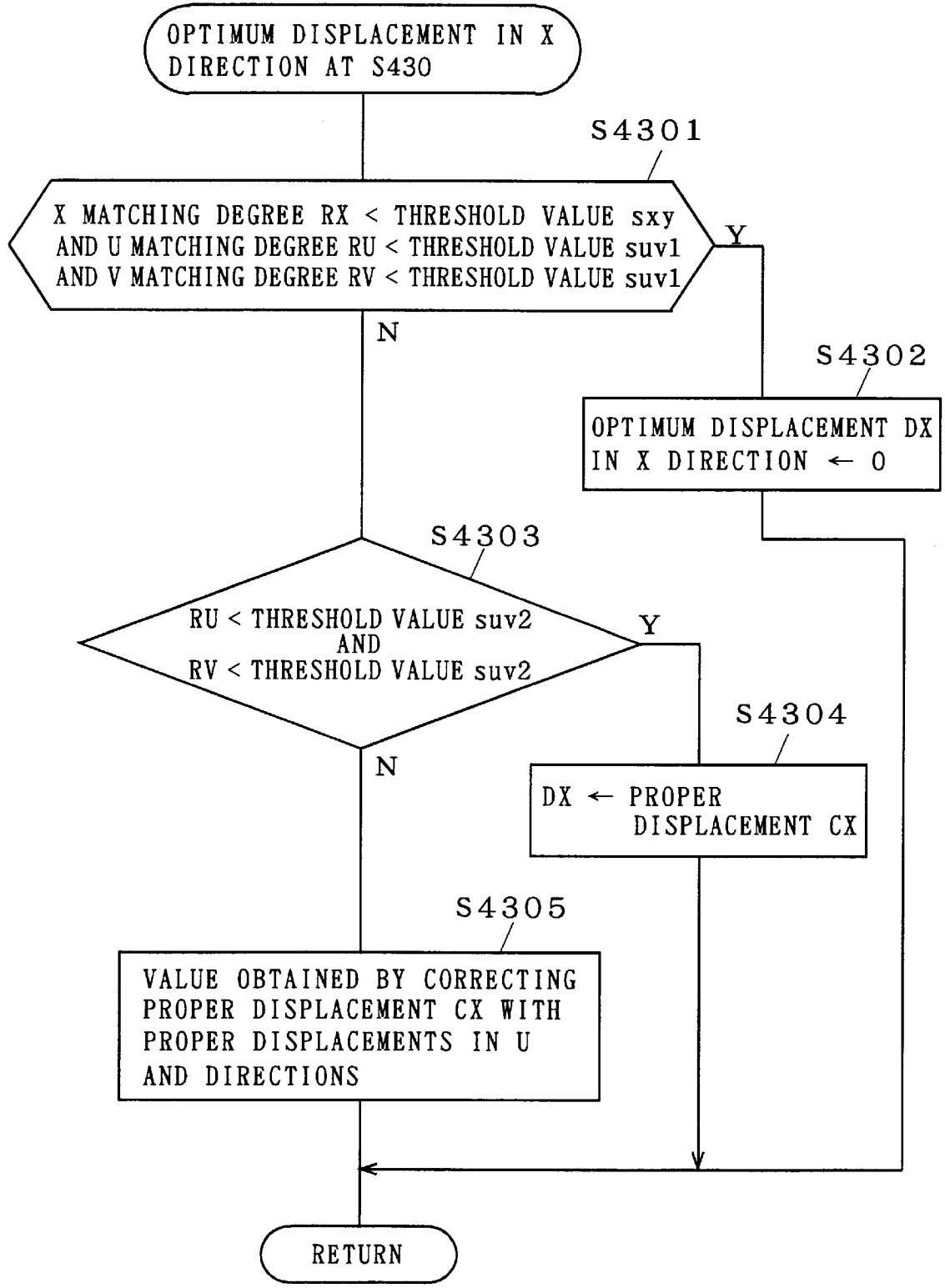
FIG. 27 is a flow chart showing processing of deciding an optimum displacement in the X direction according to the first embodiment of the present invention.

Then, the apparatus 1 advances to a step S430 in FIG. 18. FIG. 27 is a flow chart showing processing of deciding an optimum displacement in the X direction at the step S430 in detail. Referring to this flow chart, threshold values for respective matching degrees are previously stored in the magnetic disk 73 and read in the memory of the control arithmetic unit 61.

At a step S4301, the apparatus 1 determines appropriateness of the X, U and V matching degrees RX, RU and RV, for advancing to a step S4302 if the X matching degree RX is smaller than a threshold value sxy for the X and Y matching degrees, the U matching degree RU is smaller than a first threshold value suv1 for the U and V matching degrees and the V matching degree RV is smaller than the threshold value suv1, otherwise advancing to a step S4303. The threshold values sxy and suv1 are selected from those larger but not excessively larger than "1" respectively.

At the step S4302, the apparatus 1 assumes that local matching is impossible and zeros the optimum displacement in the X direction since this corresponds to such case that local matching of the section images of the first and second revises in the proper displacement CX in the X-axis direction exhibits rather inferior matching and local matching in the U and V directions also exhibits rather inferior matching, as understood from the fact that the X, U and V matching degrees RX, RU and RV are not much large.

On the other hand, advancement to the step S4303 corresponds to such case that any of the X, U and V matching degrees RX, RU and RV exhibits excellent matching. At the step S4303, the apparatus 1 determines the U and V matching degrees again. The apparatus 1 advances to a step S4303 if the U matching degree RU is smaller than a second threshold value suv2 and the V matching degree RV is smaller than the threshold value suv2, otherwise advancing to a step S4305. The threshold value suv2 is selected from those larger than the threshold value suv1.

Advancement to the step S4303 corresponds to such case that both the U and V matching degrees RU and RV are smaller than the threshold value suv2 and the local matching in the U and V directions exhibits rather inferior matching.

In this case, the apparatus 1 regards the proper displacement CX obtained as the result of the local matching in the X direction as an optimum displacement DX.

Figure 28:
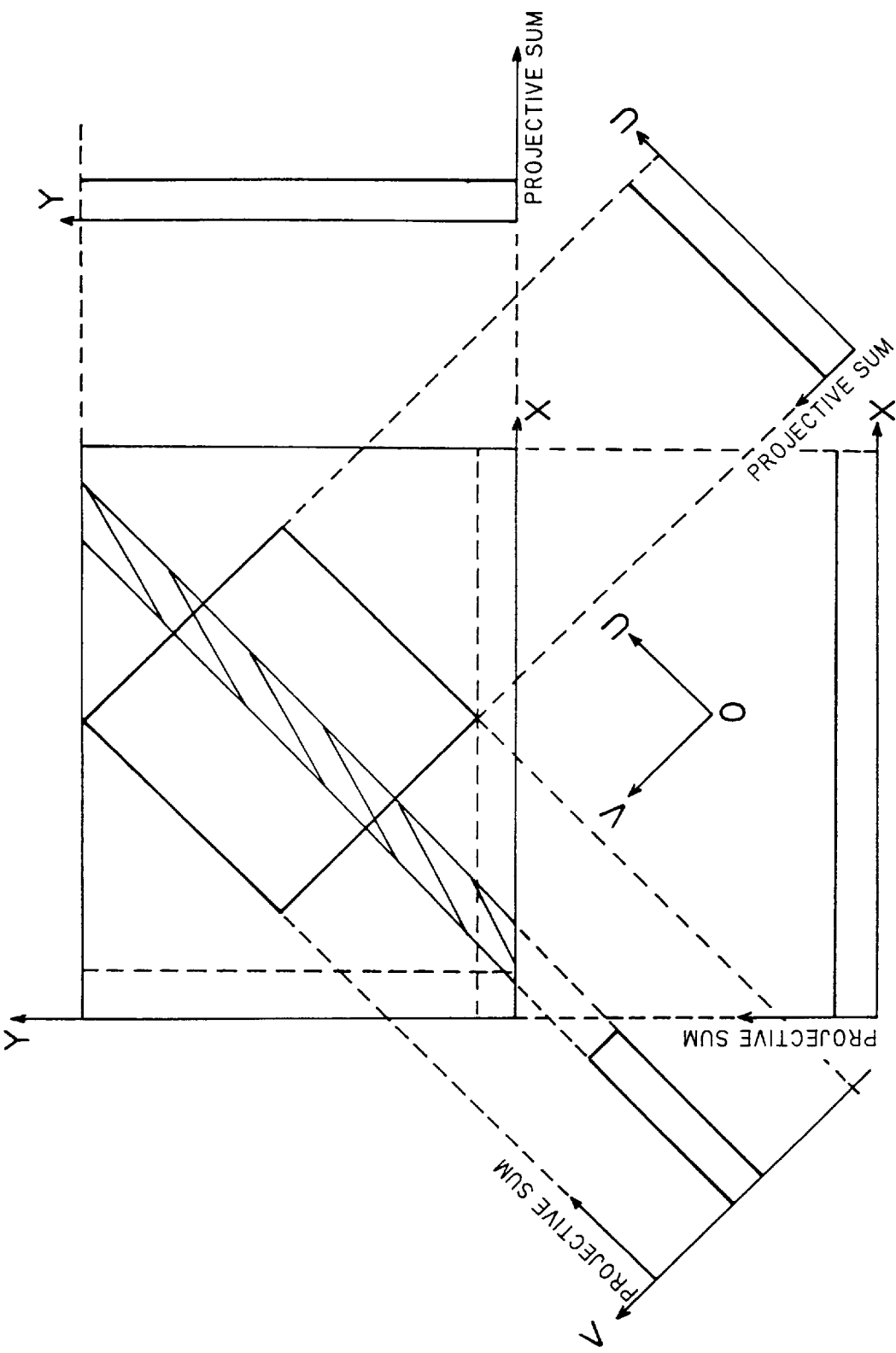
FIG. 28 is an explanatory diagram showing an operation in case of effective correction by projective sums in the U and V directions according to the first embodiment of the present invention.

At the step S4305, on the other hand, the apparatus 1 regards a value obtained by adding projections of the proper displacements CU and CV in the U and V directions to the proper displacement CX in the X direction as an optimum displacement DX in the X direction. The optimum displacement DX can be further correctly obtained by thus correcting the optimum displacement DX in the X direction. FIG. 28 shows a remarkable example thereof.

FIG. 28 is an explanatory diagram showing effective correction by projective sums in the U and V directions, with only an image linearly extending in directions of about 45° provided in a section image. In this section, the projective sum SX(p) in the X direction is equal along the overall pixel rows, and hence the minimum and maximum values of the sum SSX are substantially equal to each other at the step S424 in FIG. 17 and correct local matching cannot be performed, while a clear peak appears in the projective sum in the V direction. Thus, a proper displacement in the V direction is clearly obtained and the matching degree RV in the V direction is at a high value, whereby correction of the optimum displacement by this is effective.

The processing at the step S430 is completed upon the aforementioned completion of the step S4302, S4304 or S4305.

Processing of deciding an optimum displacement in the Y direction at a step S431 of FIG. 18 is similar to that at the step S430.

Then, the apparatus 1 determines whether or not all sections of the first and second revises are completely processed at a step S432 in FIG. 18, and returns to the step S421 if the processing is not completed, for shifting to processing of the next section. If the processing is completed, on the other hand, the apparatus 1 shifts to processing at a step S433.

Figure 29:
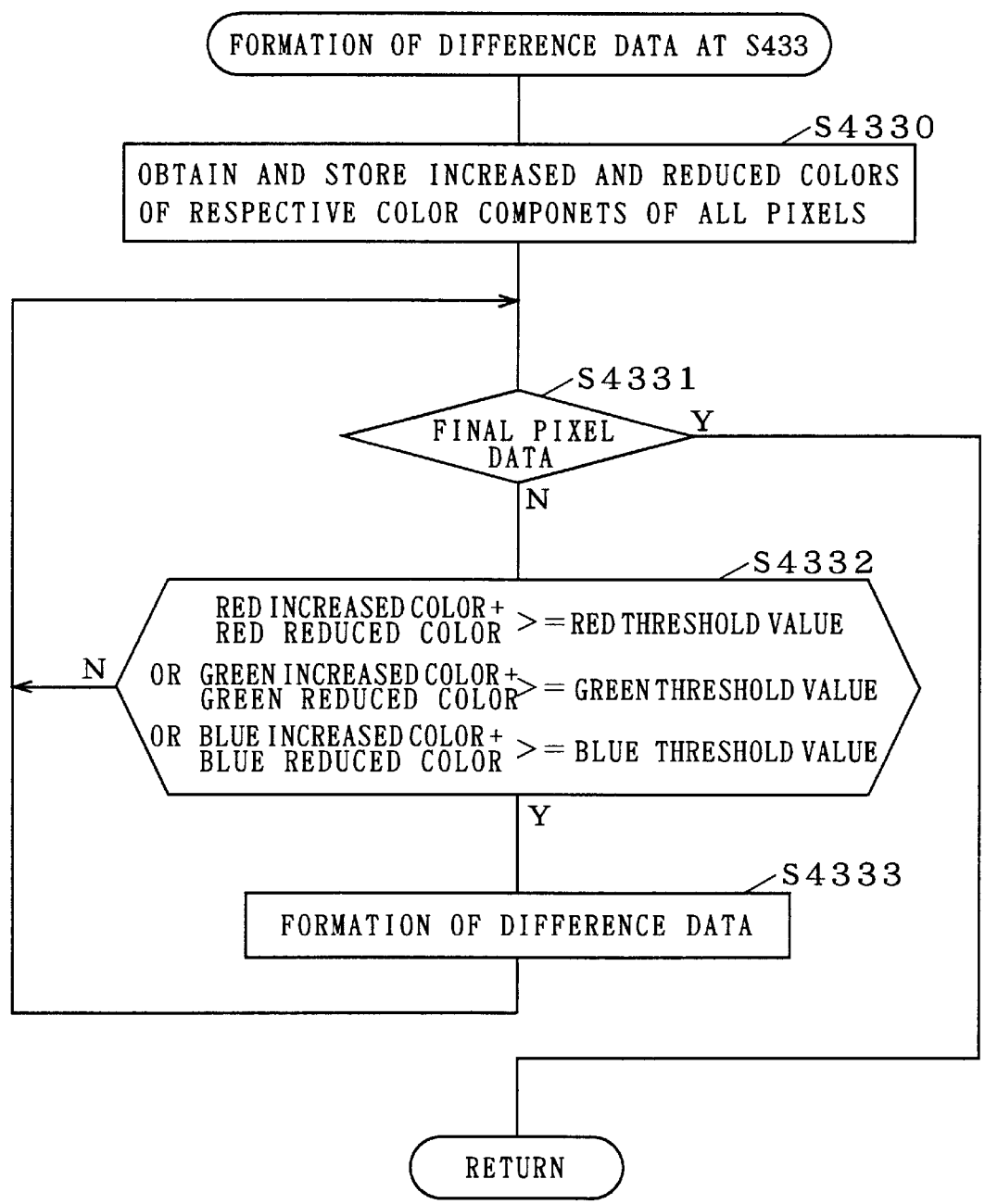
FIG. 29 is a flow chart showing processing of forming difference data according to the first embodiment of the present invention.

At the step S433, the apparatus 1 produces difference data indicating positions of difference between the images of the first and second revises. FIG. 29 is a flow chart showing the processing of producing the difference data at the step S433 in more detail. FIGS. 30A to 30C are explanatory diagrams for the processing of producing the difference data.

When the first and second revises are different from each other as shown in FIGS. 30A and 30B, the difference data shows positions provided with the different parts of the images as shown in FIG. 30C. While pixel data of the first and second revises have the respective color components R, G and B, the difference data prepares areas varied with the pixels on the memory for storing "0" and "1" in areas corresponding to pixels having no difference and those having the difference respectively. "0" is stored in all areas as initial values.

With reference to FIG. 29, the processing at the step S433 is now described in detail.

At a step S4330, the apparatus 1 relatively slides the first revise and the second revise every section corresponding to each other by the respective optimum displacements in the X and Y directions, so that all pixels of the first and second revises correspond to each other. The apparatus 1 then stores color components of pixels present in the second revise but absent on the first revise as increased colors while storing color components of pixels present in the first revise but absent in the second revise as reduced colors for the respective color components R, G and B from the images of all these pixels of the first and second revises.

Then, the apparatus 1 determines whether or not the below processing is completed for all pixels at a step S4331, for completing the processing at the step S433 if the processing is completed for all pixels. Otherwise the apparatus 1 compares the sums of the increased and reduced colors of the respective color components of the pixels and the threshold values of the color components R, G and B inputted at the step S401 in FIG. 10 at a step S4332, and stores "1" in areas of the memory corresponding to the pixels at a step S4333 if any sum is larger than the threshold values. If the sums of all color components are not more than the threshold values, on the other hand, the apparatus 1 returns to the step S4331 for loading next pixel data. The processing at the step S433 is completed when the aforementioned processing is completed for all pixels as described above.

Then, the apparatus 1 obtains entire image data of displayed colors of difference display images inputted at the step S401 from the difference data obtained every section at the step S434 in FIG. 18 and stores the same in the memory. Thus, the processing at the step S402 in FIG. 10 is completed.

Figures 31, 32:
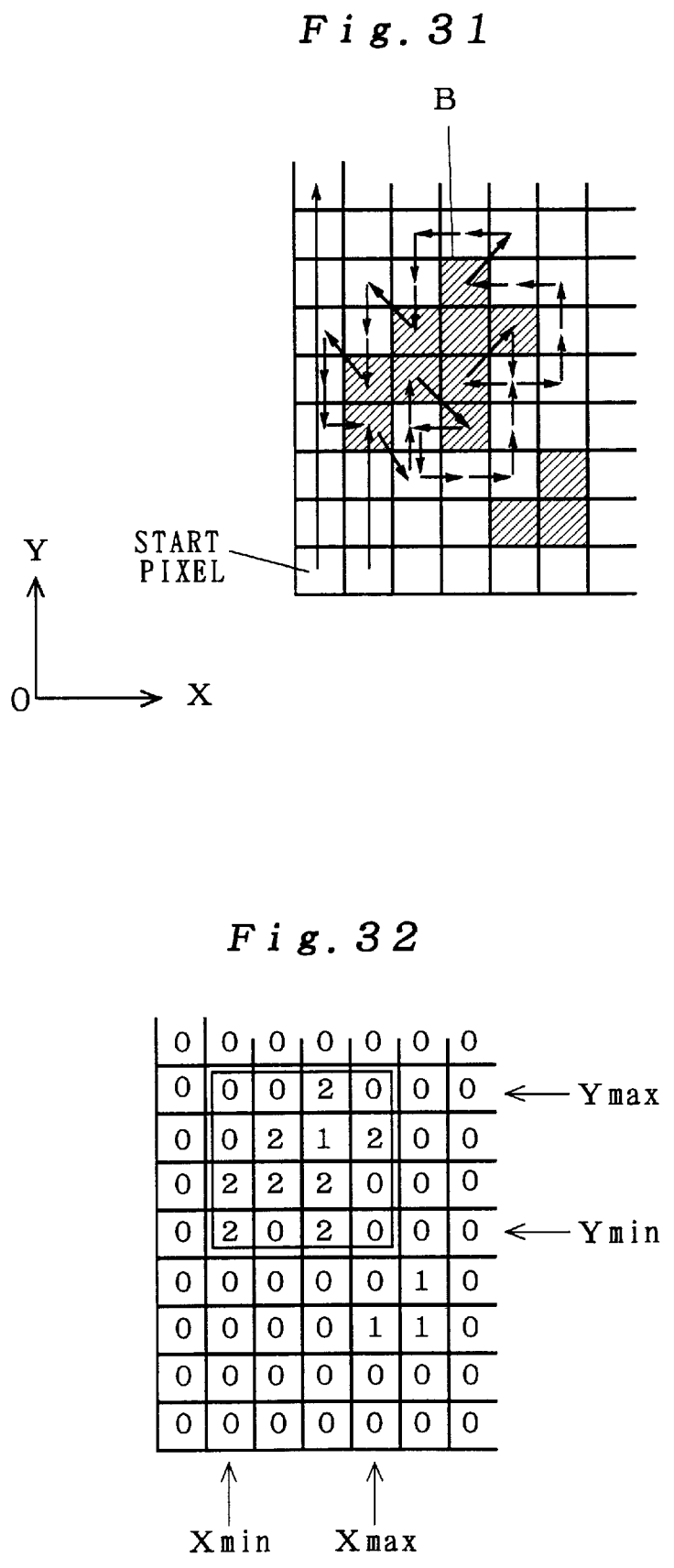

Then, the apparatus 1 shifts to processing at a step S403 in FIG. 10. At the step S403, the apparatus 1 extracts a block B adjacently linking pixels having difference from the difference data. FIG. 31 is an explanatory diagram for the block extract processing. The block extract processing is now described with reference to FIG. 31.

First, the apparatus 1 regards the left lower corner of the entire image as a start pixel, retrieves pixels having difference data of "1" in the Y-axis direction, and successively retrieves an adjacent pixel column in the X-axis direction when the difference data are completely retrieved by one pixel column in the Y direction.

The apparatus 1 regards the coordinates of a pixel corresponding to a memory area where "1" has been found at first as a start point of the block B, and stores the same as X and Y maximum values Xmax and Ymax and X and Y minimum values Xmin and Ymin which are the maximum and minimum values in the X- and Y-axis directions. Further, the apparatus 1 makes data of the area in the memory "2" as retrieved.

Then, the apparatus 1 retrieves a pixel on a lower right direction by 45° with respect to the retrieval incidence direction. If the same is not "1", the apparatus 1 successively retrieves circumferential areas adjacent to the start point anticlockwise. If the same is "1", on the other hand, the apparatus 1 makes data in an area of the memory corresponding to the pixel "2". Then, the apparatus 1 compares an X component of the coordinate of this pixel with the X minimum value Xmin, for updating the same if smaller than the X minimum value, otherwise not updating the same. Similarly, the apparatus 1 compares the X component also with the X maximum value Xmax, for updating the X maximum value Xmax only when the former is larger than the latter. Further, the apparatus 1 compares a Y component of the coordinate of this pixel with the Y maximum and minimum values Ymax and Ymin, for updating the same by similar determination.

The apparatus 1 repeats the aforementioned processing until returning to the start point of the block B.

The apparatus 1 further retrieves a start point of a next block B for performing similar processing, and the processing at the step S403 is completed when all difference data are completely retrieved.

As to only the start point, the apparatus 1 anticlockwisely retrieves from a right lower portion of the incidence direction, and completes retrieval of the block B if no pixel of "1" is present up to a portion above the start point.

Then, the apparatus 1 advances to a step S404 in FIG. 10. FIG. 32 is an explanatory diagram for frame formation processing. At the step S404, the apparatus 1 first counts the pixel number of the difference data obtained at the step S403 every block B.

First, the apparatus 1 counts the number of pixels having difference data of "2" and those having difference data of "1" upwardly adjacent thereto in the positive direction of the Y axis from coordinate points having the stored X and Y minimum values Xmin and Ymin as X and Y components thereof.

The apparatus 1 changes the counted difference data "1" to "2" and retrieves the pixels up to that having a component of the Y maximum value Ymax in the Y-axis direction while repeating similar processing, successively shifts to retrieval of rightwardly adjacent pixel columns, and finally reaches difference data corresponding to a pixel having X and Y components of the X and Y maximum values Xmax and Ymax, to complete the counting of the difference data of the block B.

If the count number in the block B. i.e., the number of the pixels of the difference data included in the block B is larger than the dust removal size specified at the step S401, the apparatus 1 preserves (Xmin, Ymin) and (Xmax, Ymax) of the block B in the magnetic disk 73 as the coordinates of the frame for this block B. If the pixel number is smaller than the dust removal size, on the other hand, the apparatus 1 preserves no coordinates. The apparatus 1 carries out the aforementioned processing on each block B, to complete the step S404 upon completion of the processing on all blocks B.

The plate inspection processing is completed in the aforementioned manner.

According to the first embodiment of the present invention, as hereinabove described, the apparatus 1 picks up the images of the first and second revises with the color CCD camera, obtains color component sums by adding up the respective ones of a plurality of color components every pixel as to the images of the first and second revises respectively, and compares the images of the first and second revises with each other on the basis of the color component sums for inspecting the same. Thus, the apparatus 1 can compare color images such as the first revise or a press plate or an original plate film of respective colors with a monochromatic image or compare color images such as the first and second revises, thereby inspecting not only correction errors but errors caused in the stage after formation of the original plate film and before completion of printing over a wide range in the plate making process.

Each of the first and second revises includes the coordinate system X-Y and the coordinate system U-V rotating the same anticlockwise by 45°, the color component sum of R, G and B is obtained as to the coordinate systems every section of each image for obtaining the waveform of the projective sum thereof, and the matching degree of the waveform of the projective sum is obtained every section of the first and second revises so that a displacement by the coordinate system X-Y is corrected with that in the coordinate system U-V when the matching degree of the first and second revise images in the coordinate system X-Y is smaller than the threshold value sxy in the coordinate system X-Y and that of the first and second revises in the coordinate system U-V is larger than the threshold value suv2 in the coordinate system U-V. Even if an optimum displacement for processing an image extending in a 45° direction with respect to a priority coordinate system is not correctly obtained, therefore, the optimum displacement is obtained by correction through the coordinate system U-V, whereby color images can be more correctly inspected.

While the first embodiment has been described with reference to the case of performing inspection by comparison between the first and second revises, a proof sheet can alternatively be compared with a press plate or an original plate film. While the press plate or the original plate film of respective colors is monotonous in this case, its image is picked up with a color CCD camera so that a color component sum is taken with respect to each color component for local matching. In this case, further, the matching degrees obtained on the basis of single color components at the steps S424 and S425 are multiplied by a prescribed magnification.

While the first and second revises are assumed in full colors, those of two-color printing or the like can be treated similarly to the monotonous case.

While the two coordinate systems X-Y and U-V are employed in the first embodiment, three or more coordinate systems may be employed for correction.

While the coordinate system U-V rotating by 45° with respect to the coordinate system X-Y is employed in the first embodiment, the present invention is not restricted to this but a coordinate system rotating by 30° or the like may alternatively be employed.

<1-4. Display Format for Plate Inspection>

Five display formats of outputting mismatch marks (frames or dots described later) indicating mismatching portions between first PS1 (reference) and second revise PS2 on output papers are now described with reference to typical concrete examples respectively.

For the convenience of illustration, it is assumed that four symbols M1 to M4 and three Greek characters C1 to C3 are printed on each of the first revises PS1 as shown in FIGS. 33 to 39, for example, so that the symbol M2 for "◊" is deleted and a Greek character "δ" is added by proof reading for producing each second revise PS2 in each case.

(1) Display Format 1 (FIG. 33)

The apparatus 1 sets "output frame to plotter" as the display format in the plate inspection condition setting at the step S401, calculates the difference between the first and second revises PS1 and PS2 (step S402), extracts mismatching portions of the first and second revises PS1 and PS2, i.e., blocks corresponding to the symbol M2 for "◊" and the Greek character C4 respectively (step S403), obtains minimum and maximum positions (X1min, Y1min) and (X1max, Y1max) of a frame enclosing the symbol M2 and the minimum and maximum positions (X2min, Y2min) and (X2max, Y2max) of a frame enclosing the Greek character C4 and stores the same in the magnetic disk (step S404).

Due to the setting of "output frame to plotter" at the step S401, the apparatus 1 makes a determination of YES at the step S502 for reading frame data consisting of the minimum and maximum positions (X1min, Y1min) and (X1max, Y1max) for drawing a frame FR1 indicating the first mismatching portions (the portions of the deleted symbol M2) on a translucent tracing paper (output paper) TP and reading the frame data consisting of the minimum and maximum positions (X2min, Y2min) and (X2max, Y2max) for drawing a frame FR2 indicating the second mismatching portions (the portions of the added character (C4) on the translucent tracing paper TP with the monochrome plotter 65.

Thus, the display format 1 is adapted to output only the frames FR1 and FR2 indicating the mismatching portions on the translucent tracing paper TP, so that the mismatching portions can be readily and clearly identified by superposing the tracing paper TP on the second revise PS2 with reference to register marks, and inspection can be readily made over a wide range including correction errors in the plate making process and errors caused in the stage between formation of the original plate film and completion of printing.

Figure 34:
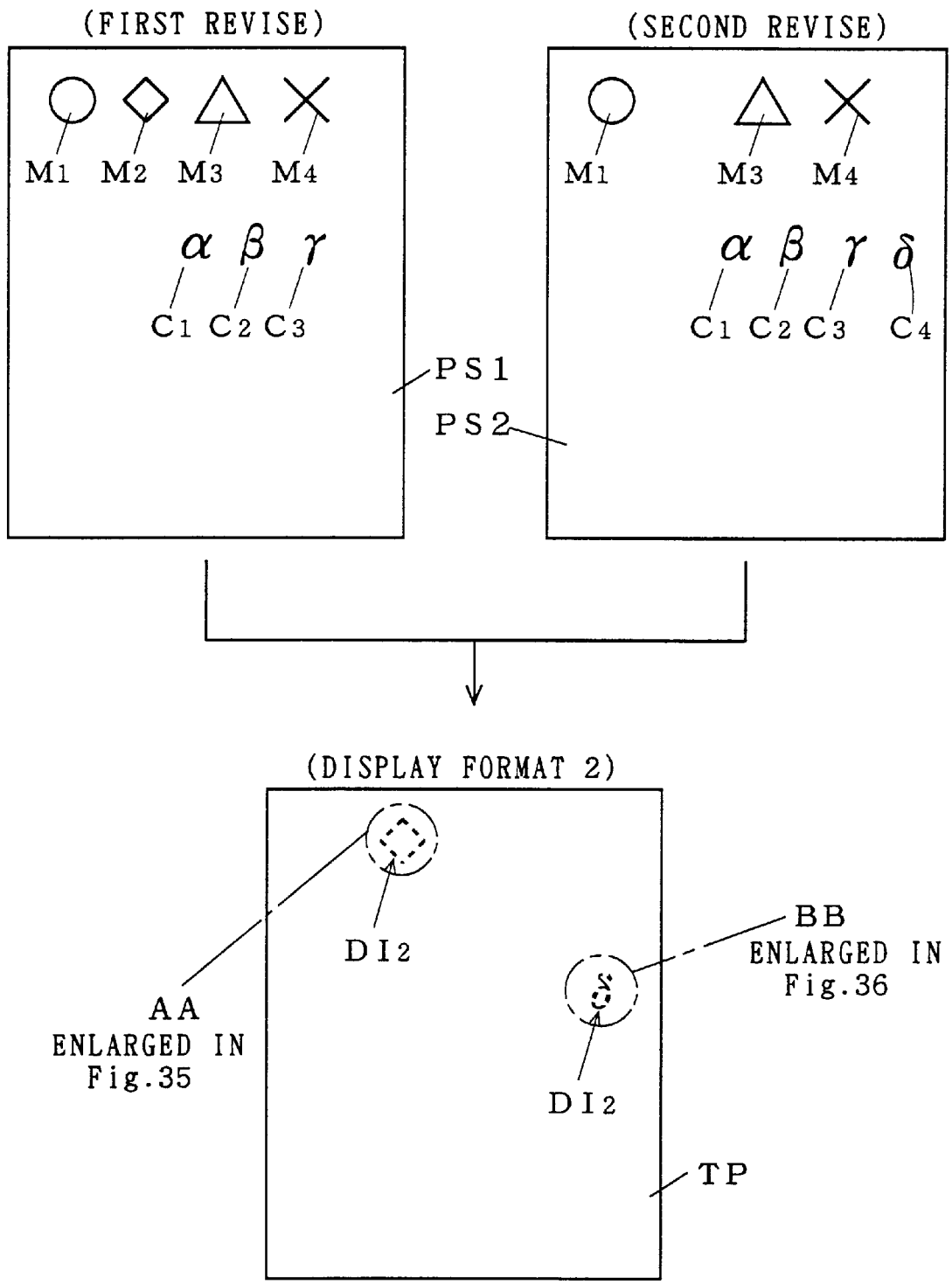
FIG. 34 is an explanatory diagram for illustrating a "display format 2" according to the first embodiment of the present invention.
Figure 35:
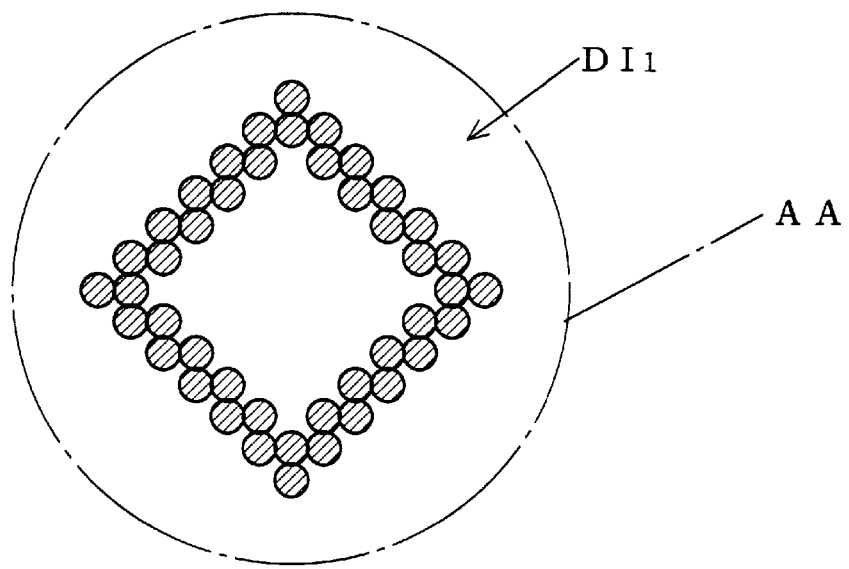
FIG. 35 is a partially enlarged view of FIG. 34.
Figure 36:
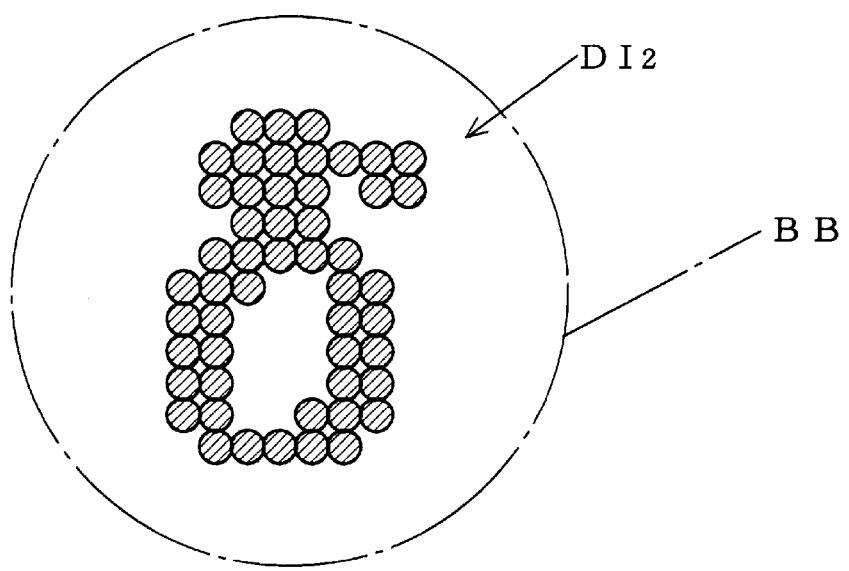
FIG. 36 is another partially enlarged view of FIG. 34.

(2) Display Format 2 (FIG. 34)

The apparatus 1 sets "output dot to plotter" as the display format in setting of the plate inspection conditions at the step S401, calculates the difference between the first and second revises PS1 and PS2 and detects the mismatching portions of the first and second revises PS1 and PS2, i.e., the symbol M2 for "◊" and the Greek character "δ" for forming an image for difference display consisting of difference data (step S402).

Due to the setting of "output dot to plotter" at the step S401, the apparatus 1 makes a determination of YES at the step S504, and advances to the step S505 for converting the difference data to dots for drawing a dot image DI1 (an area AA in FIG. 34 shown in FIG. 35 in an enlarged manner) indicating the first mismatching portions (the deleted portions of the symbol M2) and its outline and a dot image DI2 (an area BB in FIG. 34 shown in FIG. 36 in an enlarged manner) indicating the second mismatching portions (the added portions of the character C4) and its outline on a translucent tracing paper TP.

Thus, the display format 2 is adapted to output only the dot images DI1 and DI2 indicating the mismatching portions and the outlines thereof on the translucent tracing paper TP, for attaining effects similar to those of the display format 1.

Figure 37:
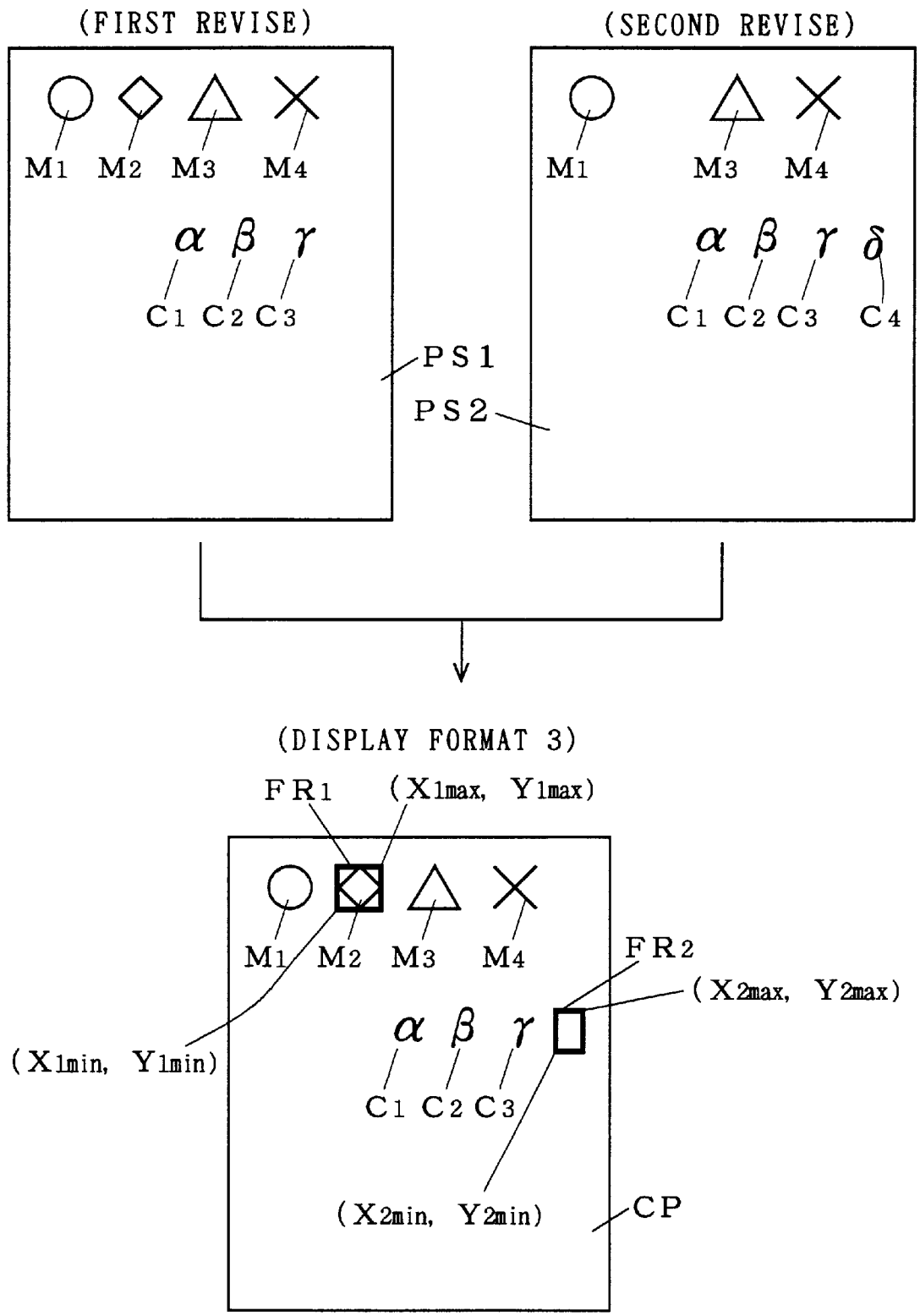
FIG. 37 is an explanatory diagram for illustrating a "display format 3" according to the first embodiment of the present invention.

(3) Display Format 3 (FIG. 37)

The apparatus 1 sets "output first revise to printer" as the display format in the plate inspection conditions at the step S401 and calculates the difference between the first and second revises PS1 and PS2 (step S402), obtains the minimum and maximum positions (X1min, Y1min) and (X1max, Y1max) of the frame enclosing the symbol M2 and the minimum and maximum positions (X2min, Y2min) and (X2max, Y2max) of the frame enclosing the Greek character C4 and stores the same in the magnetic disk similarly to the case of the display format 1 (step S404).

Due to the setting of "output first revise to printer" at the step S401, the apparatus 1 makes a determination of YES at the step S506 and reads the image data of the first revise PS1 and frame data produced at the step S404 for drawing the frame FR1 indicating the first mismatching portions (the deleted portions of the symbol M2), the frame FR2 indicating the second mismatching portions (the added portions of the character C4), and the image of the first revise PS1 with the color printer 66 on a color printer paper sheet CP for exclusive use in color printer.

Thus, the display format 3 is adapted to output the image of the first revise PS1 and the frames FR1 and FR2 indicating the mismatching portions in a superposed manner, so that the mismatching portions of the first and second revises PS1 and PS2 can be readily and clearly identified from the image outputted on the color printer paper sheet CP, and inspection can be readily made over a wide range including correction errors in the plate making process and errors caused in the stage between formation of the original plate film and completion of printing.

Figure 38:
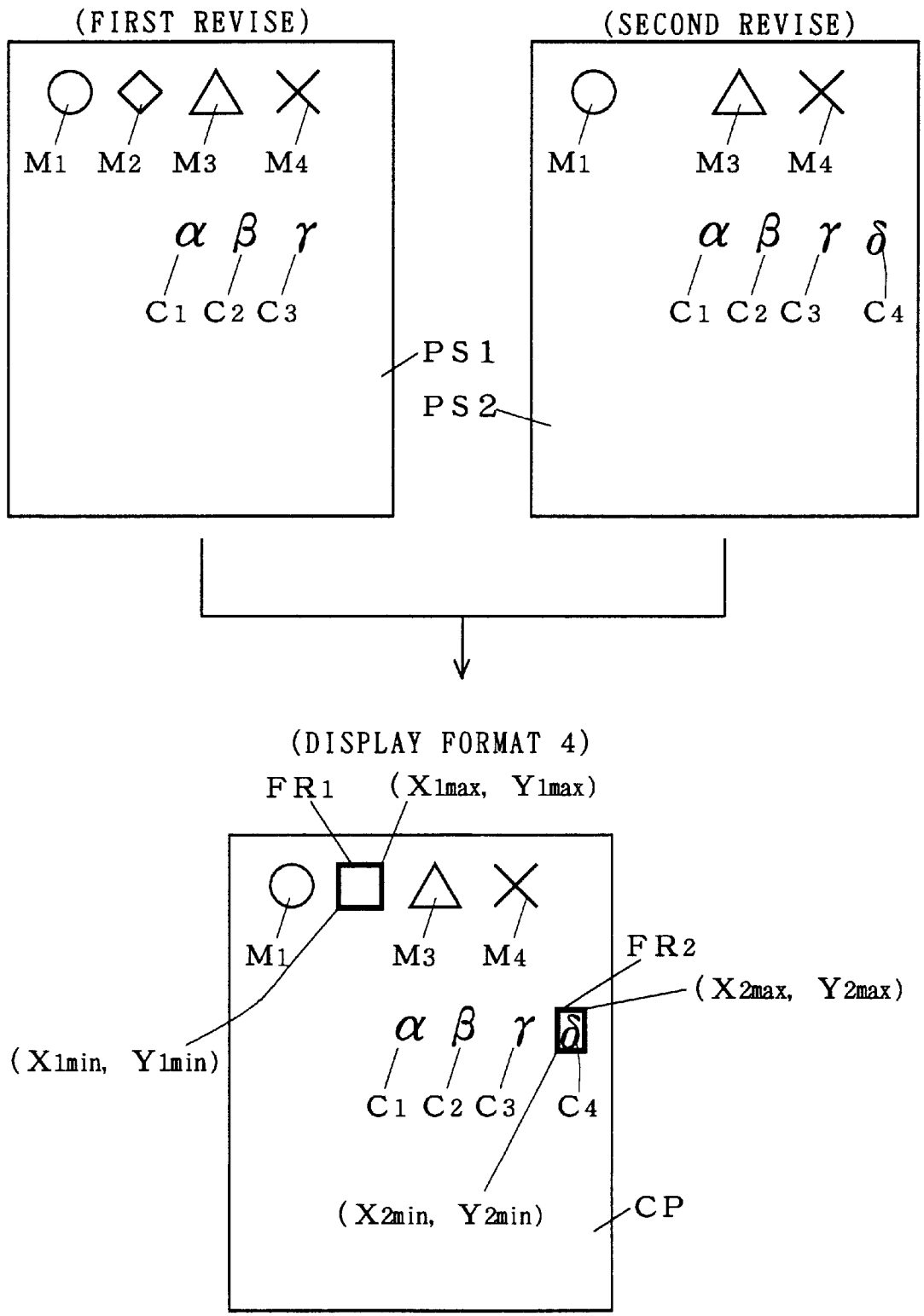
FIG. 38 is an explanatory diagram for illustrating a "display format 4" according to the first embodiment of the present invention.

(4) Display Format 4 (FIG. 38)

First, the apparatus 1 sets "output second revise to printer" as the display format in setting of the plate inspection conditions at the step S401, for outputting the second revise PS2 and the frames FR1 and FR2 indicating the mismatching portions in a superposed manner dissimilarly to the display format 3 for outputting the first revise PS1 and the frames FR1 and FR2 indicating the mismatching portions in a superposed manner, while the remaining points of this display format 4 are identical to those of the display format 3.

In the display format 4, the apparatus 1 calculates the difference between the first and second revises PS1 and PS2 at the step S402 due to the setting of "output second revise to printer" at the step S401, for obtaining the minimum and maximum positions (X1min, Y1min) and (X1max, Y1max) of the frame enclosing the symbol M2 and the minimum and maximum positions (X2min, Y2min) and (X2max, Y2max) of the frame enclosing the Greek character C4 similarly to the display format 1 (step S404). The apparatus 1 makes a determination of YES at the step S508 and reads image data of the second revise PS2 and frame data produced at the step S404 for drawing the frame FR1 indicating the first mismatching portions (the deleted portions of the symbol M2), the frame FR2 indicating the second mismatching portions (the added portions of the character C4), and the image of the second revise PS2 with the color printer 66 on a color printer paper sheet CP.

Thus, the mismatching portions of the first and second revises PS1 and PS2 can be readily and clearly identified from the image outputted on the color printer paper sheet CP, and inspection can be readily made over a wide range including correction errors in the plate making process and errors caused in the stage between formation of the original plate film and completion of printing.

Figure 39:
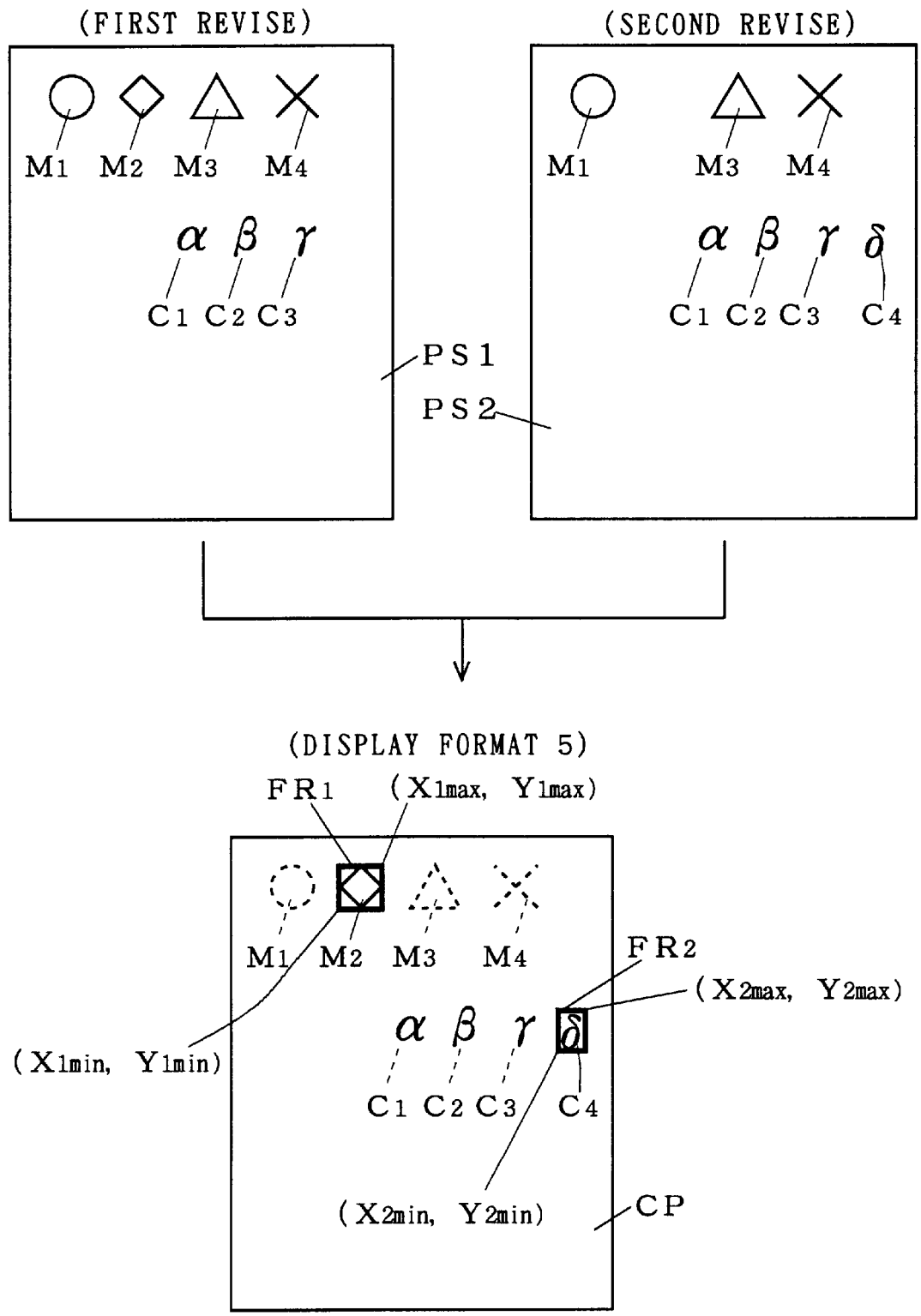
FIG. 39 is an explanatory diagram for illustrating a "display format 5" according to the first embodiment of the present invention.

(5) Display Format 5 (FIG. 39)

The apparatus 1 sets "output increase/decrease to printer" as the display format in the plate inspection conditions at the step S401, and calculates the difference between the first and second revises PS1 and PS2 (step S402). In case of setting "display color" for matching portions as "white mask", the apparatus 1 operates color concentrations of the respective color components of pixels forming images of the matching portions on the basis of the aforementioned calculation formula, for approaching the images of the matching portions to white.

Then, the apparatus 1 obtains the minimum and maximum positions (X1min, Y1min) and (X1max, Y1max) of the frame enclosing the symbol M2 and the minimum and maximum positions (X2min, Y2min) and (X2max, Y2max) of the frame enclosing the Greek character C4 and stores the same in the magnetic disk, similarly to the case of the display format 1 (step S404).

The apparatus 1 makes a determination of YES at the step S510 due to the setting of "output increase/decrease to printer" at the step S401, for reading image data of the white-masked matching portions, those of increased portions, those of decreased portions, and frame data produced at the step S404 and drawing the frame FR1 indicating the first mismatching portions (deleted portions of the symbol M2), the frame FR2 indicating the second mismatching portions (added portions of the character C4), the images (symbols M1, M3 and M4 and characters C1 to C3 shown by broken lines) of the matching portions, the increased image (character C4 shown by solid lines) of the increased portions, and the increased image (symbol M2 shown by solid lines) of the decreased portions with the color printer 66 on a color printer paper sheet CP. While the apparatus 1 is to set presence/absence of "frame output" in case of setting "output increase/decrease to printer" for drawing the frames FR1 and FR2 in superposition with the increased and decreased images when setting frame output as shown in the aforementioned example (display format 5), drawing of the frames FR1 and FR2 is omitted when the apparatus 1 sets no frame output for drawing only the images of the matching portions and the increased and decreased images with the color printer 66, although description of this is omitted in the above.

Thus, the display format 5 is adapted to output the images of the increased and decreased portions and the frames FR1 and FR2 indicating the mismatching portions in a superposed manner, whereby the mismatching portions of the first and second revises PS1 and PS2 can be readily and clearly identified from the images outputted to the color printer paper sheet CP, and inspection can he readily made over a wide range in the plate making process including correction errors and errors caused in the stage between formation of the original plate film and completion of printing.

Further, the apparatus 1 white-masks the images of the matching portions for approaching the same to white, whereby the mismatching portions can be further clearly and readily identified to further simplify the inspection.

The display color, which can be selected in the aforementioned manner, is preferably properly assorted and selected/set in response to the specified content of printing so that mismatching portions are properly clarified. In case of selecting/setting respective display colors in the display format 5 shown in FIG. 39 as follows, for example:

matching portions: white mask,
increased portions: red,
decreased portions: green, and
frames: red the mismatching portions are clarified while the increased or decreased portions can be readily determined from the display color of the mismatching portions.

While the apparatus 1 outputs the frames FR1 and FR2 indicating the mismatching portions on the translucent tracing paper TP in each of the display formats 1 and 2, these frames may alternatively be outputted on a transparent output paper, as a matter of course. While the apparatus 1 outputs the frames FR1 and FR2 on the color printer paper sheet CP in each of the display formats 3 to 5, further, the output paper is not restricted to this hut the frames FR1 and FR2 may alternatively be outputted to a general copy paper or the like.

[2. Second Embodiment]

<2-1. Apparatus Structure>

Figure 40:
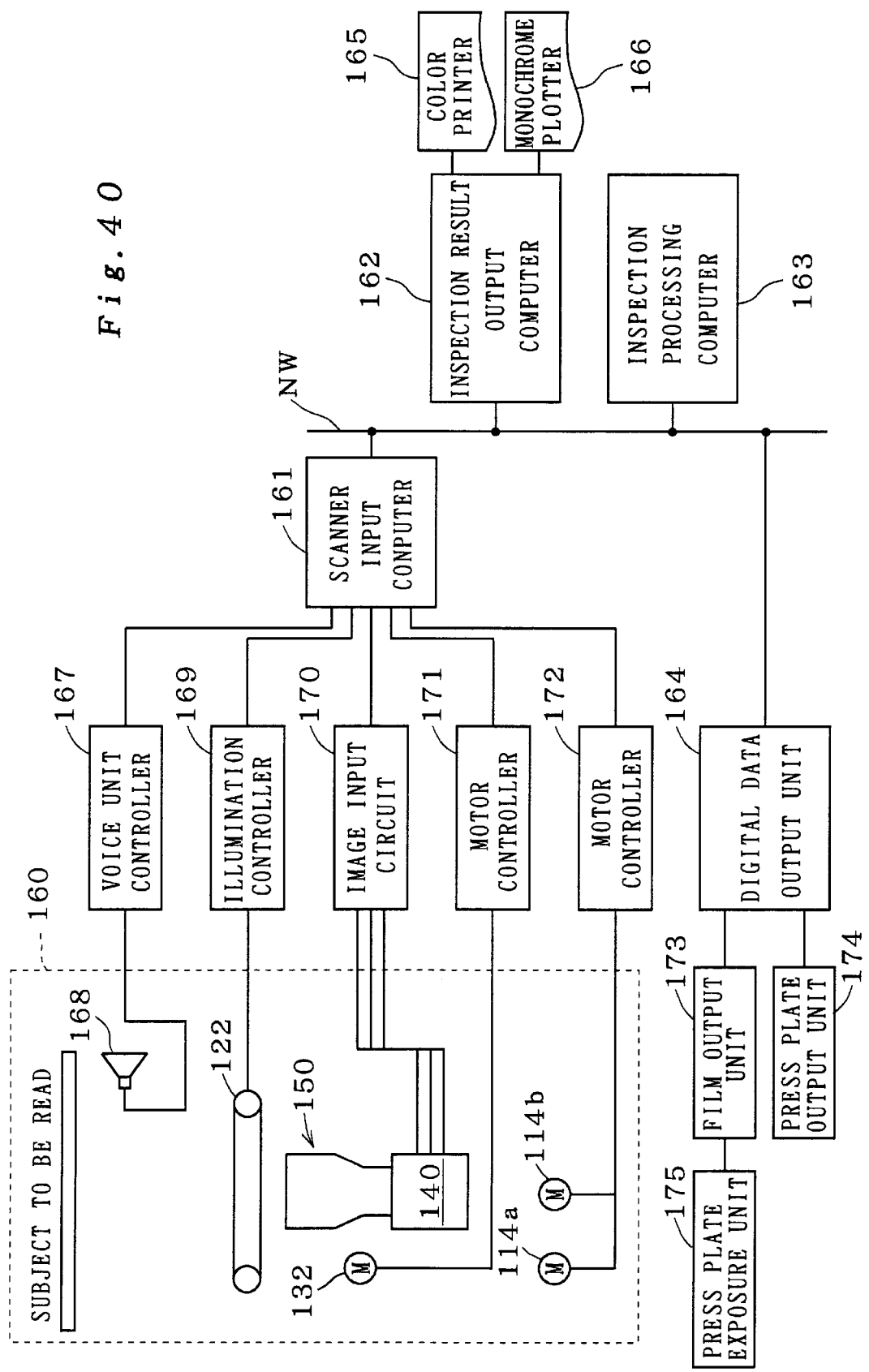
FIG. 40 illustrates the apparatus structure of a principal part of an image inspection apparatus according to a second embodiment of the present invention.

FIG. 40 illustrates the apparatus structure of a principal part of an image inspection apparatus according to a second embodiment of the present invention.

This apparatus includes a scanner input computer 161 for controlling various types of output units, an inspection result output computer 162, an inspection processing computer 163 and a digital data output unit 164, which are connected with each other through a network NW as LAN (local area network).

The scanner input computer 161 is connected with a scanner 160. This scanner input computer 161 is adapted to control a voice unit 168 through a voice unit controller 167 for transmitting voice messages to an operator. Further, the scanner input computer 161 can control on/off operations and brightness of a round fluorescent lamp 122 through an illumination controller 169. Image signals (image information) of three color components R (red), G (green) and B (blue) obtained by a color CCD camera 140 are supplied to an image input circuit 170, subjected to proper image processing, and thereafter transferred to the scanner input computer 161. The scanner input computer 161 can control a lens driving motor 132 and X and Y driving pulse motors 114a and 114b through motor controllers 171 and 172 respectively.

The inspection result output computer 162 can output image inspection results etc. through a color printer 165 and a monochrome plotter 166.

The inspection processing computer 163 carries out image inspection processing on image data inputted through the network NW.

The digital data output unit 164, which is connected with a film output unit 173 and a press plate output unit 174, controls these units for forming an original plate film and a press plate at need. A press plate exposure unit 175 also has a function of forming a press plate from an original plate film.

Figure 41:
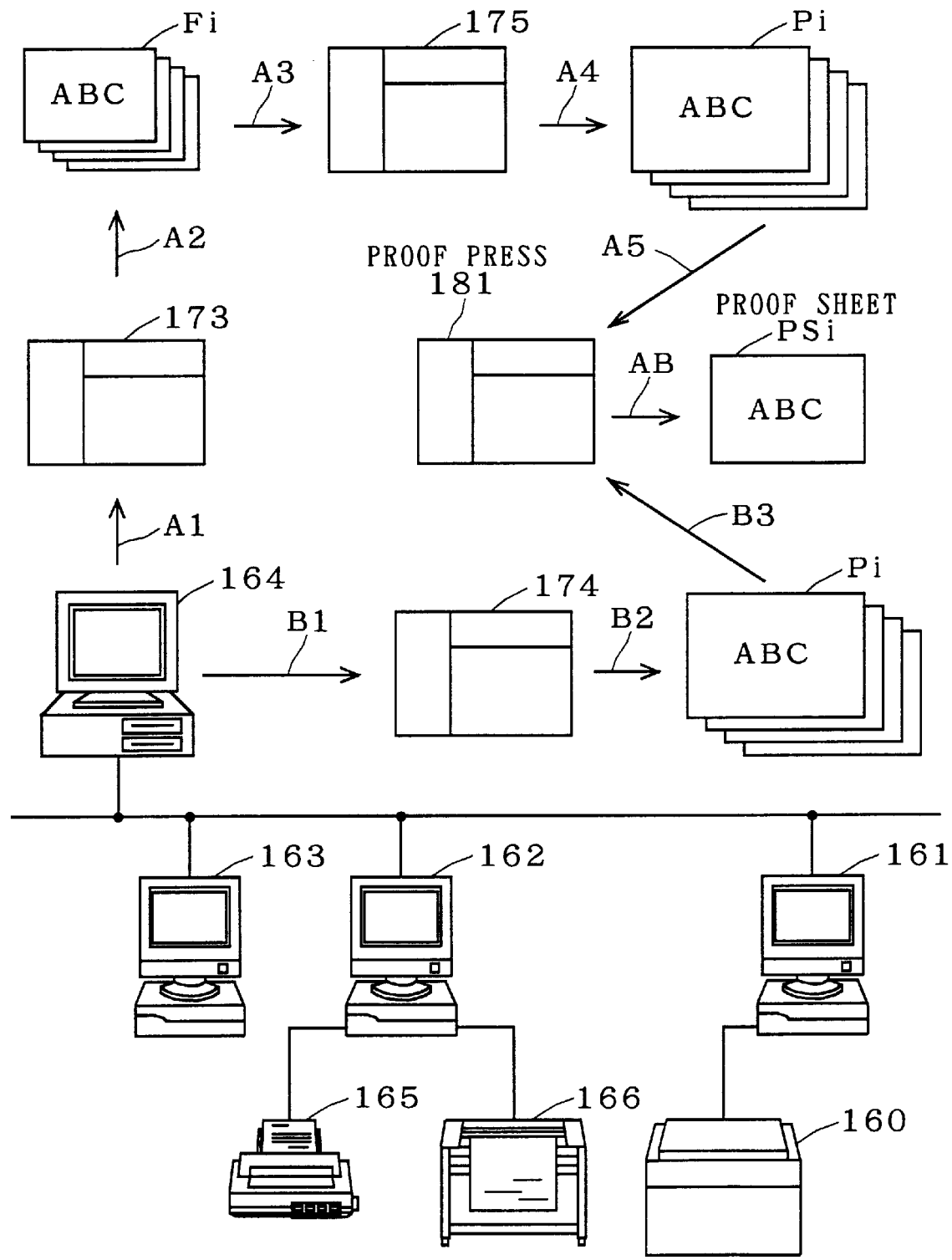
FIG. 41 illustrates the flow of a plate making process carried out through the image inspection apparatus according to the second embodiment of the present invention.

The image inspection apparatus according to the second embodiment further includes a proof press 181 for forming a proof sheet PSi from a press plate Pi (consisting of PiY, PiM, PiC and PiK), as shown in FIG. 41. Hereinafter i=1, 2, ... represent first, second ... revises respectively.

FIG. 41 shows the flow of a plate making process carried out through the image inspection apparatus according to the second embodiment. FIG. 41 omits the elements from the voice unit controller 167 to the motor controller 172 provided between the scanner input computer 161 and the scanner 160.

The operator switches whether an original plate film is formed on the basis of image data previously stored in a memory of the digital data output unit 164 through the network NW for obtaining a press plate and obtaining the proof sheet PSi on the basis thereof or a press plate is directly obtained from image data (CTP (computer to plate)) for obtaining the proof sheet PSi on the basis thereof, through in instruction to the digital data output unit 164 through a keyboard (not shown) belonging thereto.

In case of outputting the original film and printing a press plate on the basis thereof, the apparatus transmits the image data to the film output unit 173 as shown by arrow A1, for forming an original plate film Fi (consisting of FiY, FiM, FiC and FiK) as shown by arrow A2. The apparatus transmits the original plate film Fi to the press plate exposure unit 175 as shown by arrow A3, for outputting a press plate Pi as shown by arrow A4. Further, the apparatus transmits the press plate Pi to the proof press 181 as shown by arrow A5, for outputting the proof sheet PSi as shown by arrow AB.

In case of directly obtaining the press plate from the image data, on the other hand, the apparatus transmits the image data to the press plate output unit 174 as shown by arrow B1, for forming the press plate Pi on the basis thereof, as shown by arrow B2. Further, the apparatus transmits the press plate Pi to the proof press 181 as shown by arrow B3, for obtaining the proof sheet PS1 as shown by arrow AB.

The original plate film Fi, the press plate Pi and the proof sheet PSi obtained in the aforementioned processing are loaded in the scanner input computer 161 by the scanner 160 at need for performing image inspection, and transmitted to the inspection processing computer 163 as digital image data through the network NW, to be employed for image inspection.

The apparatus transmits the image inspection results obtained in the inspection processing computer 163 to the inspection result output computer 162 at need through an instruction by the operator, and outputs the same through the color printer 165 and the monochrome plotter 166.

<2-2. First Exemplary Image Inspection Processing>

Figure 42:
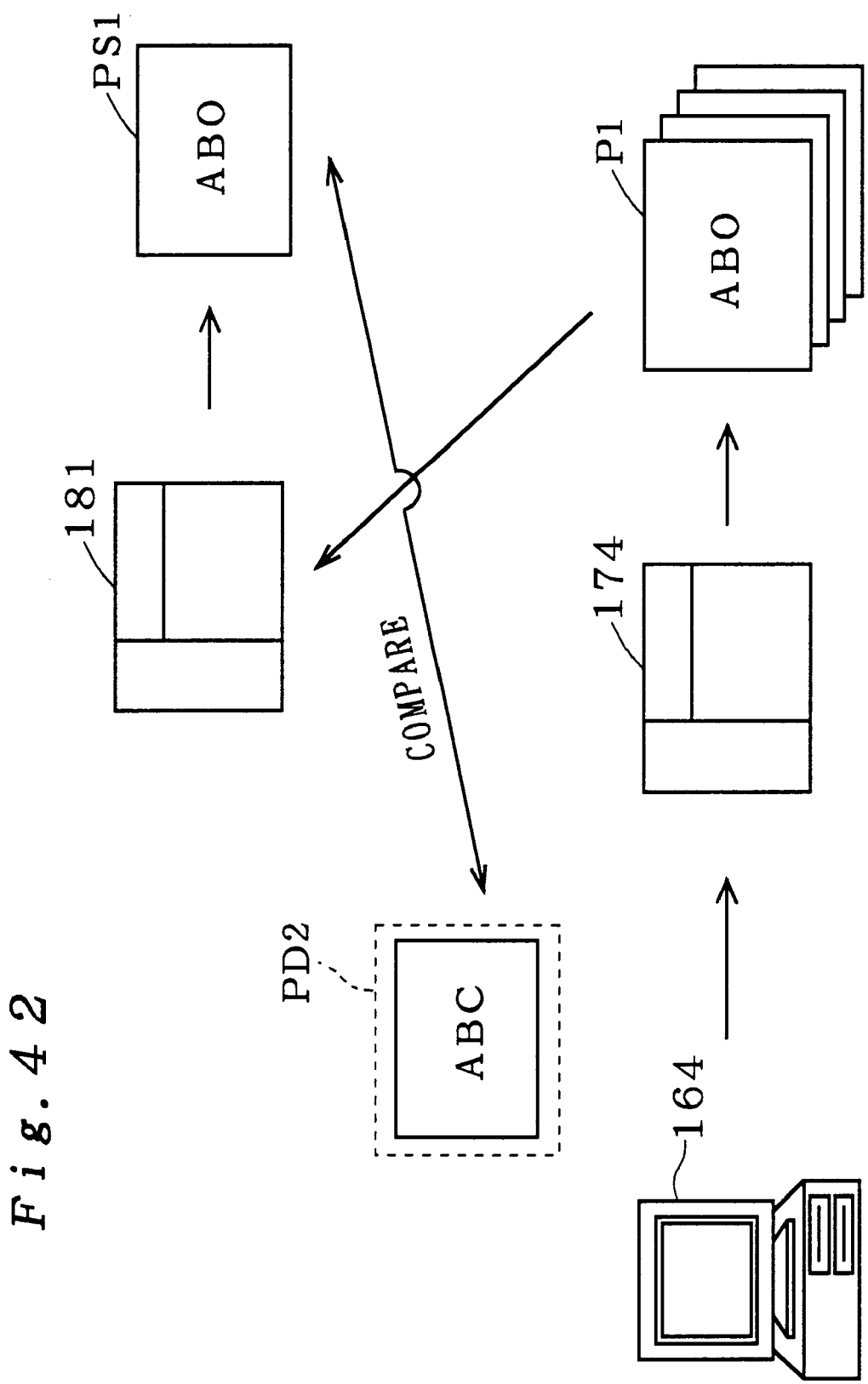
FIG. 42 illustrates the flow of first exemplary image inspection in the image inspection apparatus according to the second embodiment of the present invention.

FIG. 42 illustrates the flow of first exemplary image inspection in the image inspection apparatus according to the second embodiment of the present invention. In this example, the apparatus directly obtains a first revise press plate P1 by CTP, for carrying out image inspection in a plate making process of obtaining a proof sheet on the basis thereof. In more concrete terms, the apparatus reads a first revise proof sheet PS1 (corresponding to a first image recording medium) with a scanner 160 for preparing digital image data (corresponding to first digital image data) for a reference image, while forming second revise digital data PD2 (corresponding to second digital image data) by performing correction on the basis of the first revise as an object image, for comparing the reference and object images with each other and performing image inspection. In the digital data output unit 164 of the image inspection apparatus according to the second embodiment, first and second revise press plate digital data PD1 and PD2 are TIFF data, which are digital image data including four color components Y (yellow), M (magenta), C (cyan) and K (black) every dot.

First, the press plate output unit 174 forms the first revise press plate P1 through the first revise press plate digital data PD1 (not shown) received from the digital data output unit 164, for applying the same to the proof press 181 and outputting the first revise proof sheet PS1.

Then, the scanner 160 (see FIG. 41) loads the first revise proof sheet PS1 in the scanner input computer 161 (see FIG. 41).

Figure 43:
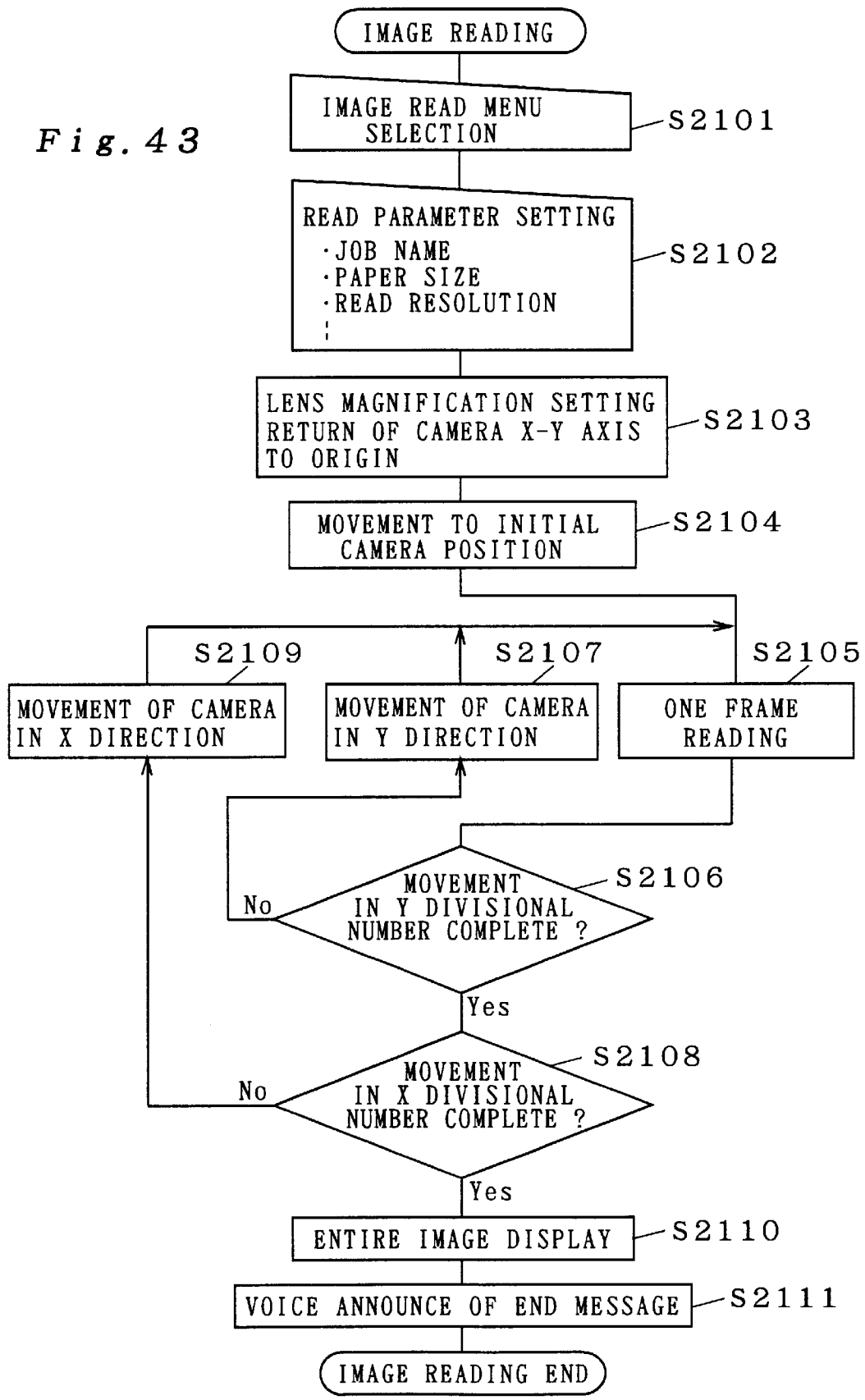
FIG. 43 is a flow chart showing image read processing according to the second embodiment of the present invention.

FIG. 43 is a flow chart showing image read processing. In this image read processing, the operator selects an image read menu (step S2101), and is facilitated to input read parameters in the color CRT of the scanner input computer 161. The read parameters, which are related not only to read processing for the first revise proof sheet PS1 but that for an original plate film F1 and a first revise press plate P1 and other products as described later, are described with reference to the first revise proof sheet PS1. The read parameters are formed by "JOB name", "image size", "read resolution" and the like, which can be inputted by the operator through the keyboard (not shown) or a mouse (not shown) of the scanner input computer 161. When the operator sets the read parameters (S2102), the apparatus executes steps S2103 to S2109 in accordance with these read parameters for reading a color image on the first revise proof sheet PS1.

At the step S2103, the apparatus controls the lens driving motor 132 through the motor controller 171 for setting the magnification of a zoom lens, while controlling the X and Y driving pulse motors 114a and 114b through the motor controller 172 respectively for returning a structural body 150 including the color CCD camera 140 to an origin position. At the step S2104, the apparatus so moves the structural body 150 as to locate the color CCD camera 140 on a read start position (initial camera position).

At the step S2105, the apparatus picks up the image on the first revise proof sheet PS1 with the color CCD camera 140 for supplying image signals (image information) for three color components R, G and B related to the image to the image input circuit 170 and performing proper image processing, and thereafter stores the same in the memory (not shown) of the scanner input computer 161. Thus, the apparatus can read a part (image for one frame) of the image on the first revise proof sheet PS1 in an image size responsive to the magnification set at the step S2103.

According to the second embodiment, as hereinabove described, the apparatus reads only a part of the image with the color CCD camera 140. The apparatus divides the entire image in X and Y directions in units of single frames, for two-dimensionally moving the color CCD camera 140 in the X and Y directions and successively reading images of single frames respectively.

In more concrete terms, the apparatus makes a determination as to whether or not the number of times moving the color CCD camera 140 in the Y direction matches with the number (Y divisional number) of the sections divided in the Y direction at the step S2106 and moves the color CCD camera 140 in the Y direction by one frame at the step S2107 while making a determination of NO at the step S2106, for thereafter reading the image of this frame (step S2105). When making a determination of YES at the step S2106, on the other hand, the apparatus advances to the step S2108.

The apparatus makes a determination at the step S2108 as to whether or not the number of times moving the color CCD camera 140 in the X direction matches with the number (X divisional number) of the sections divided in the X direction and moves the color CCD camera 140 in the X direction by one frame at the step S2109 when making a determination of NO at the step S2108, for thereafter reading the image of this frame (step S2105). When making a determination of YES at the step S2108, on the other hand, the apparatus advances to a step S2110.

Thus, the apparatus can read images of all frames by executing the steps S2105 to S2109, for reading the entire image of the first revise proof sheet PS1 serving as a reference in image inspection processing described later. Thereafter the apparatus displays the image of the first revise proof sheet PS1 read at the step S2110 on the color CRF of the scanner input computer 161. The voice unit 168 informs the operator of this completion of the reading of the first revise proof sheet PS1 through the voice unit controller 167 (voice announce).

The read processing for the first revise proof sheet PS1 which is the object of reading is completed in the aforementioned manner, so that the obtained digital image data of the first revise proof sheet PS1 is transmitted to the inspection processing computer 163 through the network NW.

In parallel with this, the operator makes correction on errors etc. in the first revise proof sheet PS1 with respect to the first revise press plate digital data PD1 previously transmitted to an image correction unit (not shown) through the network NW (the operator changes "O" of the first revise proof sheet PS1 to "C" while confirming the same through the monitor in the example shown in FIG. 42), for returning the press plate digital data PD2 for the second revise press plate digital image data to the digital data output unit 164 while transmitting the same to the inspection processing computer 163.

The apparatus compares the digital image data of the first revise proof sheet PS1 sheet serving as a reference image with the second revise press plate digital data PD2 serving as the object image in the inspection processing computer 163, for performing image inspection. The processing is now described on this example.

First, the apparatus first performs alignment processing of both image data.

Figure 44:
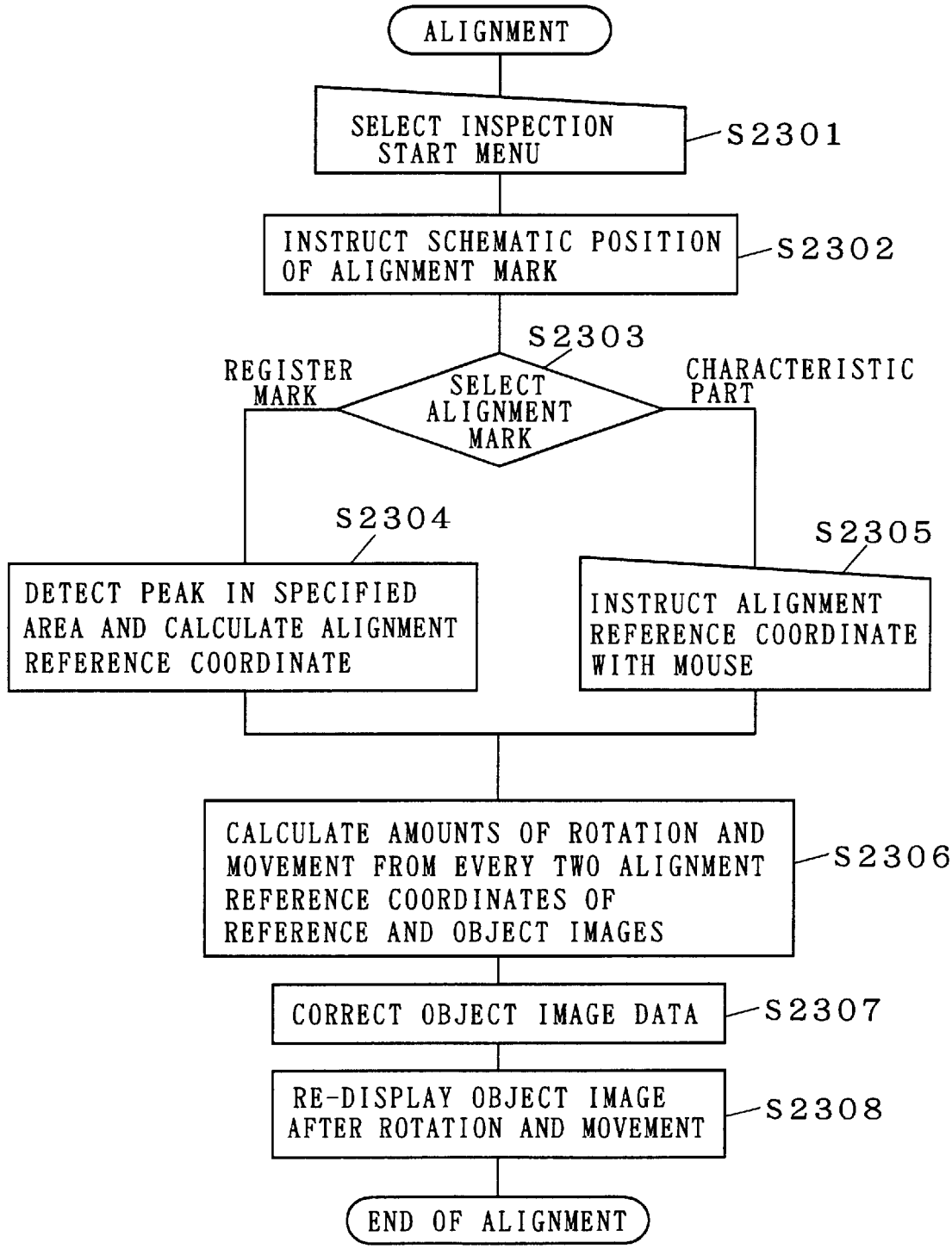
FIG. 44 is a flow chart showing alignment processing according to the second embodiment of the present invention.

FIG. 44 is a flow chart showing the alignment processing. In this alignment processing, the operator selects an inspection start menu in the inspection processing computer 16)3 (step S2301), and operates the attached mouse while observing the image displayed on the color CRT belonging to the inspection processing computer 163 for instructing schematic positions of alignment marks (step S2302). While two cross marks, i.e., the so-called register marks are provided on each of the objects such as the first revise proof sheet PS1 and the second revise press plate digital data PD2 for alignment in plate making—printing steps to be employed as alignment marks, characteristic parts of the images are utilized as alignment marks when no register marks are provided or the register marks are unclear. At a step S2303, therefore, the operator selects whether the register marks or the characteristic parts are utilized as the alignment marks, for obtaining alignment reference coordinates in response to the selection.

Figure 45A:
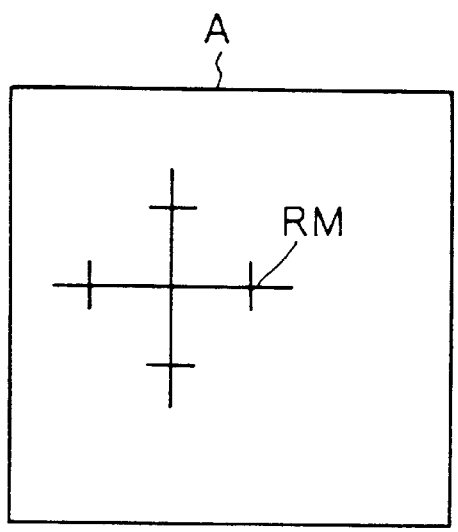
FIGS. 45A to 45C are model diagrams showing the contents of the alignment processing according to the second embodiment of the present invention.
Figure 45C:
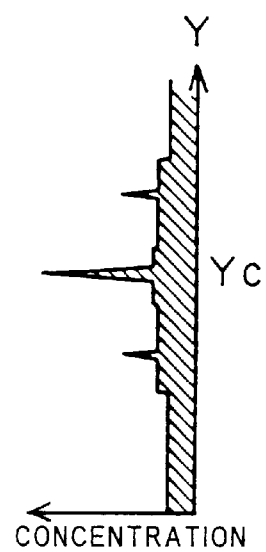
Figure 45B:
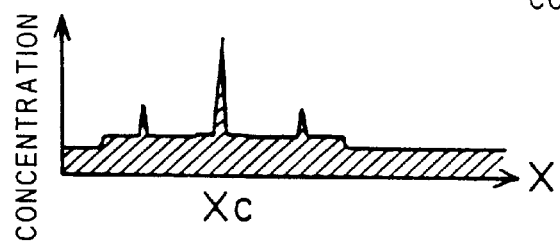

When the operator selects "register mark" at the step S2303, the apparatus advances to a step S2304, for obtaining the alignment reference coordinates as follows: Namely, register marks RM are present in an area A specified at the step S2303 as shown in FIG. 45A, and the apparatus obtains a concentration distribution in the X direction as shown in FIG. 45B by projectively adding up color concentrations of three color components R. G and B of each pixel in the Y direction. Similarly, the apparatus obtains concentration distributions in the Y direction as shown in FIG. 45C. In the second embodiment, the apparatus regards maximum coordinates XC and YC having high concentrations in the X and Y directions respectively in correspondence to the register marks RM as the alignment reference coordinates.

When the operator selects "characteristic part" at the step S2303, on the other hand, the apparatus advances to a step S2305, so that the operator instructs a single point of characteristic parts by operating the mouse of the inspection processing computer 163 for regarding the coordinates of this instructed point as the alignment reference coordinates.

At the steps S2304 and S2305, the apparatus obtains two alignment reference coordinates as to the first revise proof sheet PS1 while obtaining two alignment reference coordinates as to the second revise press plate digital data PD2 respectively.

At a step S2306, the apparatus operates amounts of rotation and movement of the second revise press plate digital data PD2 with respect to the first revise proof sheet PS1 on the basis of the four alignment reference coordinates obtained in the aforementioned manner respectively. Then, the apparatus rotates/moves the image of the second revise press plate digital data PD2 at a step S2307 for superposing the same with the first revise proof sheet PS1 and correcting the data PD2 for allowing comparison of match/mismatch thereof.

Further, the apparatus re-displays the entire image of the corrected second revise press plate digital data PD2 on the color CRT of the inspection processing computer 163 (step S2308).

When the alignment processing is completed in the aforementioned manner, the apparatus performs inspection processing. In the following description, the inspection processing computer 163 changes press plate digital image data of a TIFF system received from the digital data output unit 164 to data of a BMP system of three colors R, G and B, and compares concentration signals of the respective components thereof with those of BMP digital image data obtained by reading the first revise proof sheet PS1 received from the scanner input computer 161 for performing image inspection.

Figure 46:
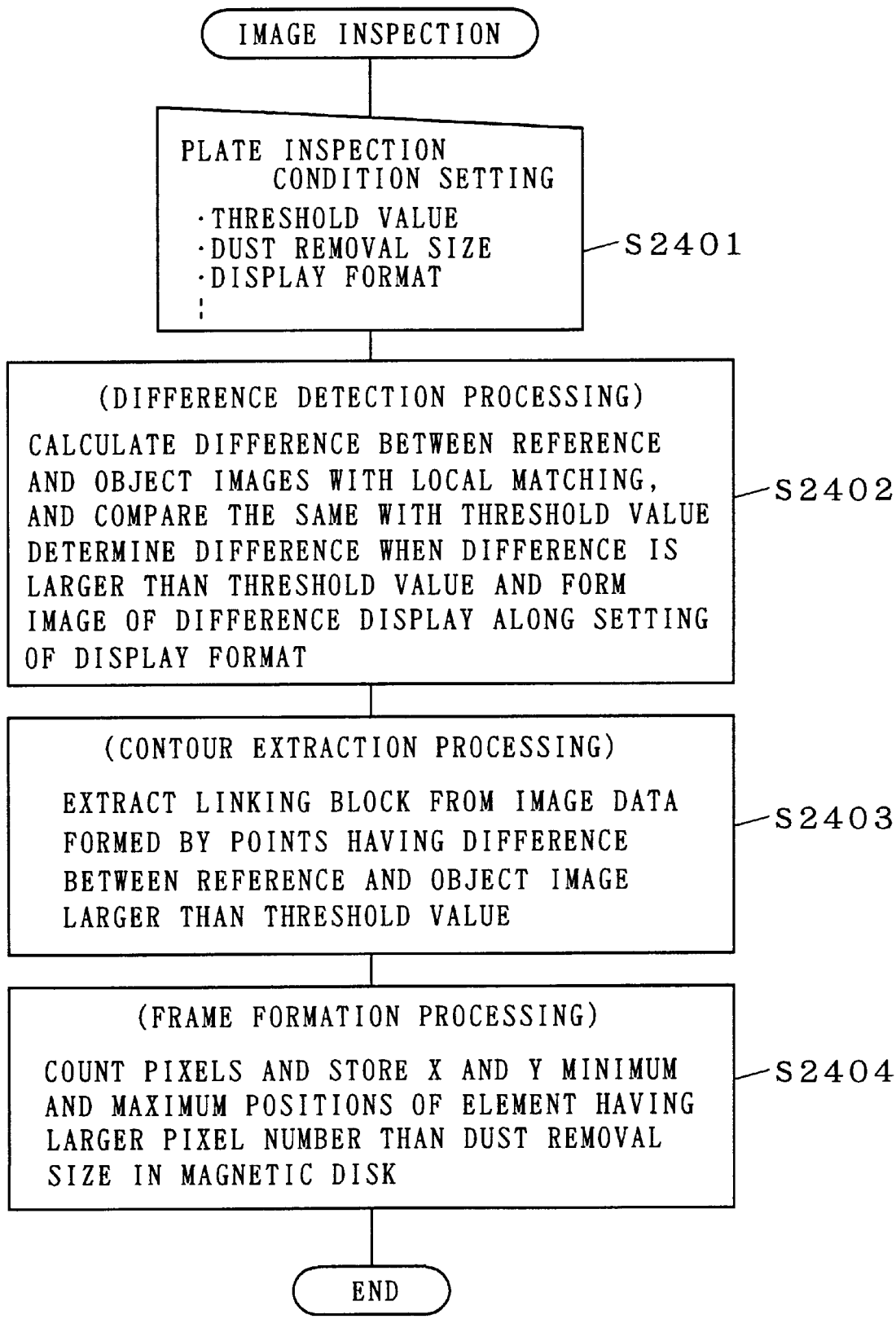
FIG. 46 is a flow chart showing inspection processing according to the second embodiment of the present invention.

FIG. 46 is a flow chart showing the image inspection processing. In this image inspection processing, the operator sets inspection conditions such as "threshold value", "dust removal size", "display format" and the like (step S2401), and the apparatus executes difference detection processing for detecting the difference between the first revise proof sheet PS1 and the second revise press plate digital data PD2 (step S2402). Namely, the apparatus divides each of the image data of the first revise proof sheet PS1 and the second revise press plate digital data PD2 into n by m areas, for calculating the difference between the images while locally matching the images of the first revise proof sheet PS1 and the second revise press plate digital data PD2 every divided area and comparing the difference with the threshold value set at the step S2401. The apparatus determines presence of the difference in the divided area if the difference is larger than the threshold value. Thus, the apparatus detects matching and mismatching portions between the first revise proof sheet PS1 and the second revise press plate digital data PD2 respectively. The mismatching portions include decreased and increased portions deleted and added by correction based on the first revise proof sheet PS1. The apparatus forms an image for displaying the difference in accordance with the display format set at the step S2401.

Figure 47:
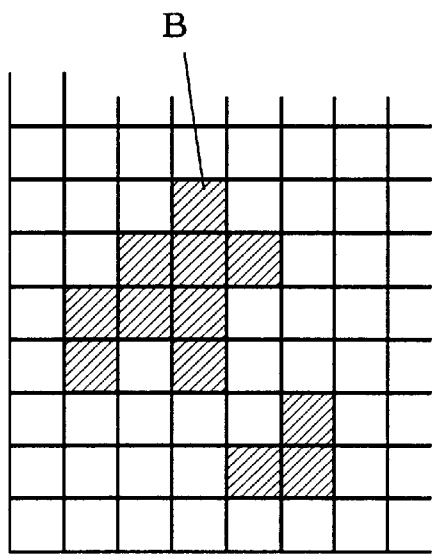
FIG. 47 is a model diagram showing the contents of the inspection processing according to the second embodiment of the present invention.

When the difference detection processing (step S2402) is completed, the apparatus performs contour extract processing at a step S2403. This processing is adapted to extract a linking block B (slant areas) from image data having a difference between the first revise proof sheet PS1 and the second revise press plate digital data PD2 larger than the threshold value, as shown in FIG. 47. When the apparatus deletes a character, present in the first proof sheet PS1, for example, having a large difference between the first revise proof sheet PS1 and the second revise press plate digital data PD2 by proof reading, the block B corresponding to the character size is extracted. When a difference between the first revise proof sheet PS1 and the second press plate digital data PD2 is caused by a phenomenon such as adhesion of small dust essentially irrelevant to proof reading, on the other hand, this results in a relatively small block B. The sizes of the blocks are remarkably varied with the types of factors causing the difference between the first revise proof sheet PS1 and the second revise press plate digital data PD2.

Figure 48:
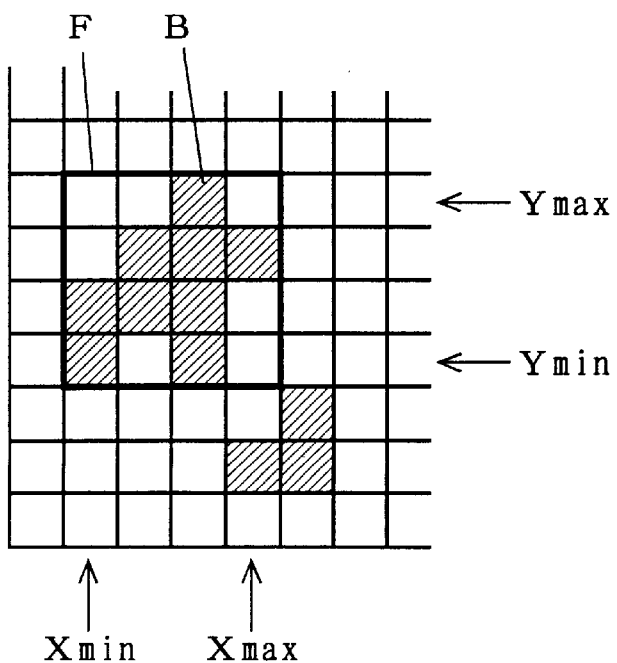
FIG. 48 is a model diagram showing the contents of the inspection processing according to the second embodiment of the present invention.

When the contour extract processing (step S2403) is completed, the apparatus advances to a step S2404, for counting the number of pixels forming the contours of the block B obtained by the contour extract processing and comparing the same with the dust removal size set at the step S2401. As to the block B having a larger pixel count number than the dust removal size, the apparatus assumes a frame F enclosing this block B as shown in FIG. 48 for obtaining minimum and maximum positions (Xmin, Ymin) and (Xmax, Ymax) for X and Y coordinates forming the frame F respectively and storing the same in the magnetic disk of the inspection processing computer 163.

Figure 49:
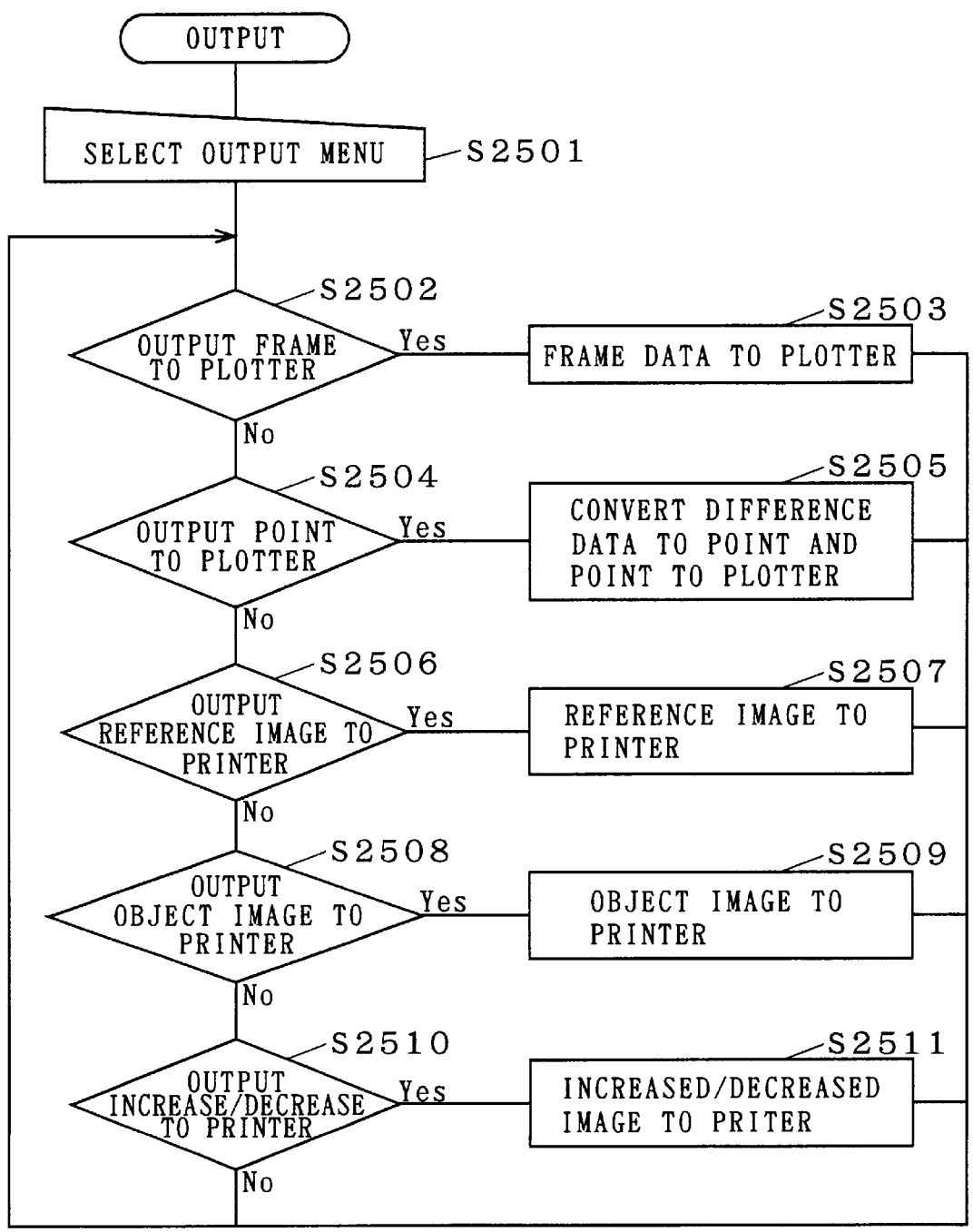
FIG. 49 is a flow chart showing output processing according to the second embodiment of the present invention.

When the inspection processing is completed, the apparatus outputs the results of the inspection processing. FIG. 49 is a flow chart showing output processing. In this output processing, the operator selects an output menu, for deciding the format of the output (step S2501). Then, the apparatus executes steps S2502 to S2512 for outputting the results in the specified output format.

The apparatus makes a determination at the step S2502 as to whether or not the frame F is to be outputted to the monochrome plotter 166. When making a determination of YES, the apparatus reads frame data consisting of the four positions Xmin, Ymin, Xmax and Ymax obtained at the step S2404 from the magnetic disk of the inspection processing computer 163, for drawing the frame corresponding to the block B with the monochrome plotter 166 (step S2503). When making a determination of NO at the step S2502, on the other hand, the apparatus advances to the step S2504.

At the step S2504, the apparatus makes a determination as to whether or not dots are to be outputted to the monochrome plotter 166. When making a determination of YES, the apparatus obtains respective position coordinates of the pixels forming the block B as to the block B larger than the dust removal size and stores the same in the magnetic disk (not shown) of the inspection result output computer 162 while supplying the position coordinates to the monochrome plotter 166 for plotting the respective points (step S2505). When making a determination of NO at the step S2504, on the other hand, the apparatus advances to the step S2506.

The apparatus makes a determination at the step S2506 as to whether or not the first revise is to be outputted to the color printer 165. When making a determination of YES, the apparatus outputs the image of the first revise proof sheet PS1 to the color printer 165 (step S2507). When making a determination of NO at the step S2506, on the other hand, the apparatus advances to a step S2508.

At the step S2508, the apparatus makes a determination as to whether or not the second revise press plate digital data PD2 is to be outputted to the color printer 165. When making a determination of YES, the apparatus outputs the image of the second revise press plate digital data PD2 to the color printer 165 (step S2509). When making a determination of NO at the step S2508, on the other hand, the apparatus advances to a step S2510.

At the step S2510, the apparatus makes a determination as to whether or not increase/decrease is to be outputted to the color printer 165. When making a determination of YES, the apparatus outputs images of portions (increased and decreased portions) added and deleted by proof reading to the color printer 165 along with the images of the matching portions (step S2511). When making a determination of NO at the step S2510, on the other hand, the apparatus returns to the step S2502.

Thus, the apparatus outputs inspection results in the specified format. The above is the first exemplary image inspection processing according to the second embodiment.

<2-3. Second Exemplary Image Inspection Processing>

Figure 50:
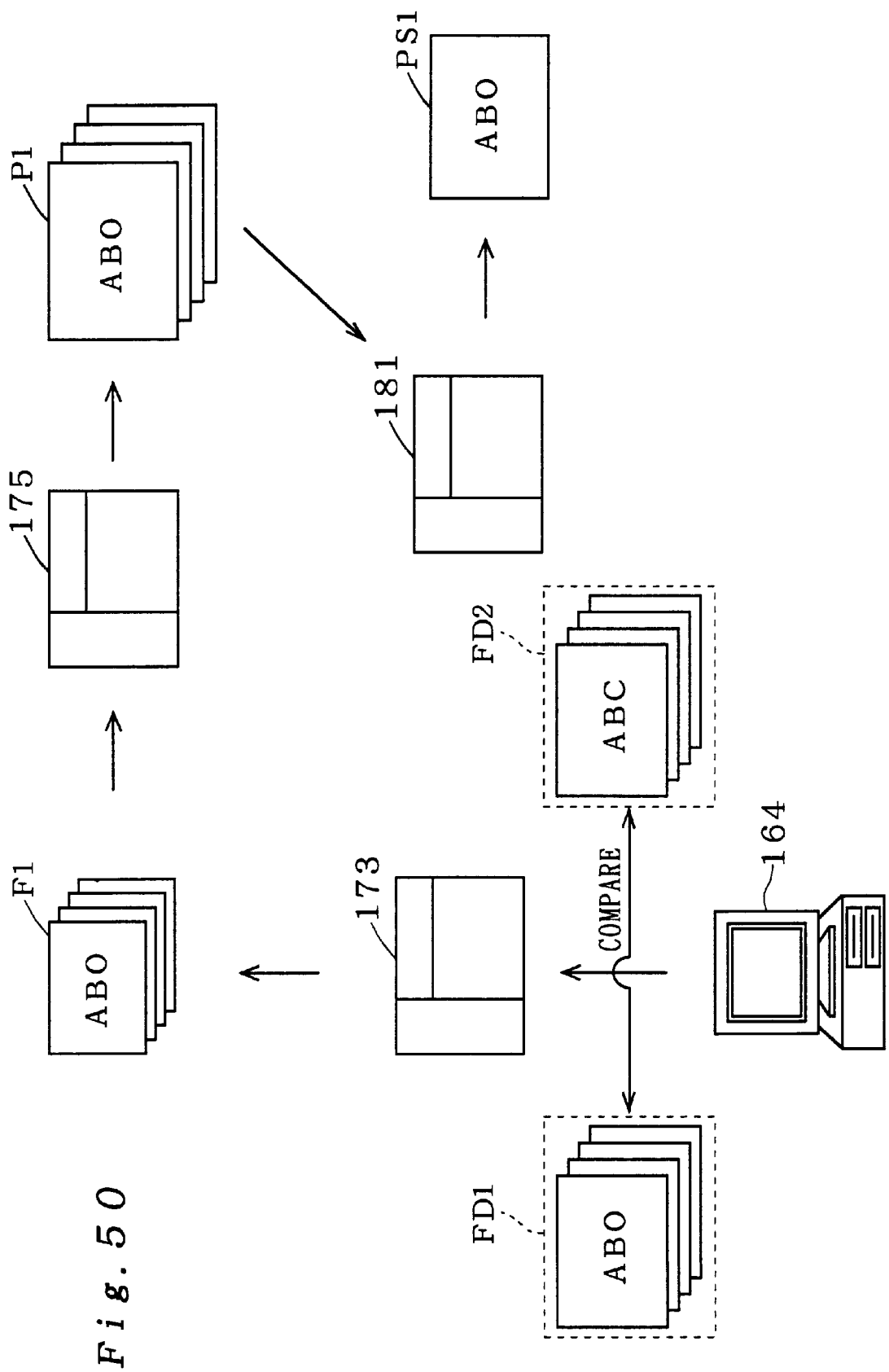
FIG. 50 illustrates the flow of second exemplary image inspection in the image inspection apparatus according to the second embodiment of the present invention.

FIG. 50 illustrates the flow of second exemplary image inspection in the image inspection apparatus according to the second embodiment of the present invention.

In this example, the apparatus regards first revise film digital data FD1 (corresponding to first digital image data) as a reference image, and compares the same with second revise film digital data FD2 (corresponding to second digital image data), regarded as an object image, obtained by performing correction on the basis thereof.

First, the film output unit 173 forms a first revise original plate film F1 (corresponding to an image recording medium) by the first revise film digital data FD1 received from the digital data output unit 164, for forming a first revise press plate P1 in the press plate exposure unit 175 on the basis thereof, applying the same to the proof press 181 and outputting a first revise proof sheet PS1.

Then, the apparatus corrects the first revise film digital data FD1 in the aforementioned manner on the basis of the first revise proof sheet PS1, for obtaining the second revise film digital data FD2 (FIGS. 50 to 54 also illustrates correction of changing "O" in the first revise to "C"). The apparatus compares the first revise film digital data FD1, regarded as the reference image, with the second revise film digital data FD2, regarded as the object image, in the inspection processing computer 163 for performing image inspection. The apparatus compares the data FD1 and FD2 with each other similarly to the first exemplary image inspection.

The operator confirms the result of this inspection through the monitor of the inspection result output computer 162, or by outputting the same through the color printer 165 or the monochrome plotter 166.

The apparatus compares the film output digital image data with each other in the above through neither scanner input computer 161 nor scanner 160, since no loading of the products is necessary.

<2-4. Third Exemplary Image Inspection Processing>

Figure 51:
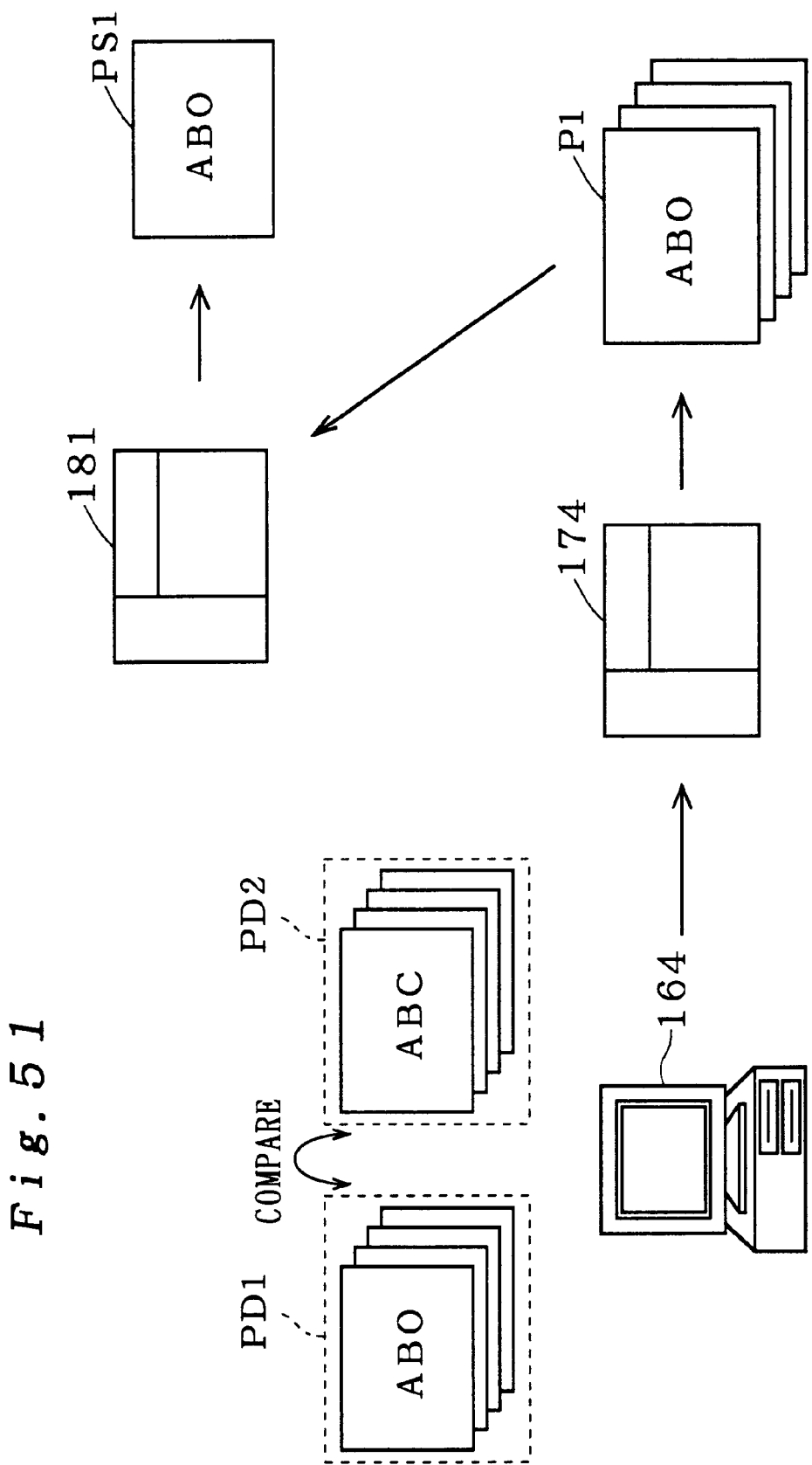
FIG. 51 illustrates the flow of third exemplary image inspection in the image inspection apparatus according to the second embodiment of the present invention.

FIG. 51 illustrates the flow of third exemplary image inspection in the image inspection apparatus according to the second embodiment of the present invention.

In this example, the apparatus regards first revise press plate digital data PD1 (corresponding to first digital image data) as a reference image, and compares the same with second revise press plate digital data PD2 (corresponding to second digital image data), regarded as an object image, obtained by performing correction on the basis thereof.

First, the film output unit 174 forms a first revise press plate P1 (corresponding to an image recording medium) by the first press plate film digital data PD1 received from the digital data output unit 164, for applying the same to the proof press 171 and outputting a first revise proof sheet PS1.

Then, the apparatus corrects the first revise press plate digital data PD1 in the aforementioned manner on the basis of the first revise proof sheet PS1, for obtaining the second press plate digital data PD2. The apparatus compares the first revise press plate digital data PD1, regarded as the reference image, with the second revise press plate digital data PD2, regarded as the object image, in the inspection processing computer 163 for performing image inspection. The apparatus compares the data PD1 and PD2 with each other similarly to the first exemplary image inspection.

The operator outputs the inspection result from the inspection result output computer 162, the color printer 165 or the monochrome plotter 166 for confirming the same.

The apparatus compares the press plate output digital image data with each other in the above through neither scanner input computer 161 nor scanner 160, since no loading of products is necessary.

<2-5. Fourth Exemplary Image Inspection Processing>

Figure 52:
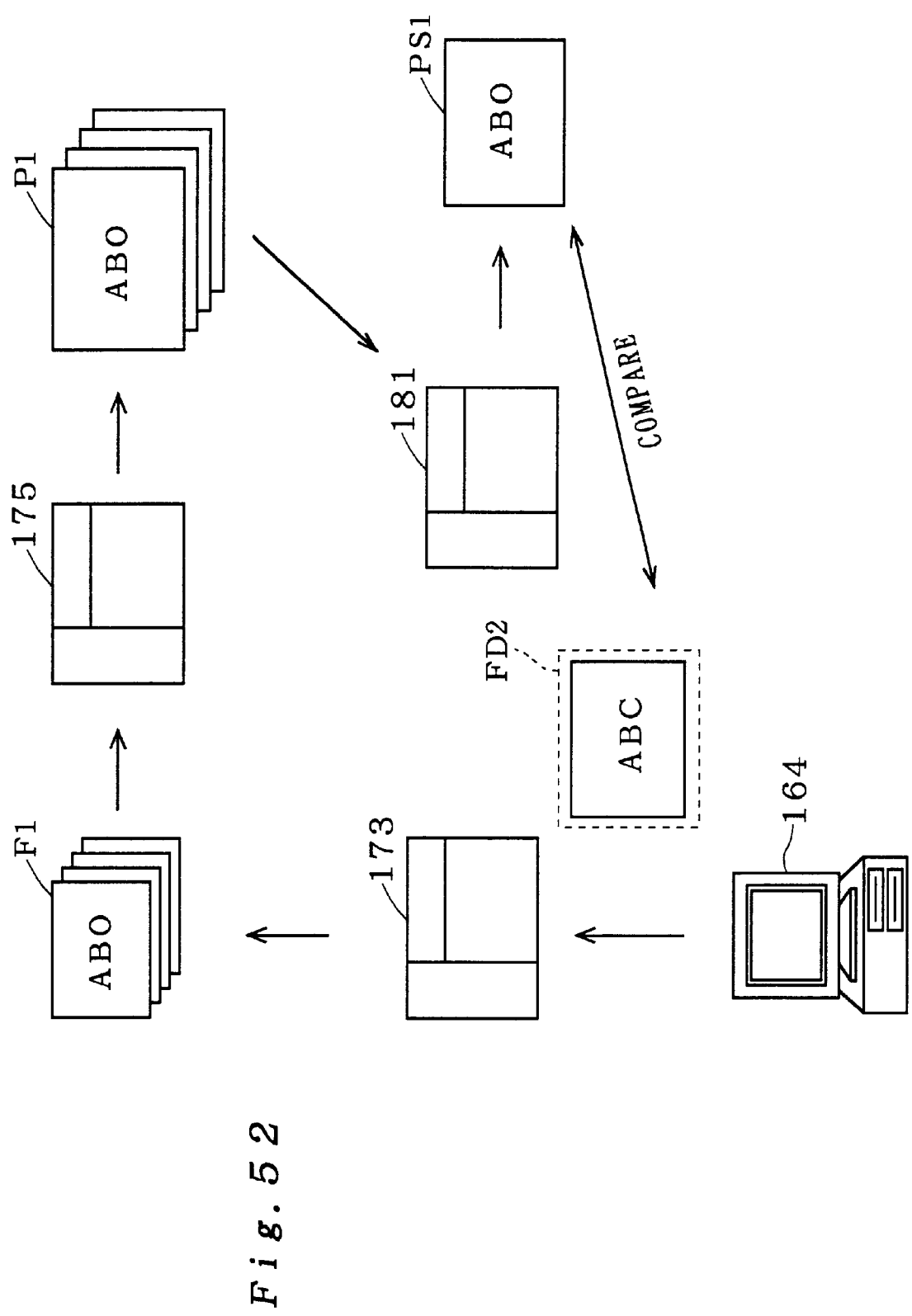
FIG. 52 illustrates the flow of fourth exemplary image inspection in the image inspection apparatus according to the second embodiment of the present invention.

FIG. 52 illustrates the flow of fourth exemplary image inspection in the image inspection apparatus according to the second embodiment of the present invention.

In this example, the apparatus regards a first revise proof sheet PS1 (corresponding to a first image recording medium) as a reference and compares the same with second revise film digital data FD2 (corresponding to second digital image data), regarded as an object image, obtained by performing correction on the basis thereof.

First, the film output unit 173 forms a first revise original plate film F1 by first revise film digital data FD1 (not shown) received from the digital data output unit 164, and the apparatus forms a first revise press plate P1 in the press plate exposure unit 175 on the basis thereof and applies the same to the proof press 181 for outputting the first revise proof sheet PS1.

Then, the apparatus corrects the first revise film digital data FD1 in the aforementioned manner on the basis of the first revise proof sheet PS1, for obtaining the second revise film digital data FD2. The apparatus compares digital image data (corresponding to first digital image data) obtained by loading the first revise proof sheet PS1 by the scanner 160, regarded as the reference image, with the second revise film digital data FD2, regarded as the object image, in the inspection processing computer 163 for performing image inspection. The apparatus compares the proof sheet PS1 and the digital data FD2 with each other similarly to the first exemplary image inspection.

The operator confirms the result of this inspection through the monitor of the inspection result output computer 162, or by outputting the same from the color printer 165 or the monochrome plotter 166.

<2-6. Fifth Exemplary Image Inspection Processing>

Figure 53:
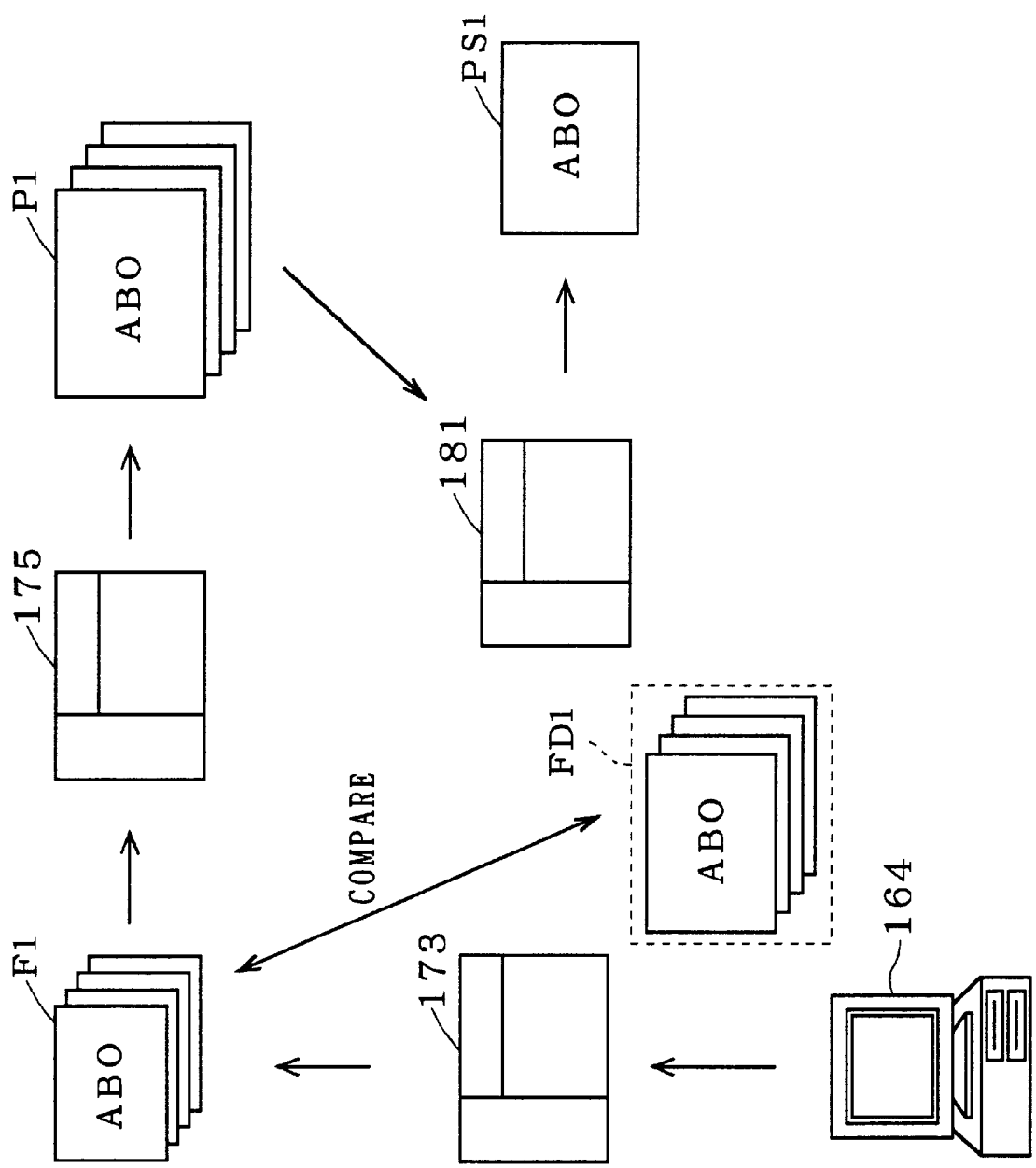
FIG. 53 illustrates the flow of fifth exemplary image inspection in the image inspection apparatus according to the second embodiment of the present invention.

FIG. 53 illustrates the flow of fifth exemplary image inspection in the image inspection apparatus according to the second embodiment of the present invention.

In this example, the apparatus compares first revise film digital data FD1 (corresponding to first digital image data), regarded as a reference image, with an original plate film F1 (corresponding to image recording media), regarded as an object, obtained on the basis thereof.

First, the film output unit 173 forms the first revise original plate film F1 through the first film digital data FD1 received from the digital data output unit 164.

Then, the apparatus compares the first revise film digital data FD1, regarded as the reference image, with the digital image data (corresponding to second digital image data), regarded as the object image, obtained by loading the first revise original plate film F1 with the scanner 160, in the inspection processing computer 163 for performing image inspection. The apparatus compares the data FD1 and FD2 with each other similarly to the first exemplary image inspection.

The operator confirms the result of this inspection through the monitor or the inspection result output computer 162, or by outputting the same through the color printer 165 or the monochrome plotter 166.

<2-7. Sixth Exemplary Image Inspection Processing>

Figure 54:
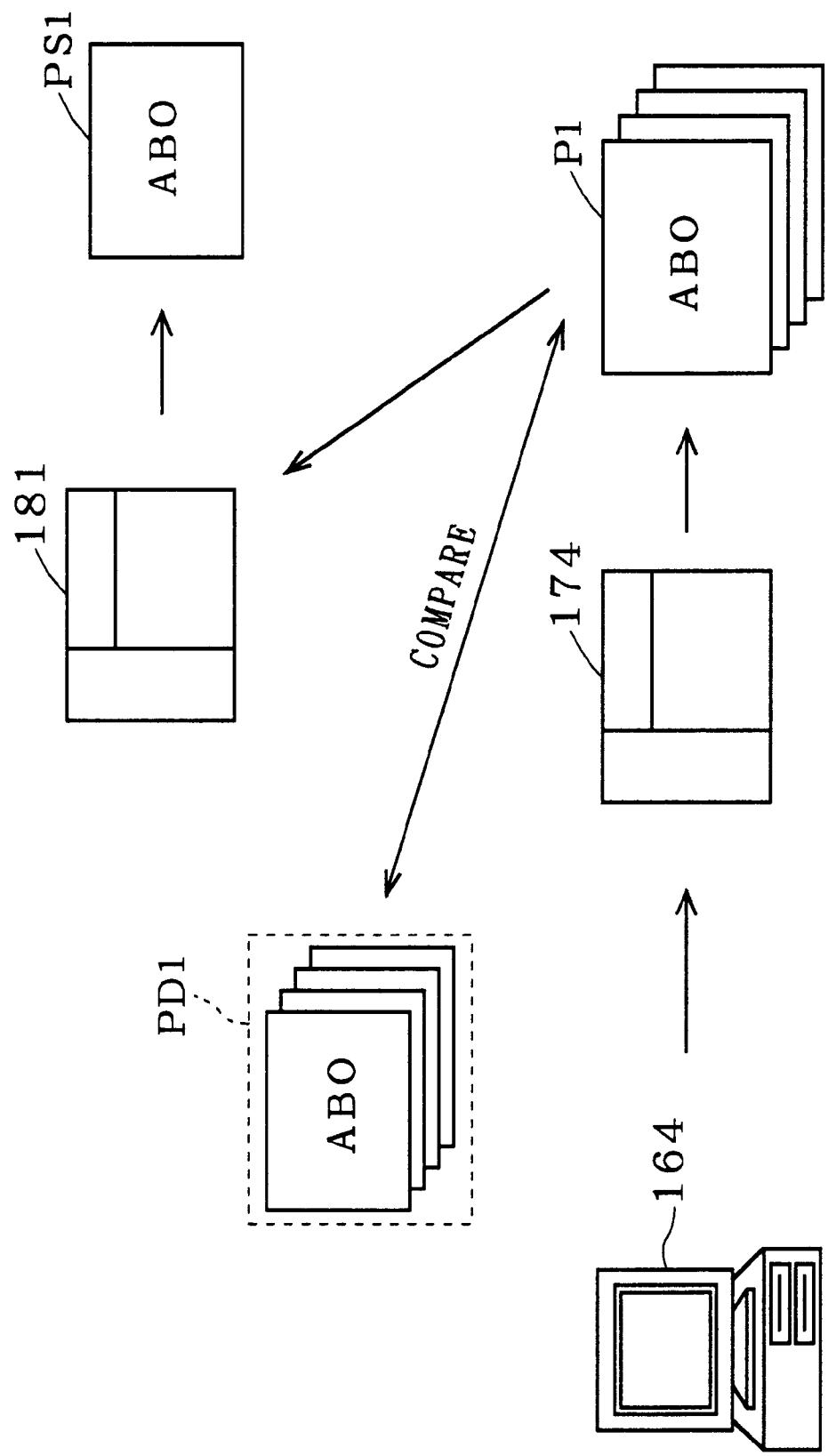
FIG. 54 illustrates the flow of sixth exemplary image inspection in the image inspection apparatus according to the second embodiment of the present invention.

FIG. 54 illustrates the flow of sixth exemplary image inspection in the image inspection apparatus according to the second embodiment of the present invention.

In this example, the apparatus regards first revise press plate digital data PD1 (corresponding to first digital image data) as a reference image, and compares the same with a first revise press plate P1 (corresponding to an image recording medium), regarded as an object, obtained on the basis thereof.

First, the film output unit 174 forms the first revise press plate P1 by the first press plate film digital data PD1 received from the digital data output unit 164.

Then, the apparatus compares the first revise press plate digital data PD1, regarded as the reference image, with the digital image data (corresponding to second digital image data), regarded as the object image, obtained by loading the first revise press plate P1 with the scanner 160, in the inspection processing computer 163 for performing image inspection. The apparatus compares the data with each other similarly to the first exemplary image inspection.

The operator confirms the result of this inspection by outputting the same through the inspection result computer 162, the color printer 165 or the monochrome plotter 166.

<2-8. Effects and Modifications>

According to the second embodiment of the present invention, as hereinabove described, the apparatus compares the digital image data such as the press plate digital data PDi or the film digital data FDi with other image data for performing image inspection, whereby precise image inspection can he made as compared with comparison inspection employing only image data possibly having dust resulting from reading of products with a reader or causing errors.

Further, formation of products can be reduced as hereinabove described, whereby the cost therefor can be reduced and a time for such formation can be omitted.

In addition, the apparatus regards the first revise film digital data FD1 and the second revise film digital data FD2 as reference and object images in the second exemplary image inspection processing while regarding the first revise press plate digital data PD1 and the second revise press plate digital data PD2 as reference and object images in the third exemplary image inspection processing for comparing the same with each other for performing image inspection, whereby image inspection can be performed in a short time without outputting the second revise original plate film F2 and the second revise press plate P2 and the cost for the second revise original plate film F2 and the second revise press plate P2 can be reduced. Further, the apparatus compares only the digital image data immediately before formation of the second original plate film F2 or the second revise press plate P2 for performing inspection without employing data obtained by reading the same with the scanner 160, which may cause dust or errors, whereby precise image inspection can he performed.

While the press plate and the proof sheet have single page (i.e. an unit image) of mounted images in the second embodiment, the present invention is not restricted to this but the apparatus may alternatively compare image data of each page of press plate or a proof sheet prepared by photoimposing identical images on eight pages or the like with a single-surface digital image.

While the digital data output unit 164 handles TIFF digital image data in the second embodiment, the present invention is not restricted to this but RIP or BMP image data may be handled.

While the apparatus compares the images of the first and second revises with each other in the second embodiment, the present invention is not restricted to this but the apparatus may alternatively compare images of the second revise and a third or higher order revise with each other.

While the first to sixth examples of image inspection processing are described with reference to the second embodiment, the present invention is not restricted to this but image inspection may be performed by comparing a first revise press plate P1 prepared from an original plate film with second revise film digital data FD2 or comparing image data obtained by reading images of image recording media such as an original plate film and a proof sheet with each other.

While the invention has been shown and described in detail, the foregoing description is in all aspects illustrative and not restrictive. It is therefore understood that numerous modifications and variations can be devised without departing from the scope of the invention.

We claim:

1. An image inspection apparatus in a plate making process in which a proof sheet comprising a recording of an image is used as a reference, and any one of an original plate film being corrected with reference to said proof sheet, a press plate obtained by performing exposure/development through said original plate film, and another proof sheet prepared from said press plate is used as an object, said image inspection apparatus is used for comparing said reference with said object and inspecting said object, said image inspection apparatus comprising:

a) holding means capable of holding said reference and said object;

b) illumination means for illuminating said reference and said object being held by said holding means, c) image pickup means for receiving light from a subject to be read, said subject being one of aid reference and said object for picking up an image on said subject to be read when said subject to be read is held by said holding means while receiving light, and for receiving light from another subject, said other subject being the other of said reference and said object and picking up an image on said other subject to be read when said other subject to be read is held by said holding means;

d) an optical system for guiding said light from either said subject to be read or said other subject to be read to said image pickup means, said optical system having a movable lens group being movable in an optical axis direction, said optical system guiding light from an image recording medium being held by said holding means to said image pickup means through said movable lens group, e) difference detection means for detecting differences between said reference and said object by comparing said images on said reference and said object with each other based on image information output from said image pickup means and detecting mismatching portions;

f) output means for displaying a detection result by said difference detection means; and g) lens driving means for driving said movable lens group in said optical axis direction and locating said movable lens group to one of a plurality of magnification set positions thereby varying the magnification of said optical system to one of a plurality of set magnifications, said lens driving means comprising:

g-1) a driving source for driving said movable lens group in said optical axis direction, and g-2) an intermittent transmission mechanism for transmitting driving force from said driving source to said movable lens group during location of said movable lens group between said plurality of magnification set positions while intercepting said transmission of said driving force to said movable lens group upon location of said movable lens group on any one of said plurality of magnification set positions.

2. The image inspection apparatus in a plate making process in accordance with claim 1, wherein said intermittent transmission mechanism comprises:

g-2-1) a cylindrical member having a larger inner diameter than a maximum diameter of said movable lens group, a groove portion being provided on said cylindrical member outer peripheral surface, said cylindrical member being arranged to be rotatable about said optical axis, and g-2-2) a follower part mounted in an outer peripheral direction from an edge of said movable lens group so that its forward end portion is movable along said groove portion while being engaged with said groove portion, said groove portion comprising a plurality of horizontal groove portions provided on said outer peripheral surface in parallel with the direction of rotation of said cylindrical member in correspondence to said plurality of magnification set positions, and an inclined groove portion being provided on said outer peripheral surface of said cylindrical member to be inclined with respect to said direction of rotation for coupling said plurality of horizontal groove portions with each other.

3. The image inspection apparatus in a plate making process in accordance with claim 1, wherein a structural body comprised of said illumination means, said image pickup means, said optical system and said lens driving means is integrally movable in parallel with said holding means, said image pickup means being adapted to sequentially pick up partial images of said image recording medium being held by said holding means while integrally stepping with said illumination means, said image pickup means, said optical system and said lens driving means, so that said image pickup means picks up an entire image of said image recording medium.

4. The image inspection apparatus in a plate making process in accordance with claim 3, further comprising:

h) movement adjusting means for changing a step movement amount of said structural body in response to a magnification being set for said optical system.

5. The image inspection apparatus in a plate making process in accordance with claim 1, wherein said illumination means is a round fluorescent lamp, a central axis of said round fluorescent lamp matching with said optical axis.

6. An image inspection apparatus in a plate making process in which a proof sheet comprising a recording of an image is used as a reference, and any one of an original plate film being corrected with reference to said proof sheet, a press plate obtained by performing exposure/development through said original plate film, and another proof sheet prepared from said press plate is used as an object, said image inspection apparatus is used for comparing said reference with said object and inspecting said object, said image inspection apparatus comprising:

a) holding means capable of holding said reference and said object;

b) illumination means for illuminating said reference and said object being held by said holding means, c) image pickup means for receiving light from a subject to be read, said subject being one of aid reference and said object for picking up an image on said subject to be read when said subject to be read is held by said holding means while receiving light, and for receiving light from another subject, said other subject being the other of said reference and said object and picking up an image on said other subject to be read when said other subject to be read is held by said holding means, said image pickup means is adapted to pick up an image on each of said subject and other subject to be read as a color image, reference and object images being images on said reference and said object are color images respectively, d) an optical system for guiding said light from either said subject to be read or said other subject to be read to said image pickup means;

e) difference detection means for detecting differences between said reference and said object by comparing said images on said reference and said object with each other based on image information output from said image pickup means and detecting mismatching portions;

f) output means for displaying a detection result by said difference detection means;

g) color component adder means for obtaining color component sums by adding up a plurality of color components every pixel as to said reference and object images; and h) optimum displacement deciding means for relatively displacing said reference and object images in various ways for determining matching degrees of spatial distributions of said color component sums of respective said pixels of said reference and object images in respective ones of said displacements, and deciding that a relative displacement having maximum said matching degree is an optimum displacement, said difference detection means comparing said reference and object images with each other in a state displacing said reference and object images by said optimum displacement for detecting differences between said reference and object images.

7. The image inspection apparatus in a plate making process in accordance with claim 6, wherein said optimum displacement deciding means comprises:

j-1) section image forming means for dividing said reference and object images into small sections in each said displacement for obtaining reference and object section images respectively, j-2) color component sum adder means for applying processing of adding/projecting said color component sums in respective axis directions of a prescribed two-dimensional rectangular coordinate system in each said displacement to said reference and object section images thereby obtaining reference and object waveforms, j-3) compare means for comparing said reference and object waveforms with each other in each said displacement thereby determining degrees of matching of said reference and object waveforms, and j-4) displacement deciding means for deciding a displacement for the maximum one of said degrees of matching in each said displacement as said optimum displacement.

8. The image inspection apparatus in a plate making process in accordance with claim 7, wherein a plurality of two-dimensional rectangular coordinate systems being previously classified into a priority coordinate system and another coordinate system and having different directions of coordinate axes respectively are defined as said two-dimensional rectangular coordinate system, said color component sum adder means is adapted to obtain said reference and object waveforms as to respective said axes of said priority coordinate system and said another coordinate system, and said displacement deciding means is adapted to decide said optimum displacement by correcting a proper displacement being specified in response to said degrees of matching in said priority coordinate system by a proper displacement being specified in response to said degrees of matching in said another coordinate system when said degree of matching in said priority coordinate system is smaller than a first threshold value and said degree of matching in said another coordinate system is larger than a second threshold value.

9. The image inspection apparatus in a plate making process in accordance with claim 8, wherein said another coordinate system is a coordinate system being obtained by relatively rotating said priority coordinate system by 45°.

10. An image inspection apparatus in a plate making process in which a proof sheet comprising a recording of an image is used as a reference, and any one of an original plate film being corrected with reference to said proof sheet, a press plate obtained by performing exposure/development through said original plate film, and another proof sheet prepared from said press plate is used as an object, said image inspection apparatus is used for comparing said reference with said object and inspecting said object, said image inspection apparatus comprising:

a) holding means capable of holding said reference and said object;

b) illumination means for illuminating said reference and said object being held by said holding means, c) image pickup means for receiving light from a subject to be read, said subject being one of aid reference and said object for picking up an image on said subject to be read when said subject to be read is held by said holding means while receiving light, and for receiving light from another subject, said other subject being the other of said reference and said object and picking up an image on said other subject to be read when said other subject to be read is held by said holding means;

d) an optical system for guiding said light from either said subject to be read or said other subject to be read to said image pickup means;

e) difference detection means for detecting differences between said reference and said object by comparing said images on said reference and said object with each other based on image information output from said image pickup means and detecting mismatching portions; and f) output means for displaying a detection result by said difference detection means, said output means outputs a mismatch mark indicating a mismatch onto an output paper, said mismatch mark corresponds with a mismatch position detected by said difference detection means.

11. The image inspection apparatus in a plate making process in accordance with claim 10, wherein said output paper is a transparent or translucent paper, said output means outputting only said mismatch mark onto said output paper.

12. The image inspection apparatus in a plate making process in accordance with claim 10, wherein said output means superposes said image of said reference and said mismatch mark with each other and outputs said image of said reference and said mismatch mark onto said output paper.

13. The image inspection apparatus in a plate making process in accordance with claim 10, wherein said output means superposes said image of said object and said mismatch mark with each other and outputs said image of said object and said mismatch mark onto said output paper.

14. The image inspection apparatus in a plate making process in accordance with claim 10, wherein said output means superposes a decreased image being deleted from said reference, an increased image being added to said object, an image of a matching portion and said mismatch mark with each other and outputs said decreased image, said increased image, said image of matching portion and mismatch mark onto said output paper.

15. The image inspection apparatus in a plate making process in accordance with claim 12, wherein said image pickup means picks up said image on each said subject to be read as a color image, said images on said reference and said object being color images, said image inspection apparatus raising color concentrations of respective color components forming an image of said matching portion in said image of said reference thereby approaching said image of said matching portion to white.

16. The image inspection apparatus in a plate making process in accordance with claim 12, wherein said image pickup means picks up said image on each said subject to be read as a color image, said images of said reference and said object being color images, said image inspection apparatus rendering an image of a matching portion in said image of said reference as an achromatic image.

17. An image inspection apparatus in a plate making process for performing image inspection by comparing two image data in different stages of said plate making process with each other, said image inspection apparatus comprising:

a) means for comparing first digital image data with second digital image data and providing a comparison result; and b) means for outputting said comparison result, said first digital image data being selected from:
  digital image data being obtained in a stage immediately before recording on an image recording medium, and
  digital image data being obtained by reading an image recorded on an image recording medium, said second digital image data being selected from:
  digital image data obtained in a stage immediately before recording on an image recording medium, and
  digital image data being obtained by reading an image recorded on an image recording medium.

18. The image inspection apparatus in a plate making process in accordance with claim 17, wherein said first digital image data is obtained in said stage immediately before said recording on an image recording medium of a predetermined type, and
  said second digital image data is obtained in a stage immediately before recording said first digital image data on an image recording medium of said predetermined type again after correcting said first digital image data.

19. The image inspection apparatus in a plate making process in accordance with claim 17, wherein said first digital image data is obtained by reading an image recorded on a first image recording medium which is made of an original digital image data, and
  said second digital image data is obtained in a stage immediately before recording said original digital image data in a second image recording medium again after making corrections based on said image recorded on said first image recording medium.

20. The image inspection apparatus in a plate making process in accordance with claim 17, wherein said first digital image data is in said stage immediately before recording in said image recording medium, and
  said second digital image data is obtained by reading said image recorded on said image recording medium.

21. An image inspection method in a plate making process for performing image inspection by comparing two image data in different stages of said plate making process with each other, said image inspection method comprising steps of:
  a) comparing first and second digital image data with each other and providing a comparison result; and
  b) outputting said comparison result, said first digital image data being selected from:
  digital image data obtained in a stage immediately before recording on an image recording medium, and
  digital data being obtained by reading an image recorded on an image recording medium, said second digital image data being selected from:
  digital image data being obtained in a stage immediately before recording on an image recording medium, and
  digital image data being obtained by reading an image recorded on an image recording medium.

22. The image inspection method in a plate making process in accordance with claim 21, wherein said first digital image data is in said stage immediately before said recording on said image recording medium of a predetermined type, and
  said second digital image data is obtained in a stage immediately before recording said first digital image data on an image recording medium of said predetermined type again after correcting said first digital image data.

23. The image inspection method in a plate making process in accordance with claim 21, wherein said first digital image data is obtained by reading an image recorded on a first image recording medium which is made of an original digital image data, and
  said second digital image data is obtained in a stage immediately before recording said original digital image data in a second image recording medium again after making corrections based on said image recorded on said first image recording medium.

24. The image inspection method in a plate making process in accordance with claim 21, wherein said first digital image data is in said stage immediately before said recording in said image recording medium, and
  said second digital image data is obtained by reading said image recorded on said image recording medium.

25. The image inspection method in a plate making process in accordance with claim 22, wherein said image recording media of said predetermined type is an original plate film.

26. The image inspection method in a plate making process in accordance with claim 22, wherein said image recording media of said predetermined type is a press plate.

27. The image inspection method in a plate making process in accordance with claim 23, wherein said first image recording medium is a proof sheet, and
  said second image recording medium is an original plate film being corrected on the basis of said proof sheet.

28. The image inspection method in a plate making process in accordance with claim 23, wherein said first image recording medium is a proof sheet, and
  said second image recording medium is a press plate being corrected on the basis of said proof sheet.

* * * * *